(12) United States Patent
Oh et al.

(10) Patent No.: US 8,990,095 B2
(45) Date of Patent: Mar. 24, 2015

(54) METHOD AND AN APPARATUS FOR PROCESSING AN AUDIO SIGNAL

(71) Applicant: Industry-Academic Cooperation Foundation, Yonsei University, Seoul (KR)

(72) Inventors: Hyen-O Oh, Seoul (KR); Chang Heon Lee, Seoul (KR); Hong Goo Kang, Seoul (KR); Jung Wook Song, Seoul (KR)

(73) Assignee: Industry-Academic Cooperation Foundation, Yonsei University, Seoul (KR)

(*) Notice: Subject to any disclaimer, the term of this patent is extended or adjusted under 35 U.S.C. 154(b) by 0 days.

(21) Appl. No.: 13/960,467

(22) Filed: Aug. 6, 2013

(65) Prior Publication Data
US 2014/0019143 A1  Jan. 16, 2014

Related U.S. Application Data

(63) Continuation of application No. 13/391,992, filed as application No. PCT/KR2010/006412 on Sep. 17, 2010.

(60) Provisional application No. 61/243,514, filed on Sep. 17, 2009.

(51) Int. Cl.
*G10L 19/04* (2013.01)
*G10L 19/00* (2013.01)
*G10L 19/18* (2013.01)
(Continued)

(52) U.S. Cl.
CPC .............. *G10L 19/00* (2013.01); *G10L 19/022* (2013.01); *G10L 19/167* (2013.01); *G10L 19/18* (2013.01); *G11B 20/00007* (2013.01);
(Continued)

(58) Field of Classification Search
CPC ......... G10L 19/02; G10L 19/04; G10L 21/04; G10L 21/038
USPC .......................................... 704/200, 205, 500
See application file for complete search history.

(56) References Cited

U.S. PATENT DOCUMENTS 5,848,391 A * 12/1998 Bosi et al. ................... 704/200.1
8,352,279 B2 * 1/2013 Gao .............................. 704/500
(Continued)

FOREIGN PATENT DOCUMENTS

WO  WO 2010062123 A2 * 6/2010  .............. G10L 19/14

OTHER PUBLICATIONS

Lecomte et al., Efficient cross-face windows for transitions between LPC-based and non-LPC based audio coding, May 2009, Audio Engineering Society Convention paper 7712, p. 1-9.*

*Primary Examiner* — Richemond Dorvil
*Assistant Examiner* — Seong-Ah A. Shin
(74) *Attorney, Agent, or Firm* — Ladas & Parry, LLP

(57) ABSTRACT

An apparatus for processing an audio signal and method thereof are disclosed. The present invention includes receiving, by an audio processing apparatus, an audio signal including a first data of a first block encoded with rectangular coding scheme and a second data of a second block encoded with non-rectangular coding scheme; receiving a compensation signal corresponding to the second block; estimating a prediction of an aliasing part using the first data; and, obtaining a reconstructed signal for the second block based on the second data, the compensation signal and the prediction of aliasing part.

8 Claims, 39 Drawing Sheets

(51) Int. Cl.
  *G10L 19/022* (2013.01)
  *G10L 19/16* (2013.01)
  *G11B 20/00* (2006.01)
  *G11B 20/10* (2006.01)

(52) U.S. Cl.
  CPC ............... *G11B 2020/00028* (2013.01); *G11B 2020/10546* (2013.01); *G10L 19/04* (2013.01)
  USPC ............................ 704/500; 704/200; 704/205

(56) References Cited

U.S. PATENT DOCUMENTS

| | | | |
|---|---|---|---|
| 8,447,620 B2* | 5/2013 | Neuendorf et al. | 704/500 |
| 2006/0195314 A1* | 8/2006 | Taleb et al. | 704/200.1 |
| 2010/0138218 A1* | 6/2010 | Geiger | 704/205 |
| 2011/0004479 A1* | 1/2011 | Ekstrand et al. | 704/500 |

* cited by examiner $$L_i^2 + R_i^2 = 1 \ (i=1,2),$$
$$L_{1r} = R_2,$$
$$L_{2r} = R_1$$

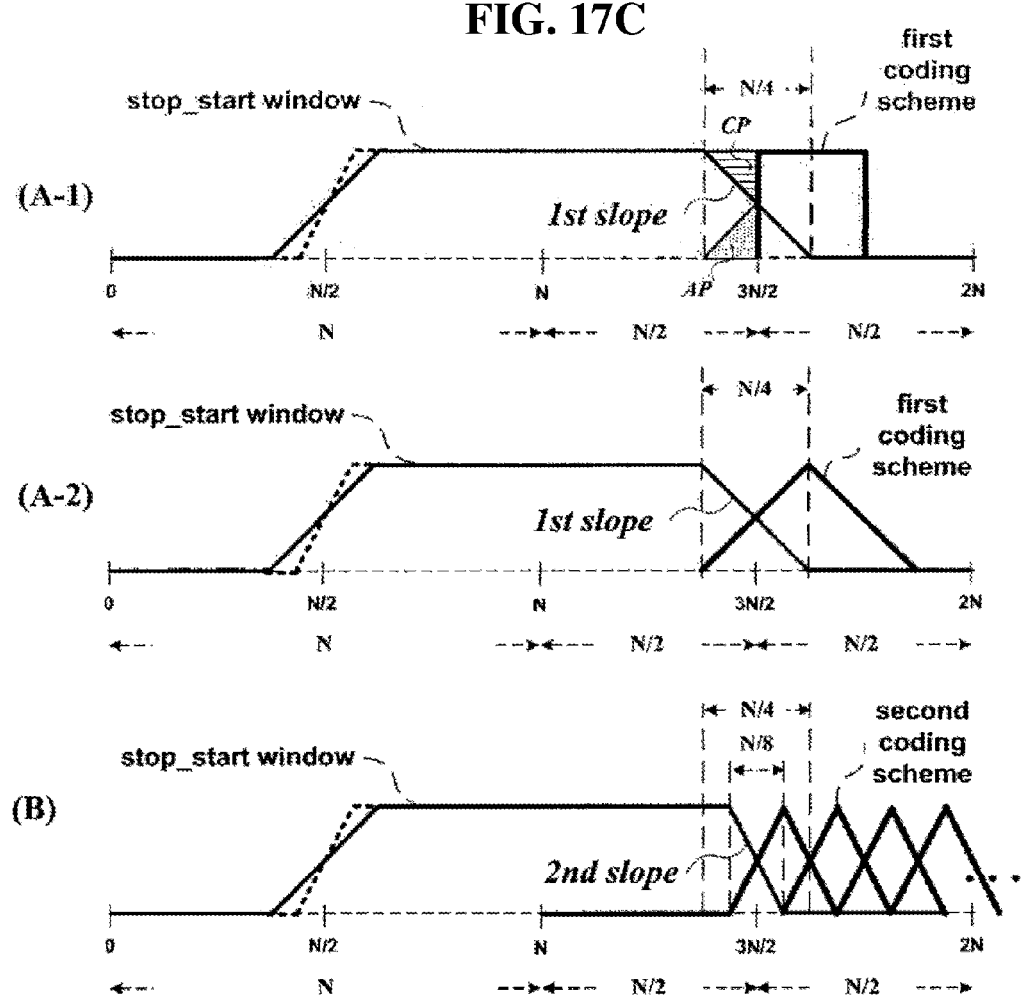

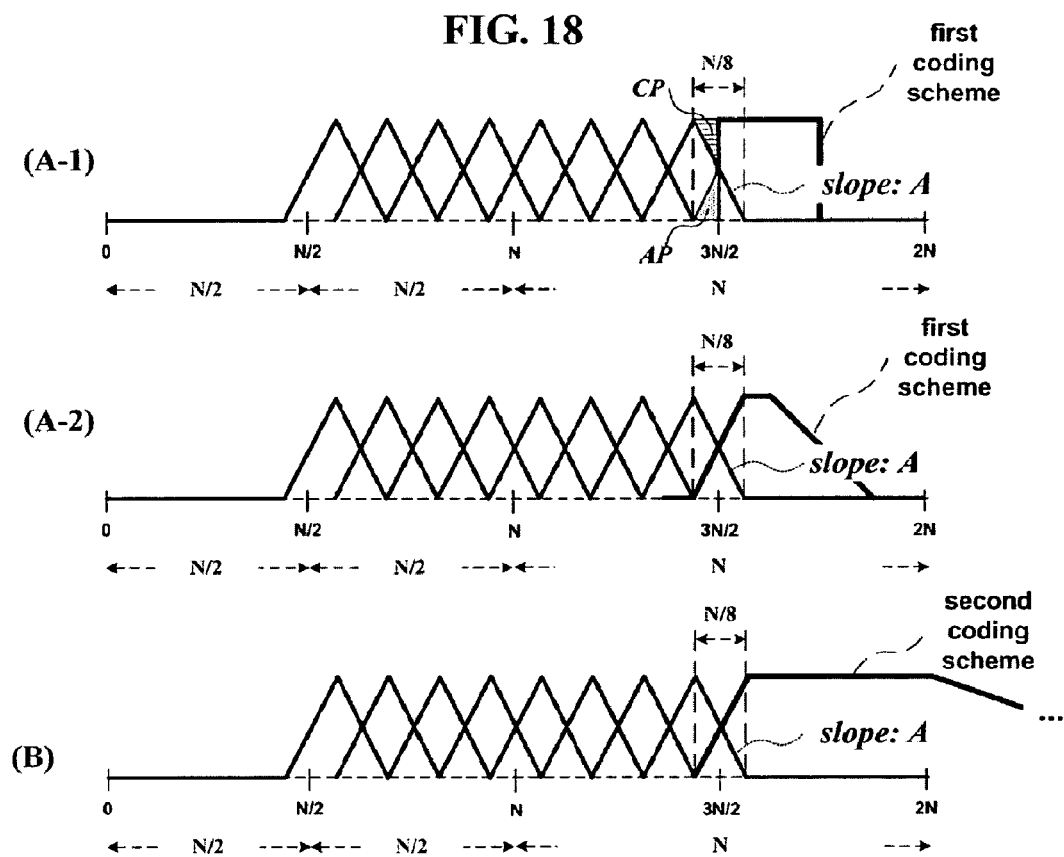

FIG. 21

| from / to | only-long window | long_start window | short window | long_stop window | stop_start window | window for 1st coding scheme |
|---|---|---|---|---|---|---|
| only-long window | ○ | ○ | | | | |
| long_start window | | | ○ | ○ | ○ | ○ |
| short window | | | ○ | ○ | ○ | ○ |
| long_stop window | ○ | ○ | | | | |
| stop_start window | | | ○ | ○ | ○ | ○ |
| window for 1st coding scheme | | | ★(2) | ★(1) | ★ | ○ |

FIG. 28 shape 1 (non-short/ non-short)

| MODE | length | ZL | L | M | R | ZR |
|---|---|---|---|---|---|---|
| 1 | 256 | 0 | 256 | 0 | 256 | 0 |
| 2 | 512 | 128 | 256 | 256 | 256 | 128 |
| 3 | 1024 | 384 | 256 | 768 | 256 | 384 | shape 2 (non-short/ short)

| MODE | length | ZL | L | M | R | ZR |
|---|---|---|---|---|---|---|
| 1 | 256 | 0 | 256 | 64 | 128 | 64 |
| 2 | 512 | 128 | 256 | 320 | 128 | 192 |
| 3 | 1024 | 384 | 256 | 832 | 128 | 448 | shape 3 (short/ non-short)

| MODE | length | ZL | L | M | R | ZR |
|---|---|---|---|---|---|---|
| 1 | 256 | 64 | 128 | 64 | 256 | 0 |
| 2 | 512 | 192 | 128 | 320 | 256 | 128 |
| 3 | 1024 | 448 | 128 | 832 | 256 | 384 | shape 4 (short/ short)

| MODE | length | ZL | L | M | R | ZR |
|---|---|---|---|---|---|---|
| 1 | 256 | 64 | 128 | 128 | 128 | 64 |
| 2 | 512 | 192 | 128 | 384 | 128 | 192 |
| 3 | 1024 | 448 | 128 | 896 | 128 | 448 |

FIG. 32
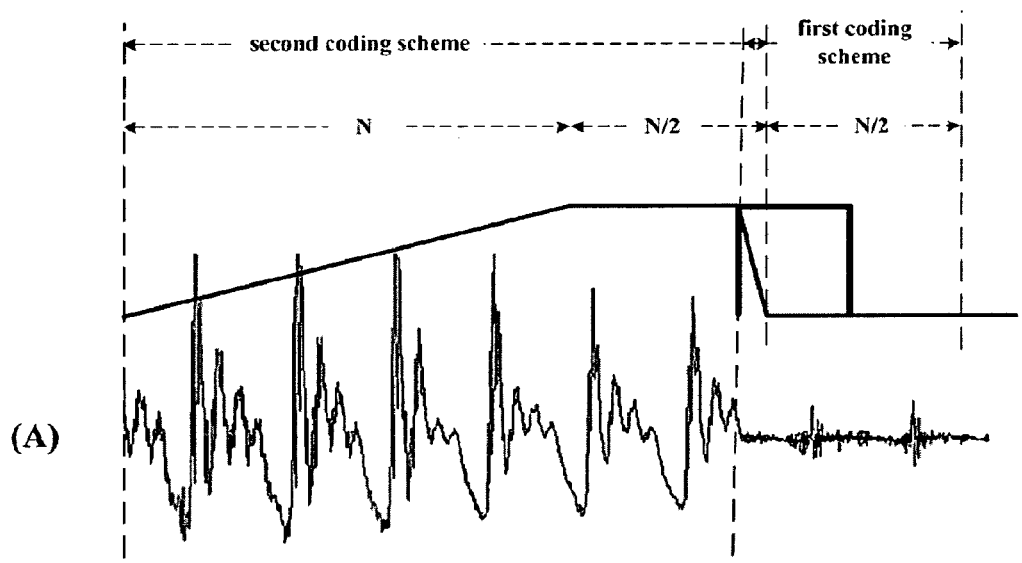
(A)
(B) 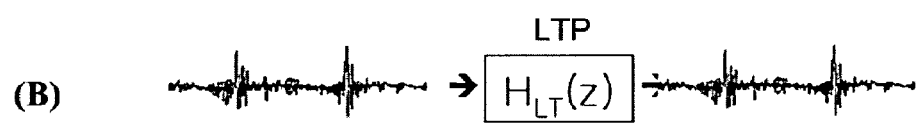
$$H_{LT}(z) = 1 - \beta z^{-D}$$

FIG. 36
(A)
(B)

METHOD AND AN APPARATUS FOR PROCESSING AN AUDIO SIGNAL

CROSS-REFERENCE TO RELATED APPLICATIONS

This application is a continuation application of U.S. patent application No. 13/391,992 of Feb. 23, 2012, which is National Phase of PCT/KR2010/006412 filed on Sep. 17, 2010, which claims priority under 35 U.S.C. 119 (e) to U.S. Provisional Application No. 61/243,514 filed on Sep. 17, 2009, the disclosure of which hereby incorporated by reference in its entirety into this application.

TECHNICAL FIELD

The present invention relates to an apparatus for processing an audio signal and method thereof. Although the present invention is suitable for a wide scope of applications, it is particularly suitable for encoding or decoding an audio signal.

BACKGROUND ART

Generally, an audio characteristic based coding scheme is applied to such an audio signal as a music signal, while a speech characteristic based coding scheme is applied to a speech signal.

DISCLOSURE OF THE INVENTION

Technical Problem

However, if a prescribed coding scheme is applied to a signal in which audio and speech characteristics are mixed with each other, audio coding efficiency is lowered or a sound quality is degraded.

Technical Solution

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which one of at least two kinds of coding schemes is applied to one frame or subframe.

Another object of the present invention is to provide an apparatus for processing an audio signal and method thereof, by which, in applying a different coding scheme to each frame or subframe of an audio signal including a series of frames, a mismatch generated from asymmetry of a window shape corresponding to each coding scheme can be solved.

Another object of the present invention is to provide an apparatus for processing an audio signal and method thereof, by which aliasing and the like can be cancelled when a rectangular window and a non-rectangular window come in contact with each other.

Another object of the present invention is to provide an apparatus for processing an audio signal and method thereof, by which, if a frequency domain scheme applied frame follows a linear prediction domain scheme applied frame, a window transmission for compensating a window length difference can be skipped.

Another object of the present invention is to provide an apparatus for processing an audio signal and method thereof, by which a mismatch attributed to asymmetry of a window shape, can be solved in a manner of switching a type of a window corresponding to a current frame according to a coding scheme of a following frame.

A further object of the present invention is to provide an apparatus for processing an audio signal and method thereof, by which bit efficiency in a frame of a linear prediction domain scheme can be raised in a manner of selectively applying a long-term prediction according to whether a previous frame is a frame of a frequency domain scheme.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

Advantageous Effects

Accordingly, the present invention provides the following effects or advantages.

First of all, the present invention compensates such a defect as aliasing due to inter-window asymmetry (e.g., asymmetry between a rectangular window and a non-rectangular window) and the like, thereby improving a sound quality of an audio signal considerably.

Secondly, as a scheme for compensating the aliasing and the like is applied, 100% overlapping between a rectangular window and a non-rectangular window become unnecessary. Therefore, the non-rectangular window can maintain a descending line or an ascending line with a gentle slope.

Thirdly, the present invention applies a non-rectangular window having a descending line or an ascending line with a gentle slope, whereby a crossing point between homogeneous windows (e.g., non-rectangular windows) is matched to a crossing point between heterogeneous windows (e.g., a non-rectangular window and a rectangular window).

Fourthly, as a crossing point of homogenous windows is matched to a crossing point of heterogeneous windows, a transition window for compensation of a window length difference becomes unnecessary and a direct transition between a first coding scheme (e.g., linear prediction domain scheme) and a second coding scheme (e.g., frequency domain scheme) becomes possible.

Fifthly, as the direct transition becomes possible, it is able to apply a window suitable for an audio signal characteristic of a corresponding block without using a window for solving a mismatch. Therefore, a sound quality can be considerably enhanced.

Sixthly, since a shape of a window corresponding to a non-rectangular window type is made to vary according to whether a short window is present at a previous or following block, TDAC condition is met. Therefore, a sound quality can be enhanced.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 17C and 17D are diagrams of a stop_start window combined with a first coding scheme window or a second coding scheme window (short window);

FIG. 18 is a diagram of a short window overlapped with a first coding scheme window or a second coding scheme window;

FIG. 21 is a table of inter-window paths or transitions;

FIG. 28 is a table of a window corresponding to a non-rectangular scheme among first coding schemes varying within Shape 1 to Shape 4;

FIG. 32 is a diagram for one examples of a signal waveform related to a long term prediction;

FIG. 36 is a diagram for explaining relations between products in which an audio signal processing apparatus according to one embodiment of the present invention is implemented.

BEST MODE

Figure 1:
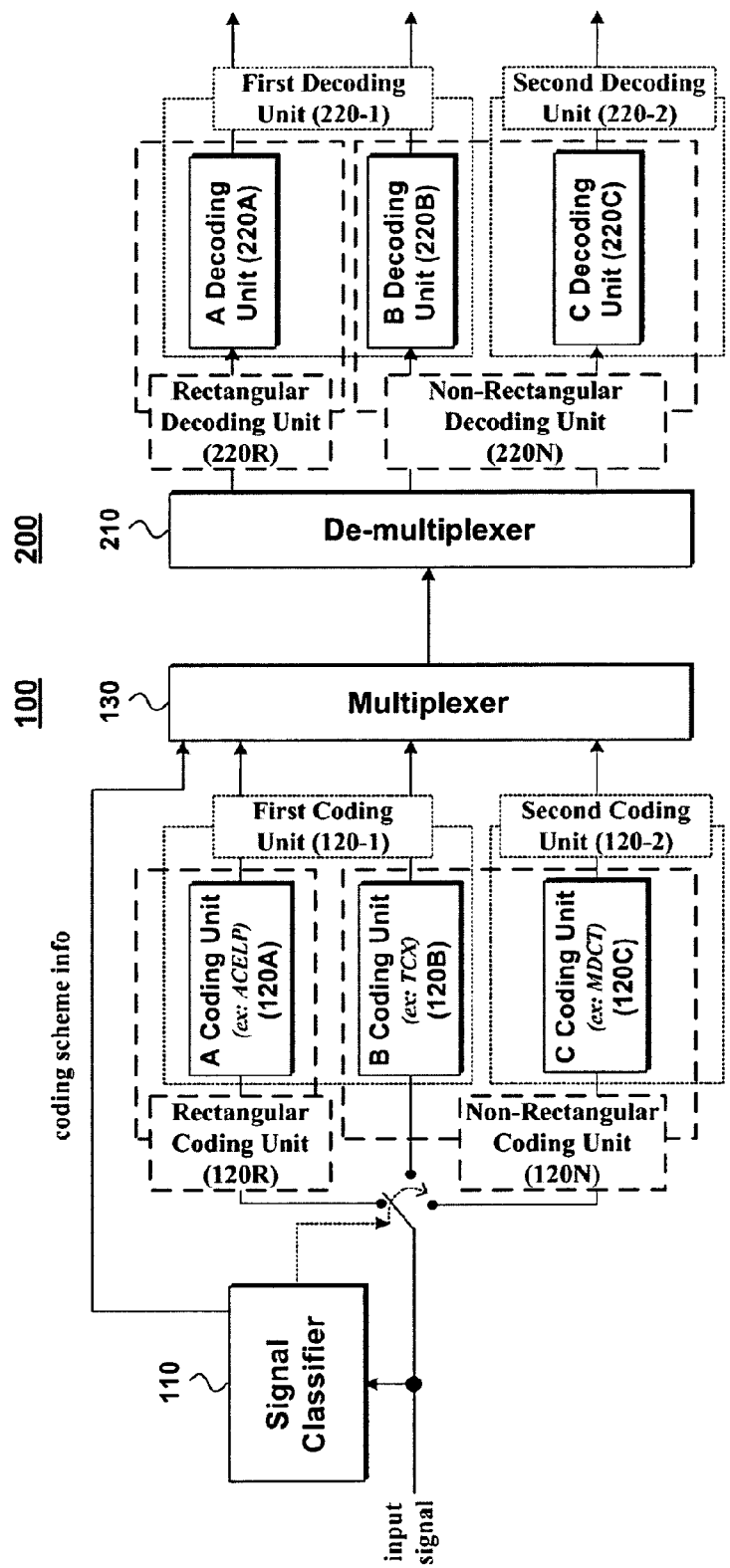
FIG. 1 is a schematic block diagram of an audio signal processing apparatus according the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method for processing an audio signal, comprising: receiving, by an audio processing apparatus, an audio signal including a first data of a first block encoded with rectangular coding scheme and a second data of a second block encoded with non-rectangular coding scheme; receiving a compensation signal corresponding to the second block; estimating a prediction of an aliasing part using the first data; obtaining a reconstructed signal for the second block based on the second data, the compensation signal and the prediction of aliasing part is provided.

According to the present invention, the rectangular coding scheme is to encode or decode with rectangular window, the non-rectangular coding scheme is to encode or decode with non-rectangular window.

According to the present invention, the compensation signal is generated based on a correction part and an error of aliasing part, the correction part corresponds to a difference related to asymmetry between rectangular window and non-rectangular window, the error of aliasing part corresponds to a difference between the aliasing part and the prediction of aliasing part.

According to the present invention, the aliasing part corresponds to overlapping part between the first block and non-rectangular window used for the non-rectangular coding scheme.

According to the present invention, the estimating of the prediction comprises: generating an output signal for the first block using the first data of the first block based on the rectangular window scheme; obtaining the prediction of the aliasing part using the output signal for the first block and the non-rectangular window.

According to the present invention, the reconstructed signal is approximate to a signal processed with rectangular window that differs from non-rectangular window used for the non-rectangular coding scheme.

According to the present invention, the obtaining of the reconstructed signal comprises: inverse-frequency-transforming the second data to generate a time-domain second signal; inverse-frequency-transforming the compensation signal to generate a time-domain compensation signal; obtaining the reconstructed signal, by adding the time-domain compensation signal to the time-domain second signal and the prediction of the aliasing part;

According to the present invention, the first block corresponds to one of frame and subframe, and the second block corresponds to one of frame and subframe.

To further achieve these and other advantages and in accordance with the purpose of the present invention, an apparatus for processing an audio signal, comprising: a de-multiplexer receiving an audio signal including a first data of a first block encoded with rectangular coding scheme and a second data of a second block encoded with non-rectangular coding scheme, and receiving a compensation signal corresponding to the second block; a rectangular decoding unit estimating a prediction of an aliasing part using the first data; and, a non-rectangular decoding unit obtaining a reconstructed signal for the second block based on the second data, the compensation signal and the prediction of aliasing part is provided.

According to the present invention, the rectangular coding scheme is to encode or decode with rectangular window, the non-rectangular coding scheme is to encode or decode with non-rectangular window.

According to the present invention, the compensation signal is generated based on a correction part and an error of aliasing part, the correction part corresponds to a difference related to asymmetry between rectangular window and non-rectangular window, the error of aliasing part corresponds to a difference between the aliasing part and the prediction of aliasing part.

According to the present invention, the aliasing part corresponds to overlapping part between the first block and non-rectangular window used for the non-rectangular coding scheme.

According to the present invention, the rectangular decoding unit configured to: generate an output signal for the first block using the first data of the first block based on the rectangular window scheme, and obtain the prediction of the aliasing part using the output signal for the first block and the non-rectangular window.

According to the present invention, the reconstructed signal is approximate to a signal processed with rectangular window that differs from non-rectangular window used for the non-rectangular coding scheme.

According to the present invention, the non-rectangular decoding unit configured to: inverse-frequency-transform the second data to generate a time-domain second signal; inverse-frequency-transform the compensation signal to generate a time-domain compensation signal; and, obtain the reconstructed signal, by adding the time-domain compensation signal to the time-domain second signal and the prediction of the aliasing part.

According to the present invention, the first block corresponds to one of frame and subframe, and the second block corresponds to one of frame and subframe.

To further achieve these and other advantages and in accordance with the purpose of the present invention, a method for processing an audio signal, comprising: receiving, by an audio processing apparatus, coding identification information indicating whether to apply a first coding scheme or a second coding scheme to a current frame, when the coding identification information indicates that the second coding scheme to the current frame, receiving window type information indicating a particular window for the current frame, from among a plurality of windows; identifying that a current window is a long_start window based on the window type information, wherein the long_start window follows only_long window of a previous frame, wherein the long_start window includes a gentle long_start window and a steep long_start window; and, when the first coding scheme is applied to a following frame, applying the gentle long_start window to the current frame, wherein: the gentle long_start window comprise a descending line with first slope, the steep long_start window comprise a descending line with second slope, the first slope is gentler than the second slope is provided.

According to the present invention, a width of the first slope is equal to two-times a width of the second slope.

According to the present invention, a width of the first slope corresponds to N/4 (where N is frame length).

According to the present invention, a width of the first slope corresponds to 256 samples, and wherein a width of the first slope is equal to ⅛ of length of the long_start window.

According to the present invention, the only_long window is horizontal-symmetry, and the long_start window is horizontal-asymmetry, the long_start window has zero part in a right half.

According to the present invention, center point of the descending line with the first slope or the second slope is at 3N/2 distance from a start point of the long_start window (where N is frame length).

According to the present invention, the first coding scheme is based on frequency-domain, and the second coding scheme is based on linear-prediction domain.

To further achieve these and other advantages and in accordance with the purpose of the present invention, an apparatus for processing an audio signal, comprising: a de-multiplexer receiving, by an audio processing apparatus, coding identification information indicating whether to apply a first coding scheme or a second coding scheme to a current frame, and, when the coding identification information indicates that the second coding scheme to the current frame, receiving window type information indicating a particular window for the current frame, from among a plurality of windows; a second coding unit identifying that current window is a long_start window based on the window type information, wherein the long_start window follows only_long window of a previous frame, wherein the long_start window includes a gentle long_start window and a steep long_start window, and, when the first coding scheme is applied to a following frame, applying the gentle long_start window to the current frame, wherein: the gentle long_start window comprise a descending line with first slope, the steep long_start window comprise a descending line with second slope, the first slope is gentler than the second slope is provided.

According to the present invention, a width of the first slope is equal to two-times a width of the second slope.

According to the present invention, wherein a width of the first slope corresponds to N/4 (where N is length of the current frame).

According to the present invention, wherein a width of the first slope corresponds to 256 samples, and wherein a width of the first slope is equal to ⅛ of length of the long_start window.

According to the present invention, the only_long window is horizontal-symmetry, and the long_start window is horizontal-asymmetry, the long_start window has zero part in a right half.

According to the present invention, center point of the descending line with the first slope or the second slope is at 3N/2 distance from a start point of the long_start window (where N is frame length).

According to the present invention, the first coding scheme is based on frequency-domain, and the second coding scheme is based on linear-prediction domain.

To further achieve these and other advantages and in accordance with the purpose of the present invention, a method for processing an audio signal, comprising: receiving, by an audio processing apparatus, an audio signal including a first data of a first block and a second data of a second block; receiving a compensation signal corresponding to the second block; obtaining a reconstructed signal for the second block based on the second data, the compensation signal and a window of the second block, wherein, when the first data is encoded with a rectangular coding scheme and the window of the second block belongs to transition window class, the window of the second block has ascending line with a first slope, wherein the first slope is gentler than a second slope is provided.

According to the present invention, when the first data is encoded with a non-rectangular coding scheme and the window of the second block belongs to the transition window class, the window of the second block has ascending line with the second slope.

According to the present invention, when the transition window class comprises long_stop window and stop_start window, and the long_stop window and the stop_start window are horizontal-asymmetry, and have a zero part in a left half.

According to the present invention, the compensation signal is received, when the first data is encoded with the rectangular coding scheme.

According to the present invention, the compensation signal is generated based on at least one of a difference related to asymmetry between rectangular window and non-rectangular window, and a difference between the aliasing part and prediction of aliasing part.

To further achieve these and other advantages and in accordance with the purpose of the present invention, an apparatus for processing an audio signal, comprising: a de-multiplexer receiving an audio signal including a first data of a first block and a second data of a second block, and receiving a compensation signal corresponding to the second block; a non-rectangular decoding unit obtaining a reconstructed signal for the second block based on the second data, the compensation signal and a window of the second block, wherein, when the first data is encoded with a rectangular coding scheme and the window of the second block belongs to transition window class, the window of the second block has ascending line with a first slope, wherein the first slope is gentler than a second slope is provided.

According to the present invention, when the first data is encoded with a non-rectangular coding scheme and the window of the second block belongs to the transition window class, the window of the second block has ascending line with the second slope.

According to the present invention, when the transition window class comprises long_stop window and stop_start window, and the long_stop window and the stop_start window are horizontal-asymmetry, and have a zero part in a left half.

According to the present invention, the compensation signal is received, when the first data is encoded with the rectangular coding scheme.

According to the present invention, the compensation signal is generated based on at least one of a difference related to asymmetry between rectangular window and non-rectangular window, and a difference between the aliasing part and prediction of aliasing part.

To further achieve these and other advantages and in accordance with the purpose of the present invention, a method for processing an audio signal, comprising: receiving, by an audio processing apparatus, an audio signal including a first data of a first block and a second data of a second block; receiving a compensation signal corresponding to the second block; obtaining a reconstructed signal for the second block based on the second data, the compensation signal and a window of the second block, wherein, when the first data is encoded with a rectangular coding scheme and the window of the second block belongs to transition window class, the window of the second block has ascending line with a first slope, wherein the first slope is gentler than a second slope is provided.

According to the present invention, when the first data is encoded with a non-rectangular coding scheme and the window of the second block belongs to the transition window class, the window of the second block has ascending line with the second slope.

According to the present invention, when the transition window class comprises long_stop window and stop_start window, and the long_stop window and the stop_start window are horizontal-asymmetry, and have a zero part in a left half.

According to the present invention, the compensation signal is received, when the first data is encoded with the rectangular coding scheme.

According to the present invention, the compensation signal is generated based on at least one of a difference related to asymmetry between rectangular window and non-rectangular window, and a difference between the aliasing part and prediction of aliasing part.

To further achieve these and other advantages and in accordance with the purpose of the present invention, an apparatus for processing an audio signal, comprising: a de-multiplexer receiving an audio signal including a first data of a first block and a second data of a second block, and receiving a compensation signal corresponding to the second block; a non-rectangular decoding unit obtaining a reconstructed signal for the second block based on the second data, the compensation signal and a window of the second block, wherein, when the first data is encoded with a rectangular coding scheme and the window of the second block belongs to transition window class, the window of the second block has ascending line with a first slope, wherein the first slope is gentler than a second slope is provided.

According to the present invention, when the first data is encoded with a non-rectangular coding scheme and the window of the second block belongs to the transition window class, the window of the second block has ascending line with the second slope.

According to the present invention, when the transition window class comprises long_stop window and stop_start window, and the long_stop window and the stop_start window are horizontal-asymmetry, and have a zero part in a left half.

According to the present invention, the compensation signal is received, when the first data is encoded with the rectangular coding scheme.

According to the present invention, the compensation signal is generated based on at least one of a difference related to asymmetry between rectangular window and non-rectangular window, and a difference between the aliasing part and prediction of aliasing part.

To further achieve these and other advantages and in accordance with the purpose of the present invention, a method for processing an audio signal, comprising: when a second coding scheme is applied to a current frame, receiving, by an audio processing apparatus, window type information indicating a particular window for the current frame from among a plurality of windows; and, applying a current window to the current frame based on the window type information, wherein, when a first coding scheme is applied to a previous frame, the plurality of window consists of a short window, a first transition window, a second transition window, wherein the short window has at least one ascending line which width is N/8, and the first transition window and the second transition window have an ascending line which width is N/4 (where N is frame length) is provided.

According to the present invention, length of short window, the first transition window and the second transition window is 2N.

According to the present invention, left half of short window, the first transition window and the second transition window corresponds to 1024 samples.

According to the present invention, cross point between the current window and a previous window is at N/2 distance from start of the current window.

According to the present invention, the first transition window have no zero part in right half, the second transition window have zero part in right half, the short window has a plurality of short parts which are overlapped together, and the short part has the ascending line and a descending line.

To further achieve these and other advantages and in accordance with the purpose of the present invention, a method for processing an audio signal, comprising: receiving, by an audio processing apparatus, an audio signal including a current frame encoded with a first coding scheme and a following frame encoded with a second coding scheme; receiving sub-coding identification information indicating at least one block of the current frame is encoded with a rectangular coding scheme or a non-rectangular coding scheme; when the sub-coding identification information indicates that at least last block of the current frame is encoded with the non-rectangular coding scheme, deciding a window shape including a first shape and a second shape for a current window, according to whether a following window for the following frame is a short window or not; applying the current window of the decided window shape to the current frame, wherein: the first shape has a descending line with first slope, the second shape has a descending line with second slope, and, the first slope is gentler than the second slope is provided.

According to the present invention, a width of the first slope corresponds to 256 samples or N/4 and a width of the second slope corresponds to 128 samples or N/8 (N is frame length).

According to the present invention, cross point between the current window and a following window is at N/2 distance from start of the following window.

According to the present invention, the first slope is matched to a slope of an ascending slope in non-short window, and the second slope is matched to, a slope of an ascending slope in the short window.

To further achieve these and other advantages and in accordance with the purpose of the present invention, an apparatus for processing an audio signal, comprising: a de-multiplexer, when a second coding scheme is applied to a current frame, receiving window type information indicating a particular window for the current frame from among a plurality of windows; a second coding unit applying a current window to the current frame based on the window type information, wherein, when a first coding scheme is applied to a previous frame, the plurality of window consists of a short window, a first transition window, a second transition window, wherein the short window has at least one ascending line which width is N/8, and the first transition window and the second transition window have an ascending line which width is N/4 (where N is frame length) is provided.

According to the present invention, length of short window, the first transition window and the second transition window is 2N.

According to the present invention, left half of short window, the first transition window and the second transition window corresponds to 1024 samples.

According to the present invention, cross point between the current window and a previous window is at N/2 distance from start of the current window.

According to the present invention, the first transition window have no zero part in right half, the second transition window have zero part in right half, the short window has a plurality of short parts which are overlapped together, and the short part has the ascending line and a descending line.

To further achieve these and other advantages and in accordance with the purpose of the present invention, an apparatus for processing an audio signal, comprising: a de-multiplexer receiving an audio signal including a current frame encoded with a first coding scheme and a following frame encoded with a second coding scheme, and receiving sub-coding identification information indicating at least one block of the current frame is encoded with a rectangular coding scheme or a non-rectangular coding scheme; a first coding unit, when the sub-coding identification information indicates that at least last block of the current frame is encoded with the non-rectangular coding scheme, deciding a window shape including a first shape and a second shape for a current window, according to whether a following window for the following frame is a short window or not; applying the current window of the decided window shape to the current frame, wherein: the first shape has a descending line with first slope, the second shape has a descending line with second slope, and, the first slope is gentler than the second slope is provided.

According to the present invention, a width of the first slope corresponds to 256 samples or N/4 and a width of the second slope corresponds to 128 samples or N/8 (N is frame length).

According to the present invention, cross point between the current window and a following window is at N/2 distance from start of the following window.

According to the present invention, the first slope is matched to a slope of an ascending slope in non-short window, and the second slope is matched to a slope of an ascending slope in the short window.

To further achieve these and other advantages and in accordance with the purpose of the present invention, a method for processing an audio signal, comprising: receiving, by an audio processing apparatus, coding identification information indicating whether to apply a first coding scheme or a second coding scheme to a current frame; when the coding identification information indicates that the second coding scheme is applied to the current frame, receiving window type information indicating a particular window for the current frame, from among a plurality of windows; identifying that a current window is a long_stop window based on the window type information, wherein the long_stop window is followed by only_long window of a following frame, wherein the long_stop window includes a gentle long_stop window and a steep long_stop window; and, when the first coding scheme is applied to a previous frame, applying the gentle long_stop window to the current frame, wherein: the gentle long_stop window comprise an ascending line with first slope, the steep long_stop window comprise an ascending line with second slope, and, the first slope is gentler than the second slope.

According to the present invention, a width of the first slope is equal to two-times a width of the second slope.

According to the present invention, a width of the first slope corresponds to N/4 (where N is frame length).

According to the present invention, a width of the first slope corresponds to 256 samples, and wherein a width of the first slope is equal to ⅛ of length of the long_stop window.

According to the present invention, the only_long window is horizontal-symmetry, and the long_stop window is horizontal-asymmetry, the long_stop window has zero part in a left half.

According to the present invention, center point of the ascending line with the first slope or the second slope is at N/2 distance from a start point of the long_stop window (where N is frame length).

According to the present invention, the first coding scheme is based on frequency-domain, and the second coding scheme is based on linear-prediction domain.

To further achieve these and other advantages and in accordance with the purpose of the present invention, an apparatus for processing an audio signal, comprising: a de-multiplexer receiving coding identification information indicating whether to apply a first coding scheme or a second coding scheme to a current frame, and when the coding identification information indicates that the second coding scheme is applied to the current frame, receiving window type information indicating a particular window for the current frame, from among a plurality of windows; and, a second coding unit and identifying that a current window is a long_stop window based on the window type information, wherein the long_stop window is followed by only_long window of a following frame, wherein the long_stop window includes a gentle long_stop window and a steep long_stop window; and, when the first coding scheme is applied to a previous frame, applying the gentle long_stop window to the current frame, wherein: the gentle long_stop window comprise an ascending line with first slope, the steep long_stop window comprise an ascending line with second slope, and, the first slope is gentler than the second slope.

According to the present invention, a width of the first slope is equal to two-times a width of the second slope.

According to the present invention, a width of the first slope corresponds to N/4 (where N is frame length).

According to the present invention, a width of the first slope corresponds to 256 samples, and wherein a width of the first slope is equal to ⅛ of length of the long_stop window.

According to the present invention, wherein the only_long window is horizontal-symmetry, and the long_stop window is horizontal-asymmetry, the long_stop window has zero part in a left half.

According to the present invention, center point of the ascending line with the first slope or the second slope is at N/2 distance from a start point of the long_stop window (where N is frame length).

According to the present invention, the first coding scheme is based on frequency-domain, and the second coding scheme is based on linear-prediction domain.

To further achieve these and other advantages and in accordance with the purpose of the present invention, a method for processing an audio signal, comprising: receiving, by an audio processing apparatus, coding identification information indicating whether to apply a first coding scheme or a second coding scheme to a current frame; when the coding identification information indicates that the second coding scheme is applied to the current frame, receiving window type information indicating a particular window for the current frame, from among a plurality of windows; identifying that a current window is a stop_start window based on the window type information, wherein the stop_start window follows one of a long_start window, a short window and a window of the first coding scheme for a previous frame, wherein the stop_start window is followed by one of a long_stop window, a short window and a window of the first coding scheme for a following frame, wherein the stop_start window includes a gentle-gentle stop_start window, a gentle-steep stop_start window, a steep-gentle stop_start window and a steep-steep stop_start window; when the first coding scheme is applied to a previous frame, applying one of the gentle-gentle stop_start window and the gentle-steep stop_start window to the current frame; and, when the first coding scheme is applied to a following frame, applying one of the gentle-gentle stop_start window and the steep-gentle stop_start window to the current frame, wherein: the gentle-gentle stop_start window comprise an ascending line with first slope and a descending line with the first slope, the gentle-steep stop_start window comprise an ascending line with the first slope and a descending line with second slope, the steep-gentle stop_start window comprise an ascending line with the second slope and a descending line with first slope, the steep-steep stop_start window comprise an ascending line with the second slope and a descending line with the second slope, and, the first slope is gentler than the second slope.

According to the present invention, a width of the first slope is equal to two-times a width of the second slope.

According to the present invention, a width of the first slope corresponds to N/4 (where N is frame length).

According to the present invention, a width of the first slope corresponds to 256 samples, and wherein a width of the first slope is equal to ⅛ of length of the stop_start window.

According to the present invention, the short window is horizontal-symmetry, the long_start window and the long_stop window are horizontal-asymmetry, the long_stop window has zero part in a left half, and the long_start window has zero part in a right half.

According to the present invention, wherein center point of the ascending line with the first slope or the second slope is at N/2 distance from a start point of the stop_start window (where N is frame length), center point of the descending line with the first slope or the second slope is at 3N/2 distance from a start point of the stop_start window (where N is frame length).

According to the present invention, the first coding scheme is based on frequency-domain, and the second coding scheme is based on linear-prediction domain.

To further achieve these and other advantages and in accordance with the purpose of the present invention, an apparatus for processing an audio signal, comprising: a de-multiplexer receiving coding identification information indicating whether to apply a first coding scheme or a second coding scheme to a current frame, and, when the coding identification information indicates that the second coding scheme is applied to the current frame, receiving window type information indicating a particular window for the current frame, from among a plurality of windows; and, a second coding unit identifying that a current window is a stop_start window based on the window type information, wherein the stop_start window follows one of a long_start window, a short window and a window of the first coding scheme for a previous frame, wherein the stop_start window is followed by one of a long_stop window, a short window and a window of the first coding scheme for a following frame, wherein the stop_start window includes a gentle-gentle stop_start window, a gentle-steep stop_start window, a steep-gentle stop_start window and a steep-steep stop_start window, and, when the first coding scheme is applied to a previous frame, applying one of the gentle-gentle stop_start window and the gentle-steep stop_start window to the current frame, when the first coding scheme is applied to a following frame, applying one of the gentle-gentle stop_start window and the steep-gentle stop_start window to the current frame, wherein: the gentle-gentle stop_start window comprise an ascending line with first slope and a descending line with the first slope, the gentle-steep stop_start window comprise an ascending line with the first slope and a descending line with second slope, the steep-gentle stop_start window comprise an ascending line with the second slope and a descending line with first slope, the steep-steep stop_start window comprise an ascending line with the second slope and a descending line with the second slope, and, the first slope is gentler than the second slope.

According to the present invention, a width of the first slope is equal to two-times a width of the second slope.

According to the present invention, a width of the first slope corresponds to N/4 (where N is frame length).

According to the present invention, a width of the first slope corresponds to 256 samples, and wherein a width of the first slope is equal to ⅛ of length of the stop_start window.

According to the present invention, the short window is horizontal-symmetry, the long_start window and the long_stop window are horizontal-asymmetry, the long_stop window has zero part in a left half, and the long_start window has zero part in a right half.

According to the present invention, center point of the ascending line with the first slope or the second slope is at N/2 distance from a start point of the stop_start window (where N is frame length), center point of the descending line with the first slope or the second slope is at 3N/2 distance from a start point of the stop_start window (where N is frame length).

According to the present invention, the first coding scheme is based on frequency-domain, and the second coding scheme is based on linear-prediction domain.

To further achieve these and other advantages and in accordance with the purpose of the present invention, a method for processing an audio signal, comprising: receiving, by an audio processing apparatus, coding identification information indicating whether to apply a first coding scheme or a second coding scheme to a current frame, when the coding identification information indicates that the second coding scheme is applied to the current frame, receiving window type information indicating a particular window for the current frame, from among a plurality of windows; identifying that a current window is a short window based on the window type information, wherein the short window has one fixed shape which comprises a plurality of short parts overlapped together, and, applying the short window of the fixed shape to the current frame, wherein the short window follows one of a long_start window, a stop_start window and a window of the first coding scheme for a previous frame, wherein the short window is followed by one of a long_stop window, the stop_start window and the window of the first coding scheme for a following frame.

According to the present invention, wherein the short part has an ascending line and a descending line, wherein a width of the ascending line is identical to a width of the descending line.

According to the present invention, the width of the ascending line and the width of the descending line correspond to N/8 (wherein N is frame length).

According to the present invention, cross point between the short window and a window for the previous frame is at N/2 distance from start of the short window, cross point between the short window and a window for the following frame is at 3N/2 distance from start of the short window (where N is frame length).

According to the present invention, the method further comprises receiving a frame data of the following frame; when a rectangular coding scheme from among the first coding scheme is applied to the following frame, receiving a compensation signal for the following frame; and, obtaining a reconstructed signal for the following frame based on the following data of the following frame, the compensation signal and the window of the first coding scheme.

According to the present invention, the compensation signal is generated based on at least one of a difference related to asymmetry between a rectangular window and a non-rectangular window, and a difference between the aliasing part and prediction of aliasing part.

To further achieve these and other advantages and in accordance with the purpose of the present invention, an apparatus for processing an audio signal, comprising: receiving, by an audio processing apparatus, coding identification information indicating whether to apply a first coding scheme or a second coding scheme to a current frame, when the coding identification information indicates that the second coding scheme is applied to the current frame, receiving window type information indicating a particular window for the current frame, from among a plurality of windows; identifying that a current window is a short window based on the window type information, wherein the short window has one fixed shape which comprises a plurality of short parts overlapped together, and, applying the short window of the fixed shape to the current frame, wherein the short window follows one of a long_start window, a stop_start window and a window of the first coding scheme for a previous frame, wherein the short window is followed by one of a long_stop window, the stop_start window and the window of the first coding scheme for a following frame.

According to the present invention, the short part has an ascending line and a descending line, wherein a width of the ascending line is identical to a width of the descending line.

According to the present invention, the width of the ascending line and the width of the descending line correspond to N/8 (wherein N is frame length).

According to the present invention, cross point between the short window and a window for the previous frame is at N/2 distance from start of the short window, cross point between the short window and a window for the following frame is at 3N/2 distance from start of the short window (where N is frame length).

According to the present invention, the apparatus further comprises receiving a frame data of the following frame; when a rectangular coding scheme from among the first coding scheme is applied to the following frame, receiving a compensation signal for the following frame; and, obtaining a reconstructed signal for the following frame based on the following data of the following frame, the compensation signal and the window of the first coding scheme.

According to the present invention, the compensation signal is generated based on at least one of a difference related to asymmetry between a rectangular window and a non-rectangular window, and a difference between the aliasing part and prediction of aliasing part.

To further achieve these and other advantages and in accordance with the purpose of the present invention, a method for processing an audio signal, comprising: receiving, by an audio processing apparatus, an audio signal including a current frame encoded with a first coding scheme and a following frame encoded with a second coding scheme; receiving sub-coding identification information indicating at least one block of the current frame is encoded with a rectangular coding scheme or a non-rectangular coding scheme; when the sub-coding identification information indicates that at least last block of the current frame is encoded with the non-rectangular coding scheme, deciding a window shape including a first shape and a second shape for a current window, according to whether a following window for the following frame is a short window or not; applying the current window of the decided window shape to the current frame, wherein: the first shape has a descending line with first slope, the second shape has a descending line with second slope, and, the first slope is gentler than the second slope.

According to the present invention, a width of the first slope corresponds to 256 samples or N/4 and a width of the second slope corresponds to 128 samples or N/8 (N is frame length).

According to the present invention, cross point between the current window and a following window is at N/2 distance from start of the following window.

According to the present invention, the first slope is matched to a slope of an ascending slope in non-short window, and the second slope is matched to a slope of an ascending slope in the short window.

To further achieve these and other advantages and in accordance with the purpose of the present invention, an apparatus for processing an audio signal, comprising: a de-multiplexer receiving an audio signal including a current frame encoded with a first coding scheme and a following frame encoded with a second coding scheme, and receiving sub-coding identification information indicating at least one block of the current frame is encoded with a rectangular coding scheme or a non-rectangular coding scheme; a first coding unit, when the sub-coding identification information indicates that at least last block of the current frame is encoded with the non-rectangular coding scheme, deciding a window shape including a first shape and a second shape for a current window, according to whether a following window for the following frame is a short window or not; applying the current window of the decided window shape to the current frame, wherein: the first shape has a descending line with first slope, the second shape has a descending line with second slope, and, the first slope is gentler than the second slope.

According to the present invention, a width of the first slope corresponds to 256 samples or N/4 and a width of the second slope corresponds to 128 samples or N/8 (N is frame length).

According to the present invention, cross point between the current window and a following window is at N/2 distance from start of the following window.

According to the present invention, the first slope is matched to a slope of an ascending slope in non-short window, and the second slope is matched to a slope of an ascending slope in the short window.

It is to be understood that both the foregoing general description and the following detailed description are exemplary and explanatory and are intended to provide further explanation of the invention as claimed.

Mode For Invention

Reference will now be made in detail to the preferred embodiments of the present invention, examples of which are illustrated in the accompanying drawings. First of all, terminologies or words used in this specification and claims are not construed as limited to the general or dictionary meanings and should be construed as the meanings and concepts matching the technical idea of the present invention based on the principle that an inventor is able to appropriately define the concepts of the terminologies to describe the inventor's invention in best way. The embodiment disclosed in this disclosure and configurations shown in the accompanying drawings are just one preferred embodiment and do not represent all technical idea of the present invention. Therefore, it is understood that the present invention covers the modifications and variations of this invention provided they come within the scope of the appended claims and their equivalents at the timing point of filing this application.

According to the present invention, terminologies not disclosed in this specification can be construed as the following meanings and concepts matching the technical idea of the present invention. Specifically, 'coding' can be construed as 'encoding' or 'decoding' selectively and 'information' in this disclosure is the terminology that generally includes values, parameters, coefficients, elements and the like and its meaning can be construed as different occasionally, by which the present invention is non-limited.

In this disclosure, in a broad sense, an audio signal is conceptionally discriminated from a video signal and designates all kinds of signals that can be auditorily identified. In a narrow sense, the audio signal means a signal having none or small quantity of speech characteristics. Audio signal of the present invention should be construed in a broad sense. Yet, the audio signal of the present invention can be understood as an audio signal in a narrow sense in case of being used as discriminated from a speech signal.

Although coding is specified to encoding only, it can be construed as including both encoding and decoding.

FIG. 1 is a schematic block diagram of an audio signal processing apparatus according the present invention.

Referring to FIG. 1, an encoder 100 of an audio signal processing apparatus according the present invention includes a pair of coding units (i.e., a rectangular coding unit 120R and a non-rectangular coding unit 120N or a first coding unit 120-1 and a second coding unit 120-2) and is able to further include a signal classifier 110 and a multiplexer 130.

In this case, the rectangular coding unit 120R is a coding unit to which a rectangular coding scheme is applied. In particular, the rectangular coding scheme means a coding scheme of applying a window having a rectangular shape, while a non-rectangular coding scheme means a coding scheme of applying a window having a non-rectangular shape.

Moreover, the first and second coding units 120-1 and 120-2 are units for applying first and second coding schemes based on different domains, respectively. In this case, the domains can include a linear prediction domain, a frequency domain, a time domain and the like. For instance, the first coding scheme is a coding scheme based on the linear prediction domain and the second coding scheme is a coding scheme based on the frequency domain. And, definitions and properties according to domain types shall be descried in detail later.

The encoder 100 is able to include three specific coding units (i.e., A coding unit 120A, B coding unit 120B and C coding unit 120C). For example shown in FIG. 1, A coding scheme applied to the A coding unit 120A is a rectangular coding scheme and corresponds to a first coding scheme. B coding scheme applied to the B coding unit 120B is a non-rectangular coding scheme and corresponds to a first coding scheme. C coding scheme applied to the C coding unit 120C is a non-rectangular coding scheme and corresponds to a second coding scheme. As mentioned in the foregoing description, the drawing shown in FIG. 1 is just exemplary, by which the present invention is non-limited. For clarity and convenience of the following description, the example shown in FIG. 1 is taken as a reference.

Optionally, the A, B and C coding schemes can correspond to ACELP (algebraic code excited linear prediction), TCX (transform coded excitation) and MDCT (modified discrete Fourier transform), respectively, by which the present invention is non-limited. The A, B and C coding schemes shall be described in detail with reference to details of the rectangular coding scheme, the non-rectangular coding scheme, the first coding scheme and the second coding scheme later.

The signal classifier 110 analyzes characteristics of an input audio signal and then determines to apply which one of the above-mentioned at least two coding schemes to a current frame or subframe based on the analyzed characteristics. According to the determination, coding scheme information is generated. As mentioned in the foregoing description, the at least two coding schemes correspond to the rectangular and non-rectangular coding schemes, the first and second coding schemes or the A to C coding schemes, by which the present invention is non-limited.

For instance, in case of the examples shown in FIG. 1, the coding scheme information can include coding identification information and sub-coding identification information. In this case, the coding identification information indicates either the first coding scheme or the second coding scheme for a current frame. In case that a current frame corresponds to the first coding scheme, the sub-coding identification information is the information indicating whether the first coding scheme is the A coding scheme or the B coding scheme per frame or subframe.

Afterwards, the signal classifier 110 generates the coding scheme information and then delivers it to the multiplexer 130.

Meanwhile, under the control of the signal classifier 110, the input signal is classified per frame or subframe and is then inputted to the rectangular/non-rectangular coding unit 120R/120N or the first/second coding unit 120-1/120-2. In case of the example shown in FIG. 1, the input signal is inputted one of the A to C coding units 102A to 120C.

In case of the example shown in FIG. 1, each of the A to C coding units 120A to 120C delivers data, which is a result from encoding the input signal by the corresponding coding scheme, to the multiplexer 120.

The multiplexer 130 generates at least bitstream by multiplexing the coding scheme information and the data which is the result of the coding performed by the corresponding unit.

Meanwhile, a decoder 200 of the audio signal processing apparatus according to the present invention includes at least two decoding units 220R and 220N or 220-1 and 220-2 and is able to further include a demultiplexer 210. In this case, the at least two decoding units are components in aspect of decoding to correspond to the former at least two coding units and include a rectangular decoding unit 220R and a non-rectangular decoding unit 220N (or a first decoding unit 220-1 and a second decoding unit 220-2), respectively. In a manner similar to that of the encoder 100, the at least two decoding units can include A to C decoding units 220A to 220C, respectively.

A rectangular coding scheme applied by the rectangular decoding unit 220R and a non-rectangular coding scheme applied by the non-rectangular decoding unit 220N are as good as those explained in the foregoing description. And, a first coding scheme applied by the first decoding unit 220-1 and a second coding scheme applied by the second decoding unit 220-2 are as god as those explained in the foregoing description. As mentioned in the foregoing description, in case that the A to C decoding units 220A to 220C are included as shown in FIG. 1, A to C coding schemes used by the respective coding units shall be described in detail later.

Afterwards, the demultiplexer 210 extracts the coding scheme information and the data per frame or subframe from the at least one bitstream. The extracted data is forwarded to the corresponding decoding unit 220A, 220B or 220C according to the coding scheme information. Finally, each of the decoding units decodes the data by the corresponding decoding scheme to generate an output audio signal.

In the following description, embodiments of the audio signal processing apparatus according to the present invention shown in FIG. 1 are described in order.

Figure 2:
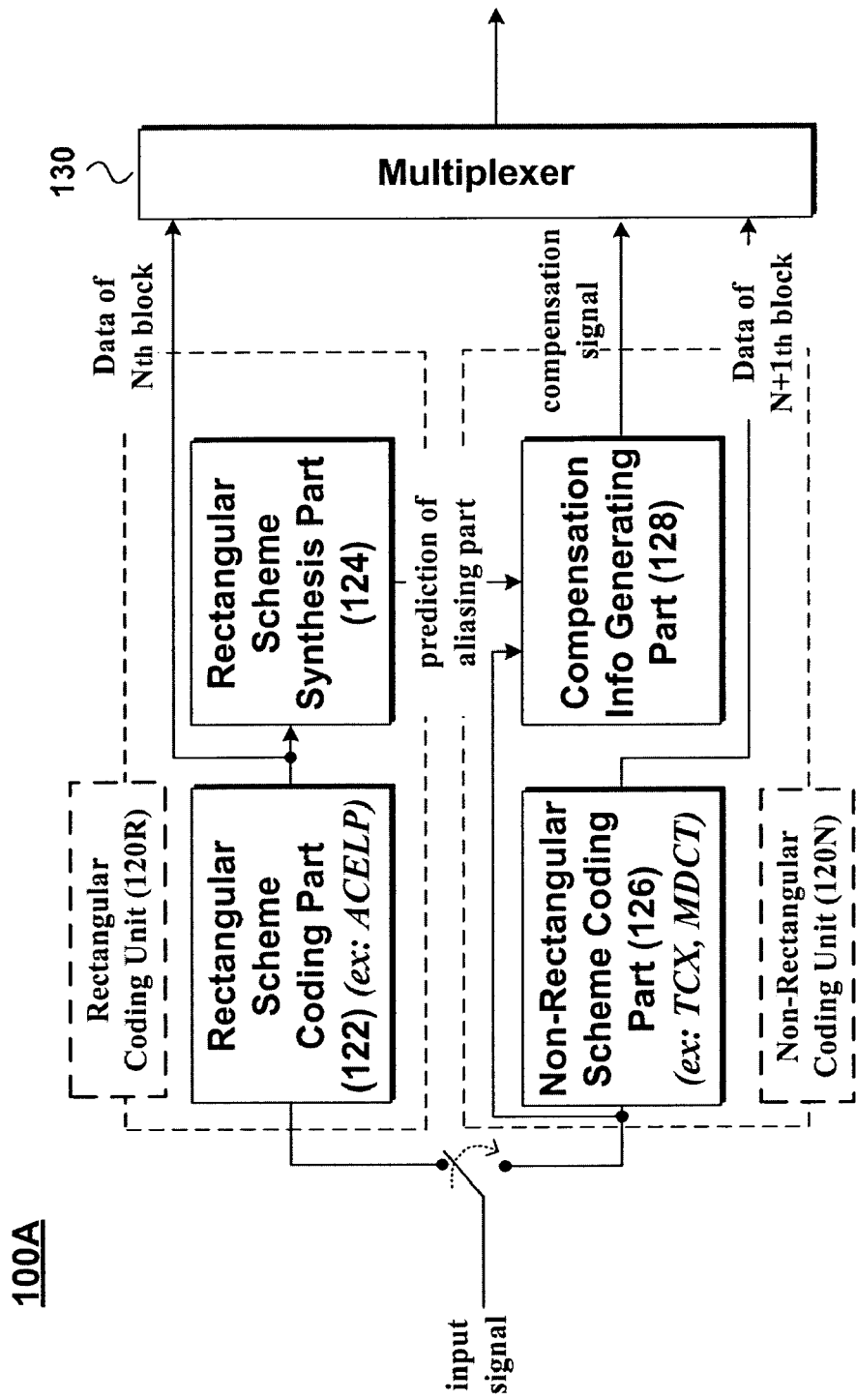
FIG. 2 is a block diagram of an encoder according to a first embodiment of the present invention.
Figure 3:
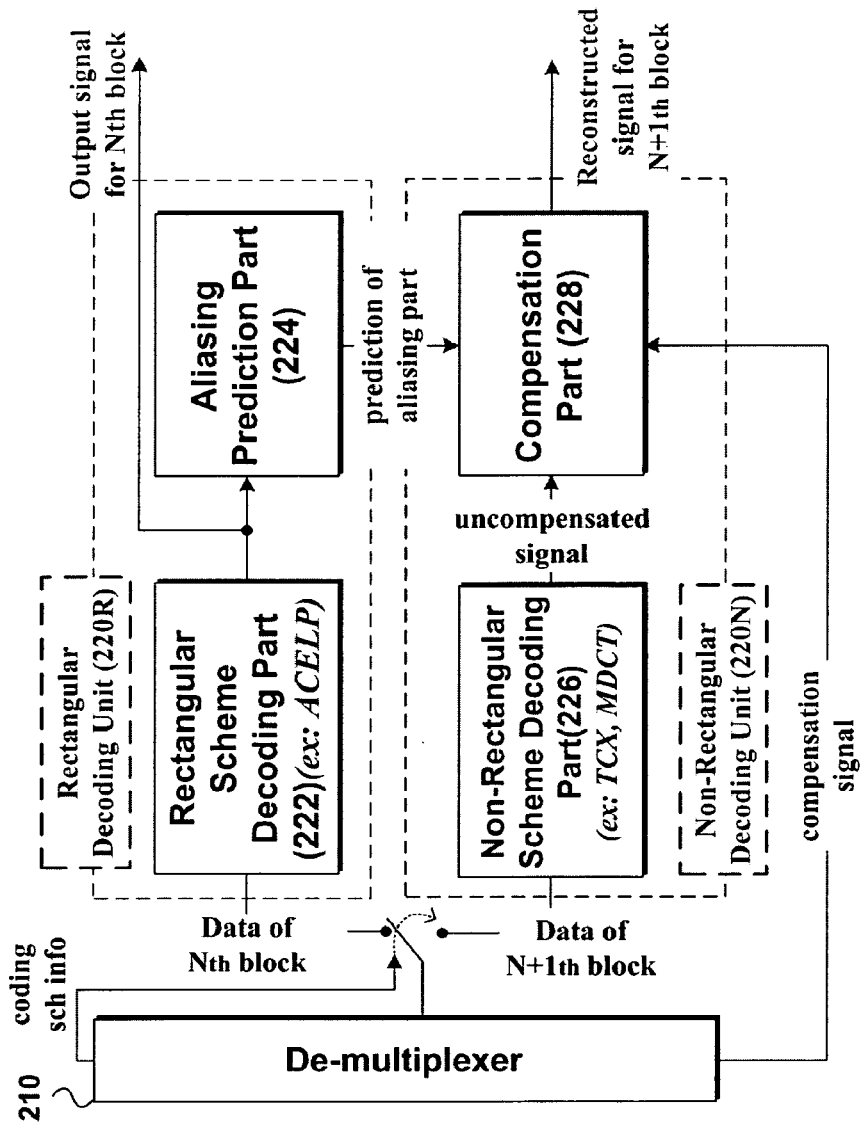
FIG. 3 is a block diagram of a decoder according to a first embodiment of the present invention.

FIG. 2 is a block diagram of an encoder according to a first embodiment of the present invention, and FIG. 3 is a block diagram of a decoder according to a first embodiment of the present invention. In particular, the first embodiments relates to an embodiment for compensating such a defect as aliasing and the like when a block encoded by a rectangular coding scheme come in contact with a block encoded by a non-rectangular coding scheme.

Referring to FIG. 2, like the former encoder 100 shown in FIG. 1, an encoder 100A according to a first embodiment includes a rectangular coding unit 120R and a non-rectangular coding unit 120N and is able to further include a multiplexer 130. In particular, the rectangular coding unit 120R includes a rectangular scheme coding part 122 and a rectangular scheme synthesis part 124. And, the non-rectangular coding unit 120N includes a compensation information generating part 128 and is able to further include a non-rectangular scheme coding part 126.

First of all, an input signal is divided by a unit of block and is then inputted to the rectangular coding unit 120R or the non-rectangular coding unit 120N per block. In this case, the block is a unit corresponding to a frame or a subframe.

Figure 4:
FIG. 4 is a diagram of an audio signal configured by a block unit, to which a different coding scheme is applied per frame (or subframe)
Figure 5:
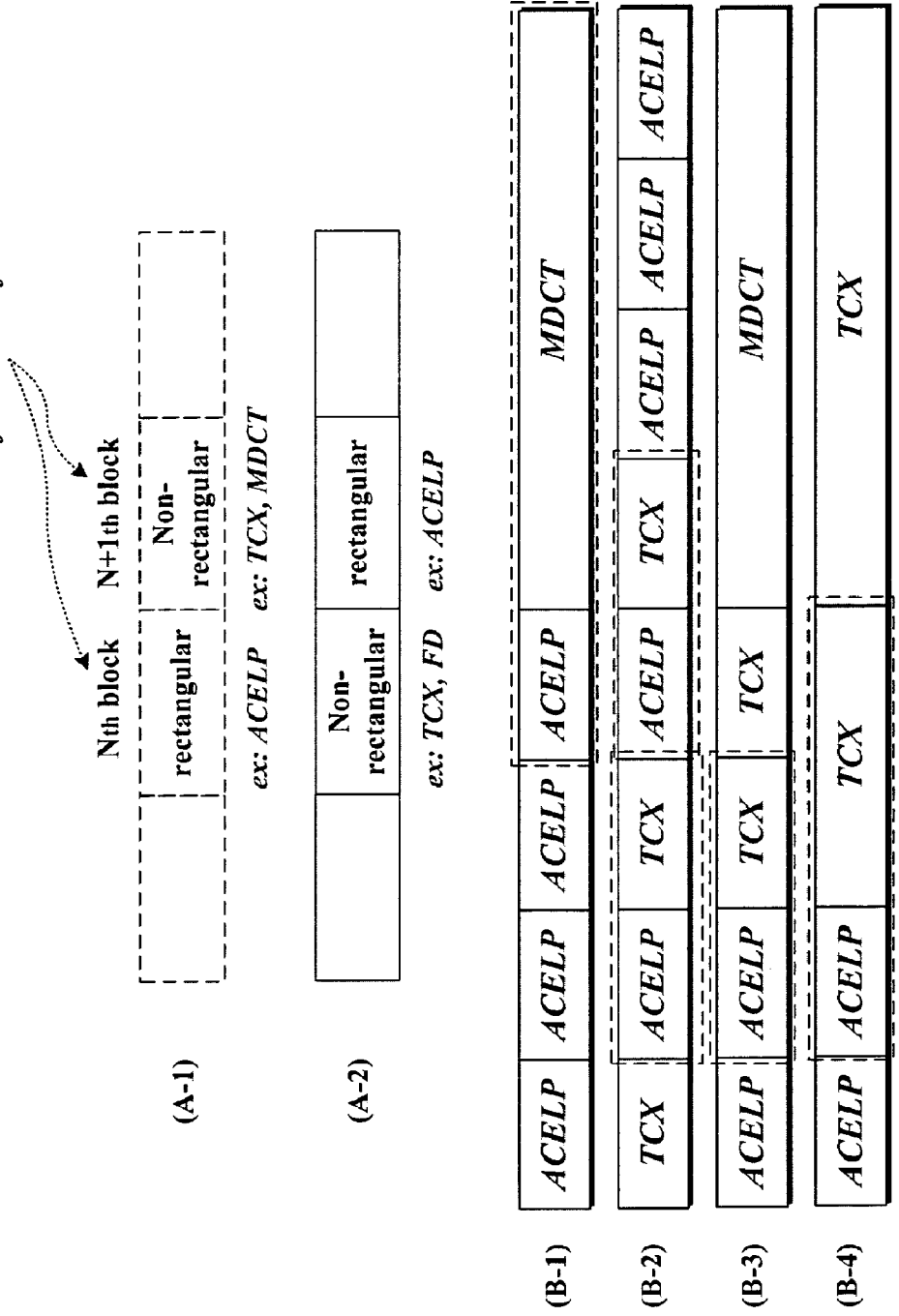
FIG. 5 is a diagram for transition to a heterogeneous coding scheme (i.e., rectangular coding scheme and non-rectangular coding scheme)

In the following description, a coding scheme per frame (e.g., rectangular coding scheme, non-rectangular coding scheme) is examined with reference to FIG. 4 and FIG. 5 and various methods for compensating a defect (e.g., aliasing, etc.) generated from a transition to a heterogeneous coding scheme (e.g., rectangular coding scheme or non-rectangular coding scheme) are described with reference to FIGS. 6 to 11. FIGS. 4 to 11 are preferentially described and the components shown in FIG. 2 and FIG. 3 shall be described again.

FIG. 4 shows a configuration unit of an audio signal and a coding scheme per configuration unit.

Referring to FIG. 4, it can be observed that an audio signal is configured with a series of frames including an $i^{th}$ frame (frame i) and an $(i+1)^{th}$ frame (frame i+1). In particular, it can be recognized that a single frame includes a plurality of subframes (e.g., 4 subframes). Moreover, FIG. 4 shows that a different coding scheme is applicable to each frame or subframe. In particular, FIG. 4 shows an example that there are three kinds of coding schemes [i.e., A coding scheme (ACELP), B coding scheme (TCX) and C coding scheme (FD)]. For instance, a frame can be configured with a plurality of subframes (e.g., 4 subframes). And, the A coding scheme (e.g., ACELP) is applicable per subframe, as shown in an $i^{th}$ frame shown FIG. 4 (A). The B coding scheme (e.g., TCX) is applicable to 1 subframe, 2 contiguous subframes and 4 contiguous subframes (i.e., one frame), as shown in an $i^{th}$ frame of FIG. 4 (B) and $i^{th}$ and $(i+1)^{th}$ frames shown in FIG. 4 (D). The C coding scheme (e.g., FD) is applicable not by a subframe unit but by a frame unit, as shown in FIG. 4 (A) and FIG. 4 (B), by which the present invention is non-limited.

FIG. 5 is a diagram for transition to a heterogeneous coding scheme (i.e., rectangular coding scheme and non-rectangular coding scheme).

Referring to FIG. 5 (A-1), a transition in $N^{th}$ block is made to a rectangular coding scheme and a transition in $(N+1)^{th}$ block is made to a non-rectangular coding scheme. On the contrary, referring to FIG. 5 (A-2), a transition in $N^{th}$ block is made to a non-rectangular coding scheme and a transition in $(N+1)^{th}$ block is made to a rectangular coding scheme. In this case, a block can correspond to a frame or subframe explained in the foregoing description. Namely, the $N^{th}$ or $(N+1)^{th}$ frame or subframe can include a frame or subframe. In particular, total four kinds of combinations (e.g., frame-frame, frame-subframe, subframe-frame and subframe-frame) are possible.

The example of the transition from the rectangular coding scheme to the non-rectangular coding scheme, as shown in FIG. 5 (A-1), can be discovered from the former cases shown in FIG. 4 (A) to FIG. 4 (D).

As mentioned in the foregoing description with reference to FIG. 1, the A coding scheme (ACELP) corresponds to the rectangular coding scheme, while each of the B coding scheme (TCX) and the C coding scheme (FD) corresponds to the non-rectangular coding scheme. The case (i.e., FIG. 5 (A-1)) of the transition from the A coding scheme (ACELP) to the B coding scheme (TCX) or the C coding scheme (FD) corresponds to one of the parts indicated by dotted line shown in FIG. 5 (B-1) to FIG. 5 (B-4).

On the contrary, the case [i.e., FIG. 5 (A-2)] of the transition from the non-rectangular coding scheme to the rectangular coding scheme, i.e., the case of the transition from the B coding scheme (TCX) or the C coding scheme (FD) to the A coding scheme (ACELP) is not indicated in FIG. 5 (B-1) to FIG. 5 (B-4) but can be discovered from two or three locations (e.g., $1^{st}$ and $2^{nd}$ blocks in FIG. 5 (B-2), etc.).

Thus, such a defect as aliasing and the like can be generated due to asymmetry from a location at which a rectangular window and a non-rectangular window come in contact with each other. In the following description, a method of compensating this defect is described with reference to FIGS. 6 to 9.

Figure 6:
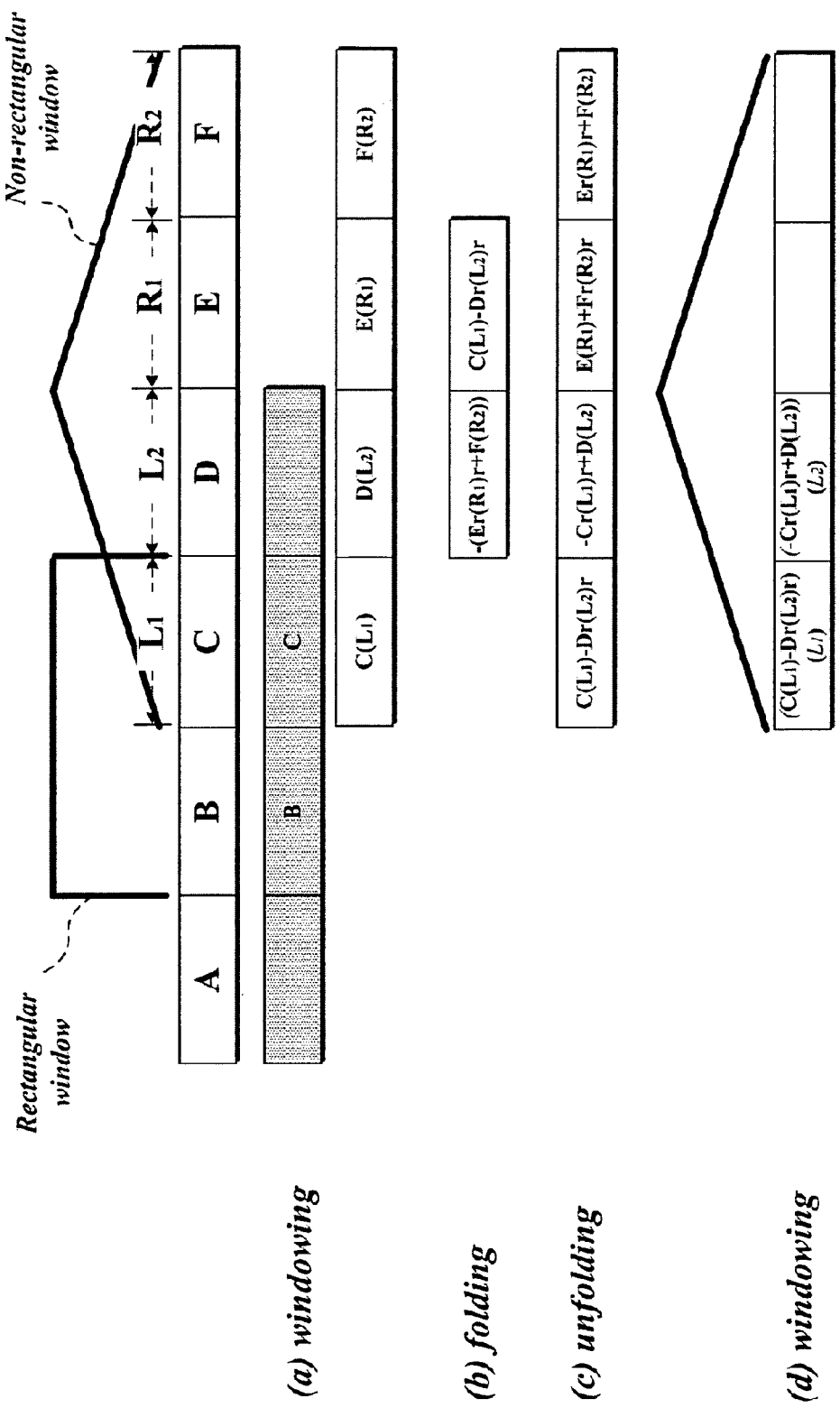
FIG. 6 is a diagram for characteristics when a rectangular window and a non-rectangular window are overlapped with each other.
Figure 7:
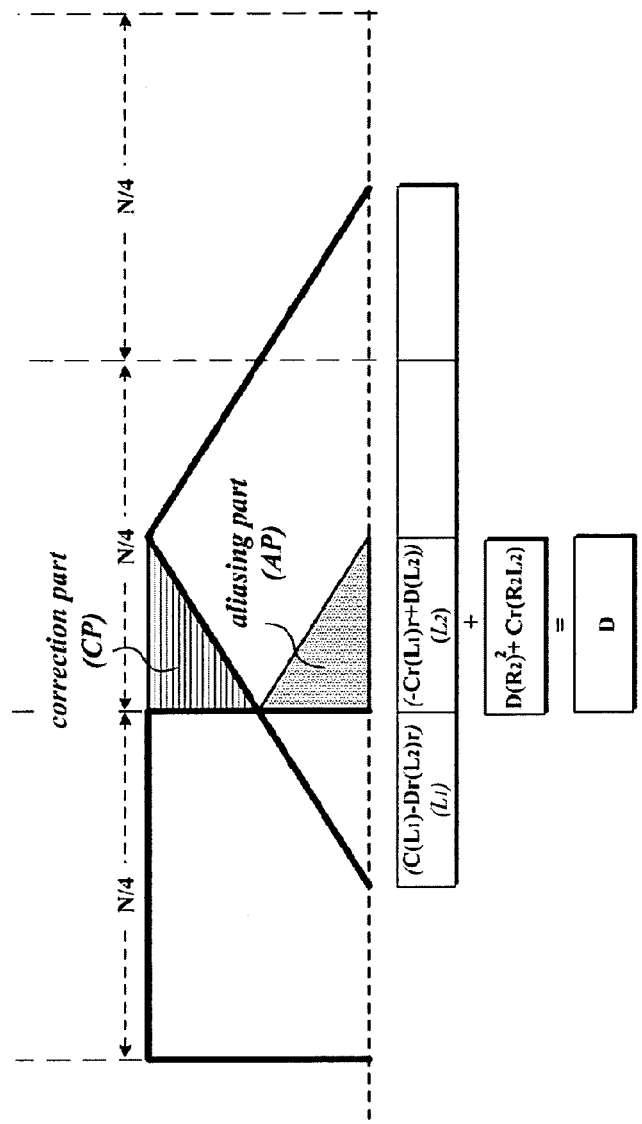
FIG. 7 is a diagram for a correction part (CP), an aliasing part (AP) and an uncompensated signal.

FIG. 6 is a diagram for characteristics when a rectangular window and a non-rectangular window are overlapped with each other. FIG. 7 is a diagram for a correction part (CP), an aliasing part (AP) and an uncompensated signal. In particular, FIG. 6 corresponds to a case that a rectangular window is followed by a non-rectangular window. Yet, a case that a non-rectangular window is followed by a rectangular window in a manner of being overlapped with the following rectangular window shall be explained later in this disclosure.

Referring to FIG. 6, it can be observed that a rectangular window and a non-rectangular window are overlapped with each other in part. Regarding an audio signal including blocks A to F, a rectangular window is applied to both of the block B and the block C and a non-rectangular window is applied to the blocks C to F. In particular, the rectangular window and the non-rectangular window are overlapped with each other at the block C. FIG. 6 (a) to FIG. 6 (d) show that results from applying windowing, folding, unfolding and windowing to the blocks A to F in order. In this case, each of the windowing, folding, unfolding and windowing is applied to a corresponding block in order for the application of time domain aliasing cancellation (TDAC) in association with a non-rectangular window.

Referring to FIG. 6 (a), a rectangular window is applied to each of the block B and the block C (i.e., dotted blocks) and a non-rectangular window is applied to each of the blocks C to F. $C(L_1)$ indicates a result from applying a part $L_1$ of the non-rectangular window to the block C. And, $D(L_2)$ indicates a result from applying a part $L_2$ of the non-rectangular window to the block D. subsequently, if the folding is performed on the non-rectangular window applied result, it results in the blocks shown in FIG. 6 (b). In this case, Er, Dr or the like means that the folding is performed on the corresponding blocks and that the folded blocks are then reversed with reference to a block boundary. Afterwards, the unfolding is performed to result in the diagram shown in FIG. 6 (c). Finally, if a non-rectangular window is applied to the unfolded blocks, the same result as shown in FIG. 6 (d) is generated.

In particular, an uncompensated signal corresponding to the block D of the original signal, i.e., a signal acquired as the transmitted data only can be represented as follows.

$$\text{Uncompensated signal} = (-Cr(L_1)r + D(L_2))(L_2) \quad \text{[Formula 1]}$$

In Formula 1, 'C' indicates data corresponding to the block C, 'D' indicates data corresponding to the block D, 'r' indicates reversion, '$L_1$' indicates a result from applying the part $L_1$ of the non-rectangular window, and '$L_2$' indicates a result from applying the part $L_2$ of the non-rectangular window.

Figure 8:
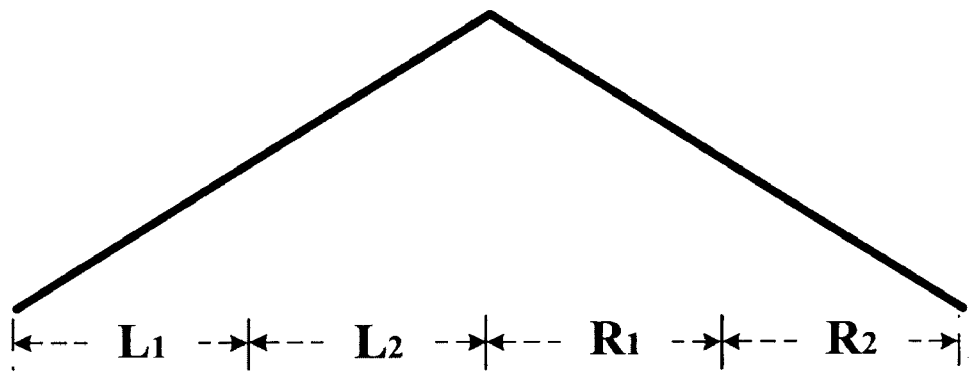
FIG. 8 is a diagram for a characteristic of a non-rectangular window with symmetry (i.e., condition for TDAC)

In the following description, a method of compensating an uncompensated signal to become identical or similar to an original signal is described with reference to FIGS. 7 to 9. First of all, referring to FIG. 7, an uncompensated signal corresponding to Formula 1 is shown.

Meanwhile, a non-rectangular window has symmetry. Characteristics of the non-rectangular window, as shown in FIG. 8, are explained as follows. FIG. 8 is a diagram for a characteristic of a non-rectangular window with symmetry (i.e., condition for TDAC).

$$L_i^2 + R_i^2 = 1, \text{ where } i = 1 \text{ or } 2$$

$$L_{1r} = R_2$$

$$L_{2r} = R_1 \quad \text{[Formula 2]}$$

In Formula 2, '$L_1$' indicates a left first part, indicates a left second part, '$R_1$' indicates a right first part, and '$R_2$' indicates a right second part.

Hence, if the above characteristics of the non-rectangular window are applied, Formula 1 can be summarized in the following.

$$\text{Uncompensated signal} = (-Cr(L_1)r + D(L_2))(L_2) = D(L_2)^2 - Cr(R_2L_2) \text{ (because } L_{1r} = R_2) \quad \text{[Formula 3]}$$

Hence, in order for the uncompensated signal to become equal to the original signal D, i.e., in order to perform a perfect compensation, a needed signal is shown in FIG. 7 and can be represented as follows.

$$\begin{aligned}\text{Needed signal for perfect compensation} &= \text{original signal} - \\ &\quad \text{uncompensated signal} \\ &= D - (D(L_2)^2 - Cr(R_2L_2))\end{aligned} \quad \text{[Formula 4-1]}$$

Meanwhile, using the characteristics shown in Formula 2, Formula 4-1 can be summarized into the following.

Needed signal for perfect compensation=
$D(R_2)^2+C(R_2L_2)$ (because $1-L_2^2=R_2^2$) [Formula 4-2]

In Formula 4-2, a first term $(D(R_2)^2)$ corresponds to a correction part and a second term $(Cr(R_2L_2))$ can be named an aliasing part.

If homogeneous windows (e.g., non-rectangular window and non-rectangular window) are overlapped with each other, the correction part CP and the aliasing part AP correspond parts to be deleted in a manner of being added by performing time domain aliasing cancellation (TDAC). In other words, since heterogeneous windows (i.e., rectangular window and non-rectangular window) are overlapped with each other, the correction part CP and the aliasing part AP are remaining errors instead of being cancelled.

Specifically, the correction part CP corresponds to a part of a current block (e.g., block D) (i.e., a block behind a window crossing point) to which a non-rectangular window (particularly, $R_2$) is applied. And, the aliasing part AP corresponds to a part of a previous block (e.g., block C) (i.e., a block behind a window crossing point) (e.g., a block at which a rectangular window and a non-rectangular block are overlapped with each other) to which a non-rectangular window (particularly, $R_2$ and $L_2$) is applied.

Meanwhile, since a decoder is able to reconstruct a previous block (e.g., block C) using data of the previous block, it is able to generate a prediction of an aliasing part using the reconstructed previous block. This is represented as Formula 5.

Prediction of aliasing part=$qCr(R_2L_2)$ [Formula 5]

Meanwhile, an error of an aliasing part, which is a difference (or a quantization error) between a prediction of the aliasing part and an original aliasing part can be represented as Formula 6.

Error of aliasing part=$er(R_2L_2)=Cr(R_2L_2)-qCr(R_2L_2)$ [Formula 6]

Using Formula 5 and Formula 6, Formula 4-2 is summarized into Formula 7.

Needed signal for perfect compensation=
$D(R_2)^2+Cr(R_2L_2)=D(R_2)^2+(qCr+er)(R_2L_2)$ [Formula 7]

In Formula 7, $D(R_2)^2$ indicates a correction part CP, qCr $(R_2L_2)$ indicates a prediction of an aliasing part AP, and $er(R_2L_2)$ indicates an error of the aliasing part.

Hence, the signal needed for perfect compensation is a sum of the correction part CP and the aliasing part AP, as shown in Formula 7.

In the following description, three kinds of methods for compensating a correction part CP and an aliasing part AP are explained with reference to FIG. 9.

Figure 9:
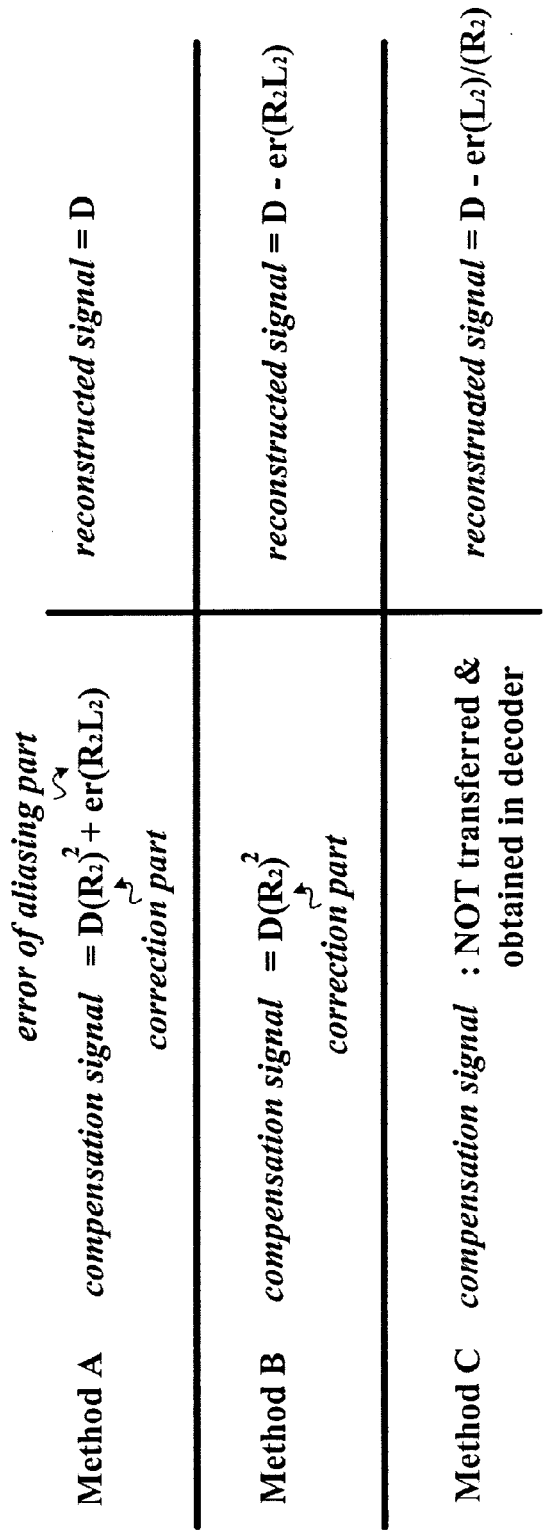
FIG. 9 is a diagram for examples of a compensation signal for compensating a correction part and/or an aliasing part.

FIG. 9 is a diagram for embodiments of a compensation signal for compensating a correction part and/or an aliasing part.

Referring to FIG. 9, a compensation signal of a first embodiment shown in FIG. 9 (A) includes a correction part CP and an error of an aliasing part, while a compensation signal of a second embodiment shown in FIG. 9 (B) includes a correction part CP only. According to a third embodiment shown in FIG. 9 (B), a compensation signal is not sent to a decoder but a correction part CP and an aliasing part AP are estimated by the decoder.

Method A: Compensation signal=$D(R_2)^2+er(R_2L_2)$,
where 'D' is a reconstructed signal. [Formula 8-1]

In case of a compensation signal according to the first embodiment, as mentioned in the foregoing description with reference to Formula 5, a prediction of an aliasing part AP can be obtained by a decoder based on data of a previous block (i.e., a block corresponding to an overlapped part between a rectangular window and a non-rectangular window) without transmission from an encoder to a decoder. Even if a compensation signal includes a correction part CP and an error of an aliasing part, the decoder is able to generate a prediction of the aliasing part. Therefore, it is able to obtain a signal for perfect compensation (cf. Formula 7). According to the first embodiment, it is able to save the number of bits by transmitting an error instead of the aliasing part AP itself. Moreover, it is able to obtain a perfectly compensated signal by compensating the error of the aliasing part AP.

According to the second embodiment, a compensation signal includes a signal corresponding to a correction part CP only.

Method B: Compensation signal=$D(R_2)^2$, where a reconstructed signal is $D-er(R_2L_2)$. [Formula 8-2]

As mentioned in the foregoing description (or like the first embodiment), a decoder generates a prediction of an aliasing part AP and then obtains a compensated signal using a compensation signal corresponding to a correction part CP together with the prediction. According to the second embodiment, since an error of the aliasing part AP may remain in the compensated signal, a reconstruction rate or a sound quality may be degraded. Yet, a compression ratio of the compensation signal can be raised higher than that of the first embodiment.

According to the third embodiment, a compensation signal is not transmitted but a decoder estimates a correction part CP and an aliasing part AP.

Method C: Compensation signal=Not transmitted,
generated compensation signal in the decoder=$qCr(L_2R_2)+D(R_2)^2$, where a reconstructed signal is $D-er(L_2)/(R_2)$. [Formula 8-3]

As mentioned in the foregoing description (or like the first embodiment and the second embodiment), a prediction of an aliasing part AP can be generated by a decoder.

Meanwhile, a correction part CP can be generated in a manner of compensating a window shape for a signal corresponding to a current block (e.g., block D). In particular, $qCr((L_2R_2)$ generated using data of the previous block (qC) is added to un-compensated signal like the formula 1. Then $D(L_2)^2-er(L_2R_2)$ is generated, by dividing $D(L_2)^2-er(L_2R_2)$ by $(L_2)^2$ (which may correspond to adding $D(R_2)^2$ to $D(L_2)^2-er(L_2R_2))$, $D-er(R_2)/(L_2)$ is obtained. In formula 8-3, quantized error of current block (block D) is not represented.

A reconstruction rate of the third embodiment may be lower than that of the first or second embodiment. Yet, since the third embodiment does not need bits for transmitting a compensation signal at all, a compression ratio of the third embodiment is considerably high.

Figure 10:
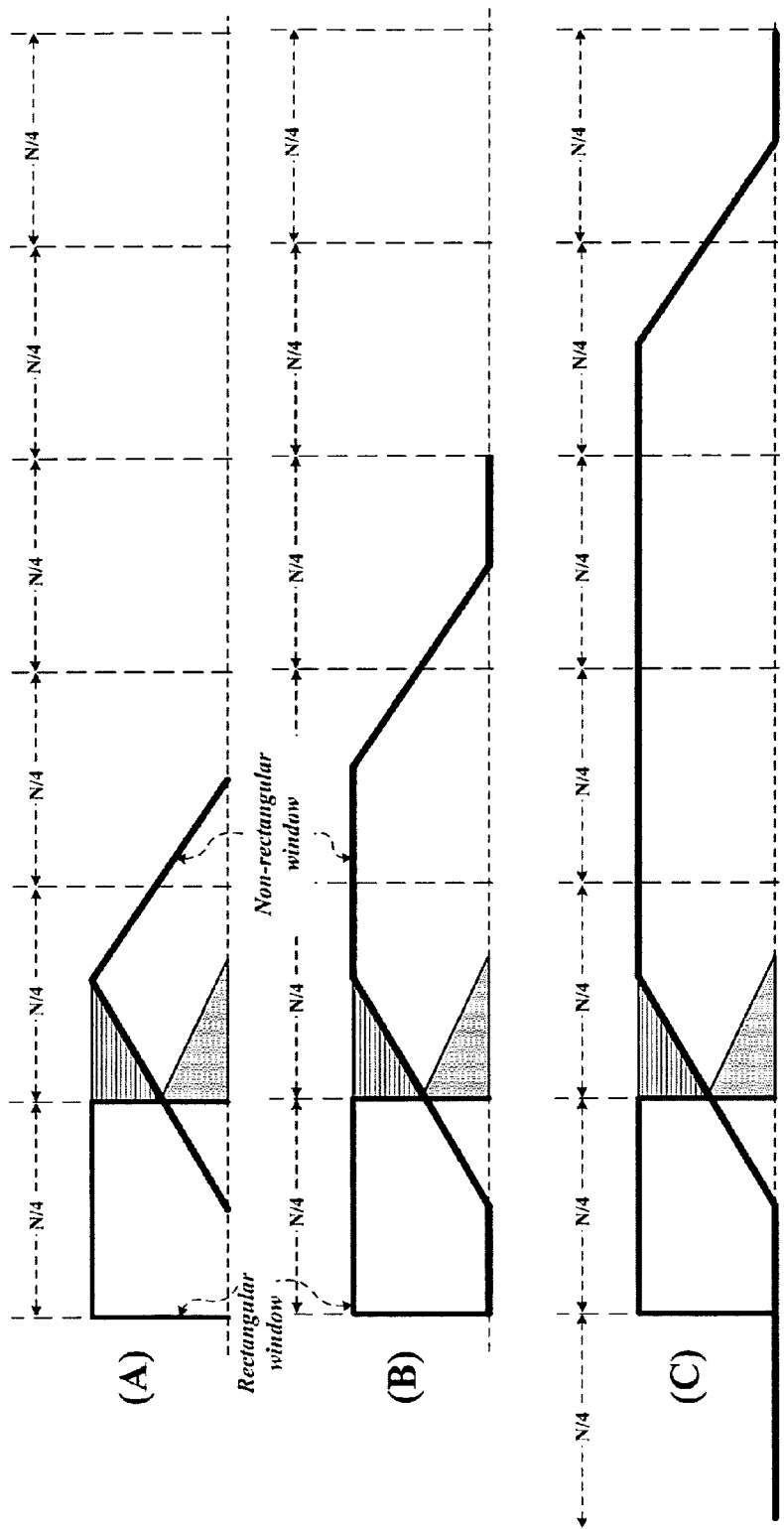
FIG. 10 is a diagram for examples of a non-rectangular window in combination of heterogeneous windows (i.e., rectangular window and non-rectangular window) shown in FIG. 6.

FIG. 10 is a diagram for examples of a non-rectangular window in combination of heterogeneous windows (i.e., rectangular window and non-rectangular window) shown in FIG. 6. In the examples of a non-rectangular window, as shown in FIG. 10 (A) to FIG. 10 (C), each corner is not rectangular but has an ascending line with a slope. Shapes of non-rectangular windows corresponding to FIG. 10 (A) to FIG. 10 (C) can be represented as Table 1.

TABLE 1

|     | Total length | Left zero part | Ascending line | Top line | Descending line | Right zero part |
|-----|--------------|----------------|----------------|----------|-----------------|-----------------|
| (A) | N/4 or 256   | 0              | N/4 or 256     | 0        | N/4 or 256      | 0               |
| (B) | N/2 or 512   | N/8 or 128     | N/4 or 256     | N/4 or 256 | N/4 or 256    | N/8 or 128      |
| (C) | N or 1024    | N3/8 or 384    | N/4 or 256     | 3N/4 or 768 | N/4 or 256   | N/8 or 128      |

In Table 1, 'N' indicates a frame length and a numeral indicates the number of samples (e.g., '256' indicates 256 samples.).

Referring to Table 1 and FIG. 10, each of the windows of the three kinds of types can have ascending and descending lines of which widths are set to N/4 and N/4, respectively. In this case, 'N' indicates a frame length.

Non-rectangular windows shown in FIG. 10 (A) to FIG. 10 (C) can respectively correspond to windows in mode 1, mode 2 and mode 3 of the B coding scheme (e.g., TCX), by which the present invention is non-limited. As mentioned in the foregoing description with reference to FIG. 4, the mode 1 corresponds to the window when the B coding scheme is applied to one subframe. The mode 2 corresponds to the window when the B coding scheme is applied to two contiguous subframes. And, the mode 3 corresponds to the window when the B coding scheme is applied to four contiguous subframes, i.e., one frame.

In the above description, the examples of the non-rectangular window corresponding to the B coding scheme are explained. Examples of a non-rectangular window corresponding to the C coding scheme (e.g., MDCT) shall be described later together with an audio signal processing apparatus according to a second embodiment.

Figure 11:
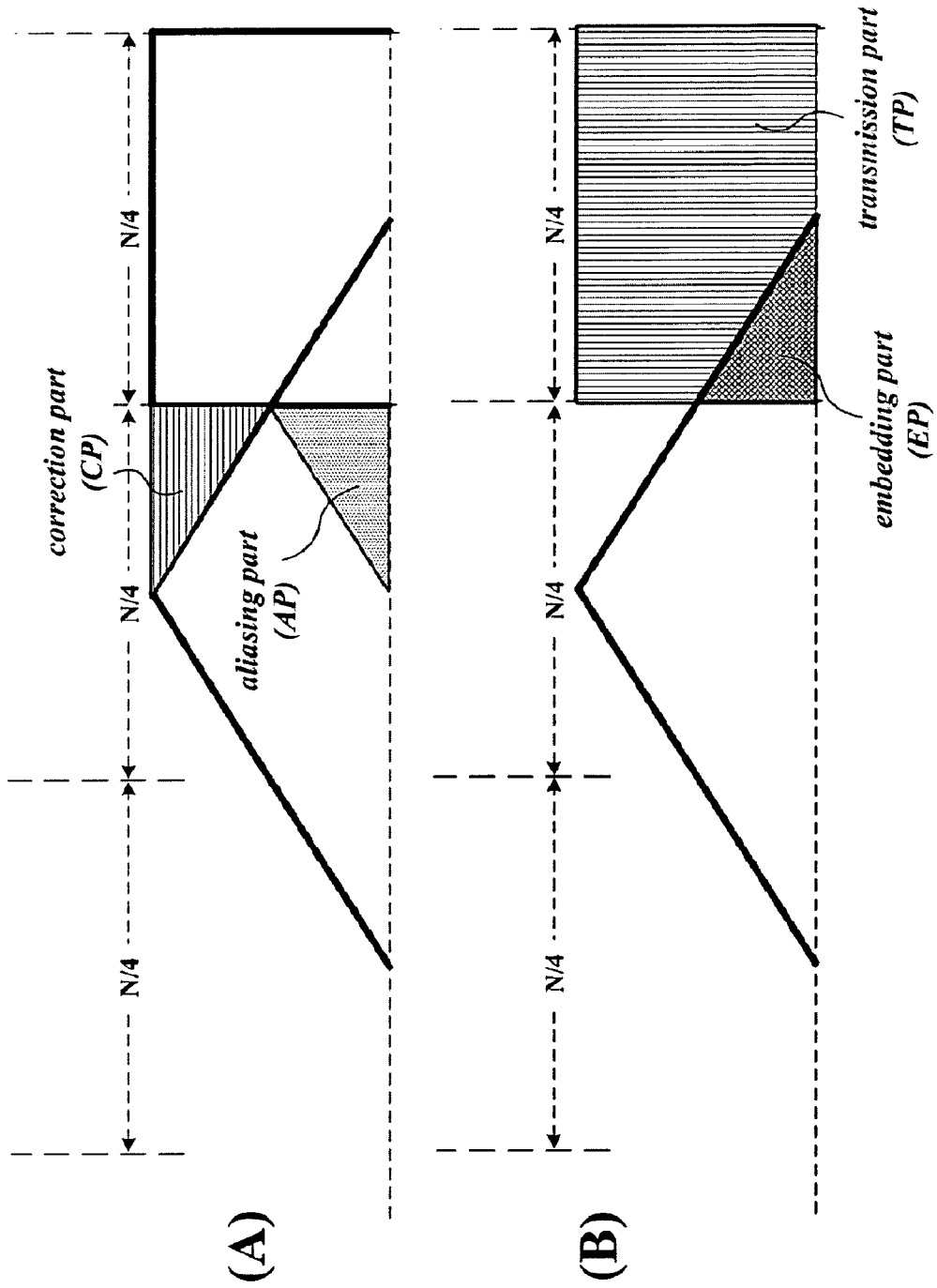
FIG. 11 is a diagram for a case that a rectangular window following a rectangular window is overlapped

FIG. 11 is a diagram for a case that a rectangular window following a rectangular window is overlapped. In particular, FIG. 11 shows a case that a rectangular window is overlapped after a non-rectangular window, whereas FIG. 6 shows a case that a rectangular window is followed by a non-rectangular window.

Referring to FIG. 11 (A), like the case shown in FIG. 6, it can be observed that a correction part CP and an aliasing part AP are generated from a block corresponding to a non-rectangular window. Since the block, at which non-rectangular and rectangular windows are overlapped, is not a previous block but a following block unlike FIG. 6, it is able to generate a prediction of the aliasing part AP using data of the following block. Moreover, by transmitting one of the examples of the compensation signal described with reference to FIG. 9, it is able to solve a defect (i.e., the correction part CP and the aliasing part AP) generated due to the overlapping between the non-rectangular and rectangular windows.

Referring to FIG. 11 (B), an embedding part EP of a rectangular window is embedded as an aliasing part AP in data coded according to a coding scheme corresponding to a non-rectangular window. Assuming that a whole signal corresponding to a rectangular window is set to D and that an embedding part EP is set to $C_{rw}$, the embedding part EP can be represented as Formula 9.

$$C_{rw}=Cr(L_1)r+D(R_2) \quad \text{[Formula 9]}$$

For reference, the signal is a signal before a decoder applies a window.

The embedding part EP ($C_{rw}$) can be calculated by a decoder. Instead of coding the whole signal D according to a rectangular coding scheme, transmission can be performed by encoding 'D−$C_{rw}$' (i.e., a transmission part TP shown in the drawing) only. And, the transmission part TP is represented as Formula 10.

$$TP=D-Crw=-Cr(L_1)r-D(1-R_2) \quad \text{[Formula 10]}$$

The decoder is able to reconstruct an original signal in a manner of overlapping unfolded data corresponding to a non-rectangular coding scheme with data corresponding to a rectangular coding scheme.

In the above description so far, contents for compensating the defect in case of the overlapping of the heterogeneous coding schemes and the heterogeneous windows (i.e., rectangular window and non-rectangular window) are explained in detail with reference to FIGS. 4 to 11. In the following description, an audio signal processing apparatus and method according to a first embodiment are explained with reference to FIG. 2 and FIG. 3 again.

Referring now to FIG. 2, explained in the following description is a case that $N^{th}$ block and $(N+1)^{th}$ block correspond to a rectangular coding scheme and a non-rectangular coding scheme, respectively. Of course, a reverse case that $N^{th}$ block and $(N+1)^{th}$ block correspond to a non-rectangular coding scheme and a rectangular coding scheme, respectively is applicable as mentioned in the foregoing description with reference to FIG. 10 (A).

The rectangular scheme coding part 122 encodes $N^{th}$ block of an input signal according to a rectangular coding scheme and then delivers the encoded data (for clarity, this data is named a first data) to the rectangular scheme synthesis part 124 an the multiplexer 130. In this case, as mentioned in the foregoing description, the rectangular coding scheme is the coding scheme for applying a rectangular window. ACELP belongs to the rectangular coding scheme, by which the present invention is non-limited. The rectangular scheme coding part 122 is able to output a result encoded by applying a rectangular window to be block B and the block C by the A coding scheme in FIG. 6.

The rectangular scheme synthesis part 124 generates a prediction of an aliasing part AP using the encoded data, i.e., the first data. In particular, the rectangular scheme synthesis part 124 generates an output signal by performing decoding with the rectangular coding scheme. For instance, the block C (and the block B) is reconstructed into its original form by the A coding scheme. Using the output signal and the non-rectangular window, the prediction of the aliasing part AP is obtained, In this case, the prediction of the aliasing part AP can be represented as Formula 5. In Formula 5, 'qC' indicates the output signal and '$R_2L_2$' indicates the non-rectangular window. And, the prediction of the aliasing part AP is inputted to the compensation information generating part 128.

The non-rectangular scheme coding part 126 generates an encoded data (for clarity, named a second data) by encoding the $(N+1)^{th}$ block by the non-rectangular coding scheme. For instance, the second data can correspond to a result from applying the non-rectangular window to the blocks C to F and then folding the blocks. As mentioned in the foregoing description, the non-rectangular coding scheme can correspond to the B coding scheme (e.g., TCX) or the C coding scheme (e.g., MDCT), by which the present invention is non-limited. And, the second data is delivered to the multiplexer 130.

The compensation information generating part 124 generates a compensation signal using the prediction of the aliasing part and an original input signal. In this case, the compensation signal can be generated according to one of the three kinds of the methods shown in FIG. 9. In case of using the method A, both of the prediction of the aliasing part and the original input signal are used. In case of using the method B, the original input signal is used only. In case of the method C, the compensation signal is not generated. Each of the three kinds of the methods is applicable to a whole frame or subframes in the same manner. Alternatively, in consideration of a bit efficiency of each frame, a different method is applicable to each frame. Definition and generation process of the compensation signal are explained in the foregoing description with reference to FIGS. 6 to 9 and shall not be redundantly explained in the following description. Meanwhile, the compensation signal generated by the compensation information generating part 124 is delivered to the multiplexer 130.

The multiplexer 130 generates at least one bitstream by multiplexing the first data (e.g., data of the $N^{th}$ block), the second data (e.g., data of the $(N+1)^{th}$ block) and the compensation signal together and then transmits the generated at least one bitstream to an encoder. Of course, like the former multiplexer 130 shown in FIG. 1, the latter multiplexer 130 enables coding scheme information and the like to be contained in the corresponding bitstream.

Referring to FIG. 3, like the former decoder 200 shown in FIG. 1, a decoder 200A according to a first embodiment of the present invention includes a rectangular decoding unit 220R and a non-rectangular decoding unit 220N and is able to further include a demultiplexer 210. In this case, the non-rectangular decoding unit 220N includes a compensation part 228. In particular, the rectangular decoding unit 220R is able to further include a rectangular scheme decoding part 222 and an aliasing prediction part 224. And, the non-rectangular decoding unit 220N is able to further include a non-rectangular scheme decoding part 226.

The demultiplexer 210 extracts the first data (e.g., data of the $N^{th}$ block), the second data (e.g., data of the $(N+1)^{th}$ block) and the compensation signal from the at least one bitstream. In this case, the compensation signal can correspond to one of the three types described with reference to FIG. 9.

The rectangular scheme decoding part 222 generates an output signal by decoding the first data by the rectangular coding scheme. This is as good as obtaining the block C (and the block B) shown in FIG. 6.

Like the rectangular scheme synthesis part 124 shown in FIG. 2, the aliasing prediction part 224 generates a prediction of the aliasing part using the output signal and a non-rectangular window. In this case, the prediction of the aliasing part may correspond to Formula 5.

The non-rectangular scheme decoding part 226 generates a signal by decoding the second data by the non-rectangular coding scheme. Since the generated signal is the signal before the compensation of aliasing and the like, it corresponds to the uncompensated signal mentioned in the foregoing description. Hence, this signal can be equal to the former signal represented as Formula 1.

The compensation part 228 generates a signal reconstructed using the compensation signal delivered from the demultiplexer 210, the prediction of the aliasing part obtained by the aliasing prediction part 224 and the uncompensated signal generated by the non-rectangular scheme decoding part 226. In this case, the reconstructed signal is the same as described with reference to FIG. 9 and Formulas 8-1 to 8-3.

In the following description, an audio signal processing apparatus according to a second embodiment is explained with reference to FIG. 12 and FIG. 13.

First of all, regarding the first embodiment, the $N^{th}$ block corresponds to the rectangular coding scheme (e.g., A coding scheme) and the $(N+1)^{th}$ block corresponds to the non-rectangular coding scheme (e.g., B coding scheme or C coding scheme), and vice versa. On the contrary, regarding the second embodiment, when $(N+1)^{th}$ block corresponds to the C coding scheme, a window type of the C coding scheme is changed according to whether $N^{th}$ block corresponds to a rectangular coding scheme (e.g., A coding scheme). In this case, it is a mater of course that the $N^{th}$ block and the $(N+1)^{th}$ block can be switched to each other in order.

Figure 12:
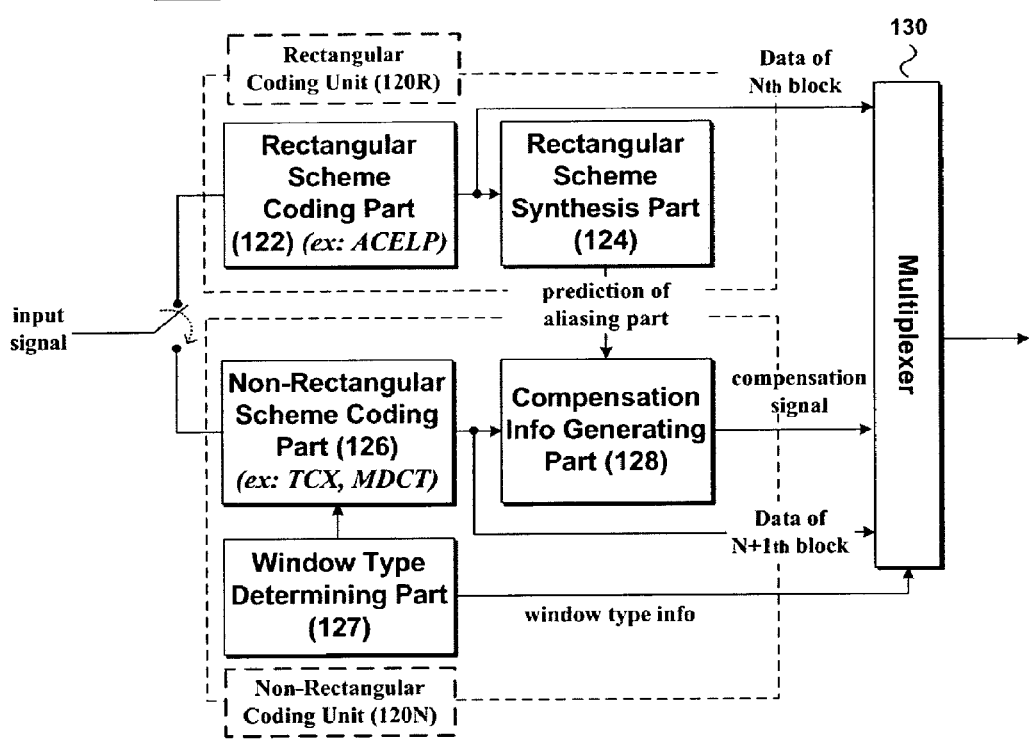
FIG. 12 is a block diagram of an encoder according to a second embodiment of the present invention.

FIG. 12 is a block diagram of an encoder according to a second embodiment of the present invention.

Referring to FIG. 12, like the first embodiment, an encoder 100B according to a second embodiment includes a rectangular coding unit 120R and a non-rectangular coding unit 120N. Yet, the non-rectangular coding unit 120N further includes a window type determining part 127. The rest of components (i.e., a rectangular scheme coding part 122 and a rectangular scheme synthesis part 124, a non-rectangular scheme coding part 126 and a compensation information generating part 128) have the same functionality of the former components of the same names according to the first embodiments. And, the same parts shall not be described in the following description.

In case that a second block (i.e., a current block) is encoded by a non-rectangular coding scheme, the window type determining part 127 determines a type of a window of the second block according to whether a first block (e.g., a previous block, a following block, etc.) is encoded by a rectangular coding scheme. In particular, if the second block is encoded by the C coding scheme belonging to the non-rectangular coding schemes and a window applied to the second block belongs to a transition window class, the window type determining part 127 determines the type (and a shape) of the window of the second block according to whether the first block is encoded by the rectangular coding scheme. Examples of the window type are shown in Table 1.

TABLE 1

Examples of window type in non-rectangular coding scheme
(particularly, C coding scheme)

| Window type | Classification | Name per shape | Previous/ following block | Left zero interval | Width of ascending line | Top line | Width of descending line | Right zero interval |
|---|---|---|---|---|---|---|---|---|
| | | | | | Window shape | | | |
| 1 Only-long window | Non-transition window | | Irrespective | 0 | N | 0 | N | 0 |

TABLE 1-continued

Examples of window type in non-rectangular coding scheme
(particularly, C coding scheme)

| | Window type | Classification | Name per shape | Previous/following block | Window shape | | | | |
|---|---|---|---|---|---|---|---|---|---|
| | | | | | Left zero interval | Width of ascending line | Top line | Width of descending line | Right zero interval |
| 2 | Long_start window | Transition window | Steep long_start window | C coding scheme | 0 | N | 7N/16 | N/8 | 7N/16 |
| | | | Gentle long_start window | Rectangular window | | | 3N/8 | N/4 | 3N/8 |
| 3 | Shirt window | Non-transitional window | | Irrespective | 0 | Overlapping of 8 short parts, each having ascending and descending line width set to N/8 | | | |
| 4 | Long_stop window | Transition window | Steep long_stop window | C coding scheme | 7N/16 | N/8 | 7N/16 | N | 0 |
| | | | Gentle long_stop window | Rectangular window | 3N/8 | N/4 | 3N/8 | | |
| 5 | Stop_start Window | Transition window | Steep-steep stop_start window | C coding scheme window for both previous and following blocks | 7N/16 | N/8 | 7N/8 | N/8 | 7N/16 |
| | | | Gentle-steep stop_start window | C coding scheme window only for following block | 3N/8 | N/4 | 3N/16 | N/8 | 7N/16 |
| | | | Steep-gentle stop_start window | C coding scheme window only for previous block | 7N/16 | N/8 | 13N/16 | N/4 | 3N/16 |
| | | | Gentle-gentle stop_start window | Rectangular window for both previous and following blocks | 3N/8 | N/4 | 3N/4 | N/4 | 3N/8 |

In Table 1, 'N' indicates a frame length, 1,024 or 960 samples or the like.

Referring to Table 1, $2^{nd}$, $4^{th}$ and $5^{th}$ windows (i.e., a long_start window, a long_stop window and a stop_start window) among total 5 windows belong to a transition window class. The window belonging to the transition window class, as shown in the table, differs in shape according to a previous or following block corresponds to a rectangular window. In case corresponding to a rectangular coding scheme, a width of an ascending or descending line is N/4. Yet, it can be observed that a class of a transition window has a width of an ascending or descending line becomes N/8 in case corresponding to a non-rectangular coding scheme (e.g., C coding scheme).

Figure 13:
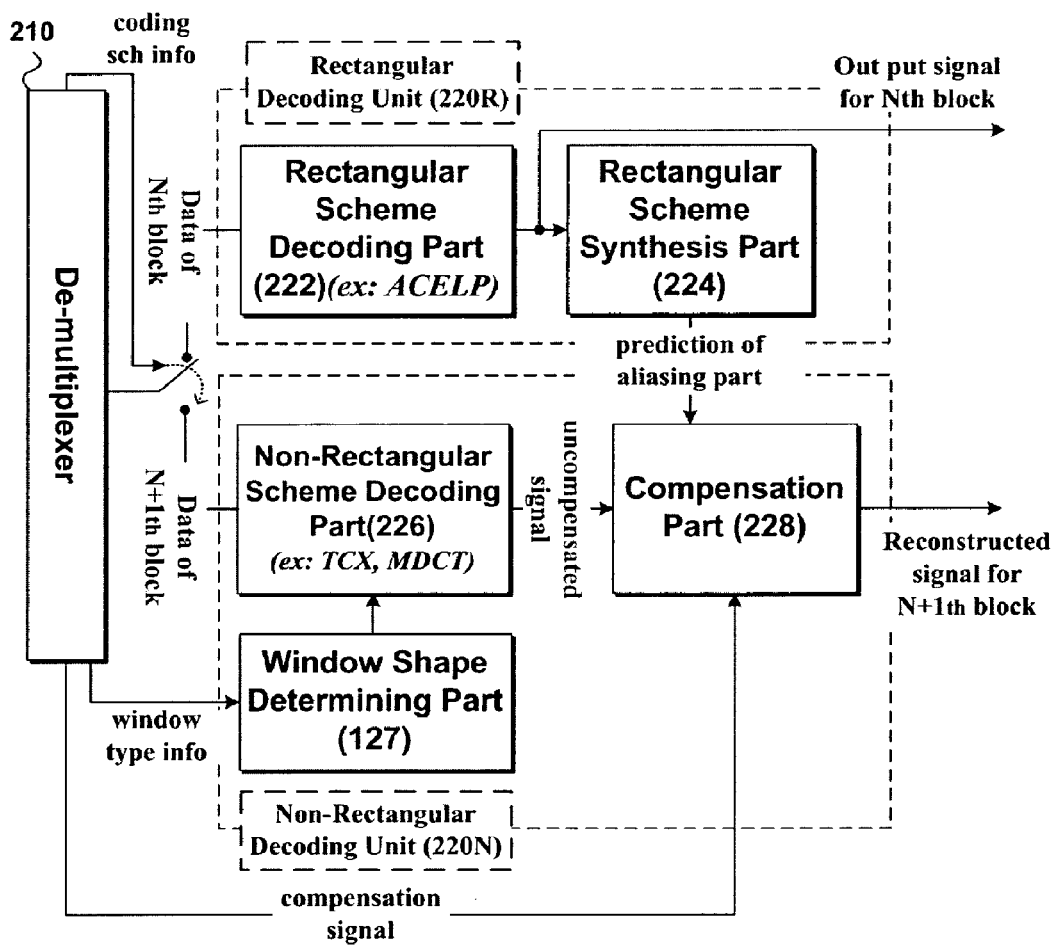
FIG. 13 is a block diagram of a decoder according to a second embodiment of the present invention.

FIG. 13 is a block diagram of a decoder according to a second embodiment of the present invention.

Figure 14:
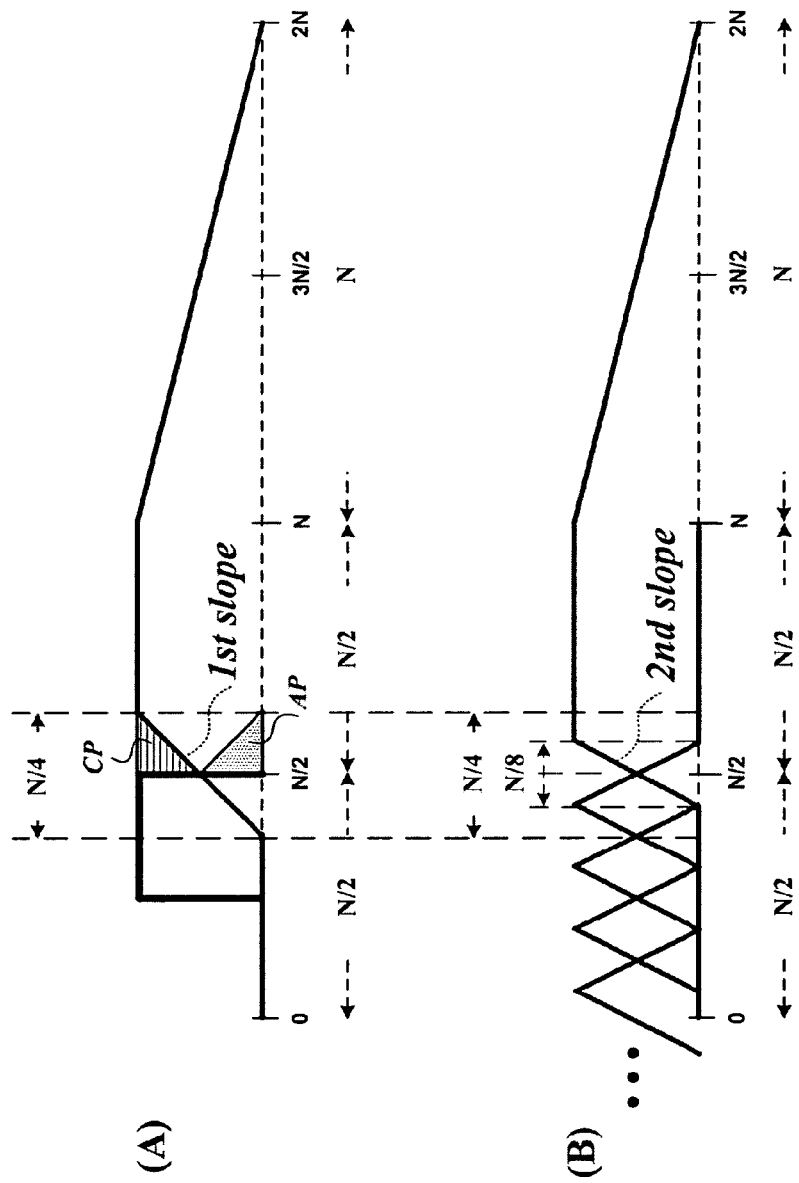
FIG. 14 is a diagram of a shape of a transition window according to whether a rectangular coding scheme is applied to a previous block.

FIG. 14 is a diagram of a shape of a transition window according to whether a rectangular coding scheme is applied to a previous block. Although a right non-rectangular shown in FIG. 14 (A) or FIG. 14 (B) corresponds to the long_stop window shown in Table 1, it can be replaced by a long_start window or a stop_start window.

Referring to FIG. 14 (A), in case that a previous block corresponds to a rectangular window, an ascending line of a transition window of a current block has a first slope. Referring to FIG. 14 (B), in case that a previous block does not correspond to a rectangular window (particularly, in case that a previous block corresponds to a window of the C coding scheme), an ascending line of a transition window of a current block has a second slope. In this case, the first slope is gentler than the second slope. And, a width of the first slope can correspond to twice that of the second slope. In particular, the width of the first lope is N/4, while the width, of the second slope is N/8.

In other words, the window type determining part 127 preferentially determines a type of a window corresponding to a current block, generates window type information for specifying a specific window applied to the current block (e.g., a frame or subframe) among a plurality of windows (i.e., for indicating a window type), and then delivers the generated window type information to the multiplexer 130. In case that the type of the window corresponding to the current block is classified into a transition window, the window type determining part 127 determines a shape of a window, and more particularly, a width (and a corresponding top line and a length of a left or right zero part) of an ascending or descending line according to whether a previous or following block corresponds to a rectangular coding scheme and then applies the determined window shape to the current block.

Meanwhile, like the former compensation information generating part 128 of the first embodiment, the compensation information generating part 128 generates a compensation signal when heterogeneous windows (e.g., a non-rectangular window and a rectangular window) are overlapped with each other (e.g., the case corresponding to (A) in FIG. 14).

As mentioned in the foregoing description, since a defect generated from the heterogeneous windows overlapped with each other can be corrected using the compensation signal, 50% of the heterogeneous windows can be overlapped instead of 100%. Since the heterogeneous windows need not to be overlapped with each other by 100%, it is not necessary to narrow a width of an ascending or descending line of each window classified into a transition window. Therefore, a window can have a slope relatively gentler than that of the case of the 100% overlapping.

Referring to FIG. 13, in a decoder 200B according to a second embodiment, a non-rectangular decoding unit 220N further includes a window shape determining part 127 rather than that of the first embodiment. In the following description, components having the same names of the former components of the first embodiment shall not be explained in detail.

In case that a current block or a second block corresponds to a non-rectangular coding scheme (particularly, the C coding scheme), the window shape determining part 127 determines a specific window (i.e., a window type) applied to the current block among a plurality of windows based on the window type information delivered from the demultiplexer 210. In case that a window of a current block belongs to a transition window class, the window shape determining part 127 determines a shape of a window of the determined window type according to whether a previous/following block (i.e., a first block) is coded by a rectangular coding scheme. In particular, if the previous/following block is encoded by the rectangular coding scheme and a window of the current block belongs to the transition window class, as mentioned in the foregoing description, the window shape is determined to have an ascending or descending line with a first slope gentler than a second slope. For instance, in case of a long_start window, the window shape is determined as a gentle long_start window (having a descending line with a first slope (e.g., N/4) in Table 1. In case of a long_stop window, the window shape is determined as a gentle long_stop window (e.g., an ascending line with a first slope (N/4)). And, in case of a stop_start window, the window shape is determined in the same manner. In this case, as mentioned in the foregoing description, the first slope (e.g., N/4) is gentler than the second slope. In particular, the second slope is a slope of an ascending or descending line of a steep transition window (e.g., a steep long_stop window, etc.).

The window type and shape determined in the above manner are delivered to the non-rectangular scheme decoding part 226. Subsequently, the non-rectangular scheme decoding part 226 generates an uncompensated signal by decoding a current block by the non-rectangular scheme according to the determined window type and shape.

Like the first embodiment, in case that the overlapping of heterogeneous windows (e.g., a rectangular window and a non-rectangular window) occurs, the compensation part 228 generates a reconstructed signal using the uncompensated signal and the compensation signal (and the prediction of the aliasing part).

In the following description, an audio signal processing apparatus according to a third embodiment is explained with reference to FIG. 15 and FIG. 16. The third embodiment includes the first coding unit 120-1, the second coding unit 120-2, the first decoding unit 220-1 and the second decoding unit 220-2 in the former audio signal processing apparatus shown in FIG. 1. In particular, when a current block (e.g., $N^{th}$ block) is encoded by a second coding scheme (i.e., C coding scheme), according to whether a following block (e.g., the $(N+1)^{th}$ block) or a previous block (e.g., the $(N-1)^{th}$ block) is encoded by a first coding scheme (i.e., A coding scheme or B coding scheme), a shape of a current window corresponding to the current block is determined by the third embodiment.

Figure 15:
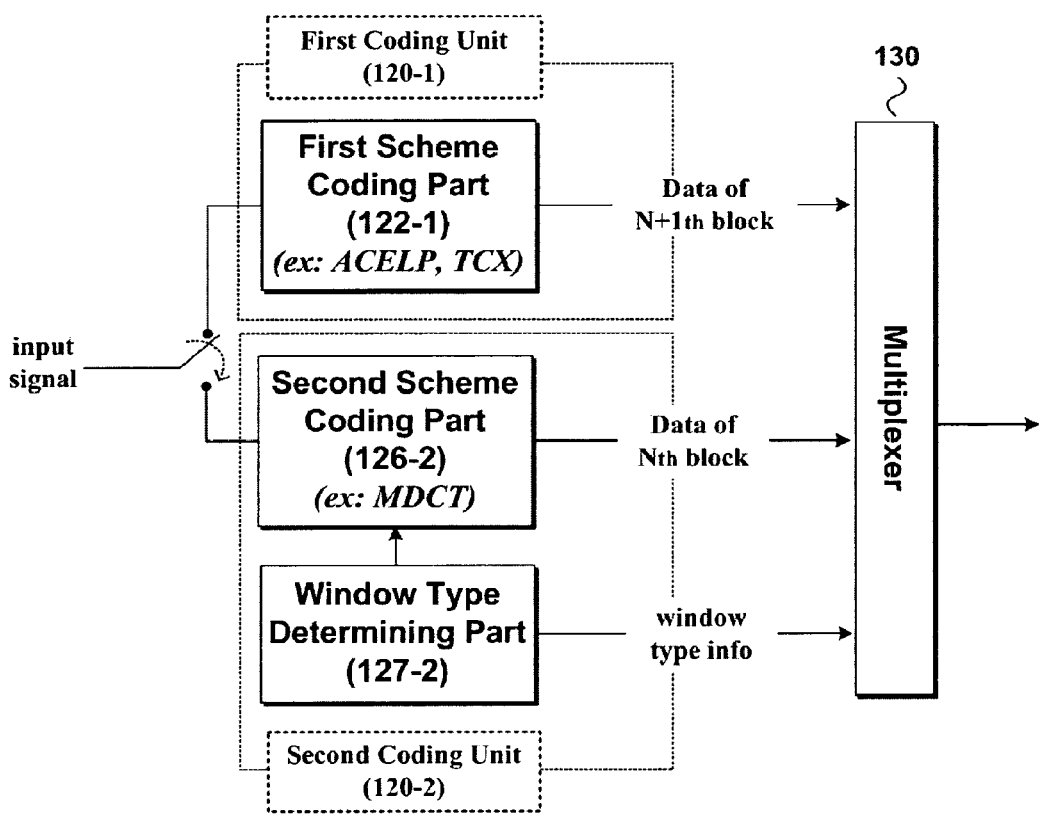
FIG. 15 is a block diagram of an encoder according to a third embodiment of the present invention.

FIG. 15 is a block diagram of an encoder according to a third embodiment of the present invention.

Referring to FIG. 15, in an encoder 100C according to a third embodiment, a first coding unit 120-1 includes a first scheme coding part 122-1 and a second coding unit 120-2 includes a second scheme coding part 126-2 and a window type determining part 127-2. And, the encoder 100 can further include a multiplexer 130. In this case, an input signal is inputted to the first coding unit 120-1 or the second coding unit 120-2 by a unit of block (e.g., a frame, a subframe, etc.).

The first scheme coding part 122-1 encodes the input signal by a first coding scheme and the second scheme coding part 126-2 encodes the input signal by a second coding scheme. In this case, the first and second coding schemes are as good as those described with reference to FIG. 1. In particular, the first coding scheme is a linear prediction domain based coding scheme and the second coding scheme can correspond to a frequency domain based scheme. Meanwhile, as mentioned in the foregoing description with reference to FIG. 1, the first coding scheme can include the A coding scheme (e.g., ACELP) corresponding to the rectangular window scheme and the B coding scheme (e.g., TCX) corresponding to the non-rectangular window scheme and the second coding scheme can include the C coding scheme (e.g., MDCT) corresponding to the non-rectangular window scheme.

In case that the input signal corresponds to the second coding scheme, the window type determining part 127-2 determines a window type and shape of a current block with reference to a characteristic (and a window type) of a previous or following block, generates window type information indicating the window type corresponding to the current block (frame or subframe), and then delivers the generated window type information to the multiplexer 130.

In the following description, a window type is explained in detail with reference to Table 1, a window type and shape of a current block according to a coding scheme of a previous/following block are explained with reference to FIG. 17A to FIG. 18, and the components shown in FIG. 15 and FIG. 16 are then explained again.

First of all, one example of a window type corresponding to a second coding scheme can be identical to Table 1. Referring to Table 1, windows (e.g., only_long, long_start, short, long_stop and stop_start) of total five types exist. In this case, the only_long window is a window applied to a signal suitable for a long window due to a stationary characteristic of the signal and the short window is a window applied to a signal suitable for a short window due to a transient characteristic of the signal. The long_start window, the long_stop window and the stop_start window, which are classified as transition windows, are necessary for a process of transition to the short window (or a window with a first coding scheme) from the only_long window or a process for transition to the only_long window (or a window with a first coding scheme) from the short window. The stop_start window is the window used if a previous/following frame corresponds to the short window (or a window with a first coding scheme) despite that a long window is suitable for a current block or frame.

Shapes of the windows of the five types shown in Table 1 are examined in detail as follows. First of all, each of the only_long, short, and stop_start windows has horizontal symmetry, while the rest of the windows have horizontal asymmetry. The long_start window includes a zero part in a right half only, whereas the long_stop window includes a zero part in a left half only.

In the following description, three cases where a window shape of a current frame is determined according to a previous frame or a following frame are explained in detail.

The first case, in which a window shape of a current frame is determined according to a following frame when the current frame is a long_start window, is described below with reference to FIG. 17A and the second case, in which a window shape of a current frame is determined according to a previous frame when the current frame is a long_stop window, is described below with reference to FIG. 17B. In addition, the third case, in which a window shape of a current frame is determined according to a previous frame or a following frame when the current frame is a stop_start window, is described below with reference to FIGS. 17C and 17D.

In the first case, when a previous frame is an only_long window and a current frame is a long_start window, a shape of a current long_start window is determined according to whether a following frame corresponds to a short window or a window with a first coding scheme. In particular, a slope of a descending line of the long_start window can vary. A long_start window having a gentle slope of a descending line shall be named a gentle long_start window (cf. a name per shape in Table 1) and a long_start window having a steep slope of a descending line shall be named a steep long_start window. This shall be described in detail with reference to FIG. 17A as follows.

Figure 17A:
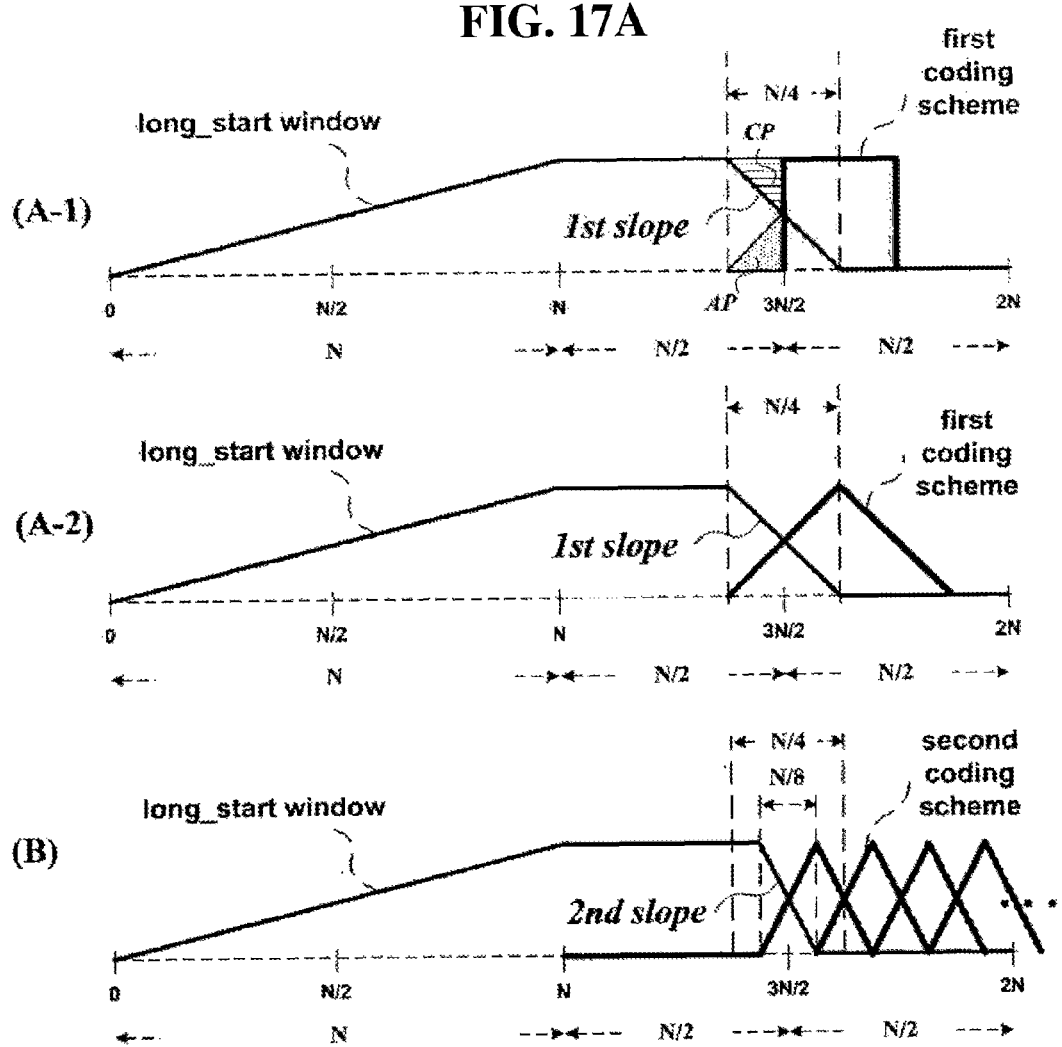
FIG. 17A is a diagram of a long_start window combined with a first coding scheme window or a second coding scheme window (short window)

FIG. 17A is a diagram of a long_start window combined with a first coding scheme window or a second coding scheme window (short window). FIG. 17A (A-1)/(A-2) shows a combination between a long_start window and a window of a first coding scheme. FIG. 17A (B) shows a combination between a long_start window and a short window.

In particular, a window of a first coding scheme shown in FIG. 17A (A-1) is a window corresponding to 'A scheme' (i.e., rectangular window scheme). And, FIG. 17A (A-2) shows a window corresponding to 'B coding scheme' (non-rectangular window scheme) in the first coding scheme window. Referring to FIG. 17A (A-1) and FIG. 17A (A-2), in case that a following frame corresponds to a first coding scheme, a current long_start window includes a descending line having a first slope. Referring to FIG. 17A (B), in case that a following frame corresponds to a second coding scheme (i.e., a short window), a current long_start window includes a descending line having a second slope. A width of the first slope can be twice that of the second slope and can correspond to N/4, where 'N' is a length of a frame. Besides, the width of the first slope amounts to 256 samples and can correspond to ⅛ of a total length of the long_start window.

Like the case shown in FIG. 17A (A-1), in case that a rectangular window is overlapped with a long_start window followed by the rectangular window, as mentioned in the foregoing descriptions of the first and second embodiments, it is able to compensate a correction part (CP) and an aliasing part (AP) using a received compensation signal. If this compensation is not performed, the long_start window should be 100% overlapped with the rectangular window. Therefore, in order not to waste bits, a slope of a descending line overlapped with the rectangular window should have been set steep. Yet, as the above-mentioned compensation is enabled, a sound quality avoids being distorted with 50% of the overlapping with the rectangular window. Hence, a slope of the descending line can be maintained as the first slope shown in FIG. 17A (A-1). Thus, as the descending line is gently maintained with the first slope, a crossing point between the two windows becomes a point at 3N/2. If 100% of the overlapping is achieved, a crossing point between the two windows should become 3N/2-N/16. In particular, the corresponding crossing point is ahead of that of the case shown in FIG. 17A (A-1) by N/16.

In other words, in case that a following window is a window corresponding to a first coding scheme, 50% of the overlapping is acceptable. Hence, a descending line of a long_start window is maintained gentle with a first slope. As a result, a location of a crossing point becomes the same location (e.g., a point of 3N/2 from a window start point) if the following window follows the first or second coding scheme or is irrespective of the first or second coding scheme. Thus, as the crossing points become equal to each other, inter-window transition becomes different. This shall be described together with a fourth embodiment later in this disclosure.

The case of FIG. 17A (A-2) meets a condition of TDAC since a first slope is symmetric with an ascending line of a non-rectangular window of a following frame (more correctly, the first slope is horizontally symmetric with the ascending line or the absolute value of the first slope is equal to the absolute value of the ascending line) when a descending line of a current frame has the first slope.

Referring to FIG. 17A (B), as a second slope is matched to a slope of an ascending line of a window (short window) corresponding to a following frame (i.e., a second coding scheme), a condition of TDAC is met. In this case, the meaning of 'being matched' may indicate that an absolute value of a slope is identical. In particular, a width of a slope of a descending line is N/4 and a width of a slope of an ascending line of a following frame is N/4 as well.

The second case is described below with reference to FIG. 17B. As described above, in the second case, when a following frame is an only_long window and a current frame is a long_stop window, a shape of a current long_stop window is determined according to whether a previous frame corresponds to a second coding scheme (short window) or a window with a first coding scheme. In particular, a slope of an ascending line of the long_stop window can vary. A long_stop window having a gentle slope of an ascending line shall be named a gentle long_stop window (cf. a name per shape in Table 1) and a long_stop window having a steep slope of an ascending line shall be named a steep long_stop window.

Figure 17B:
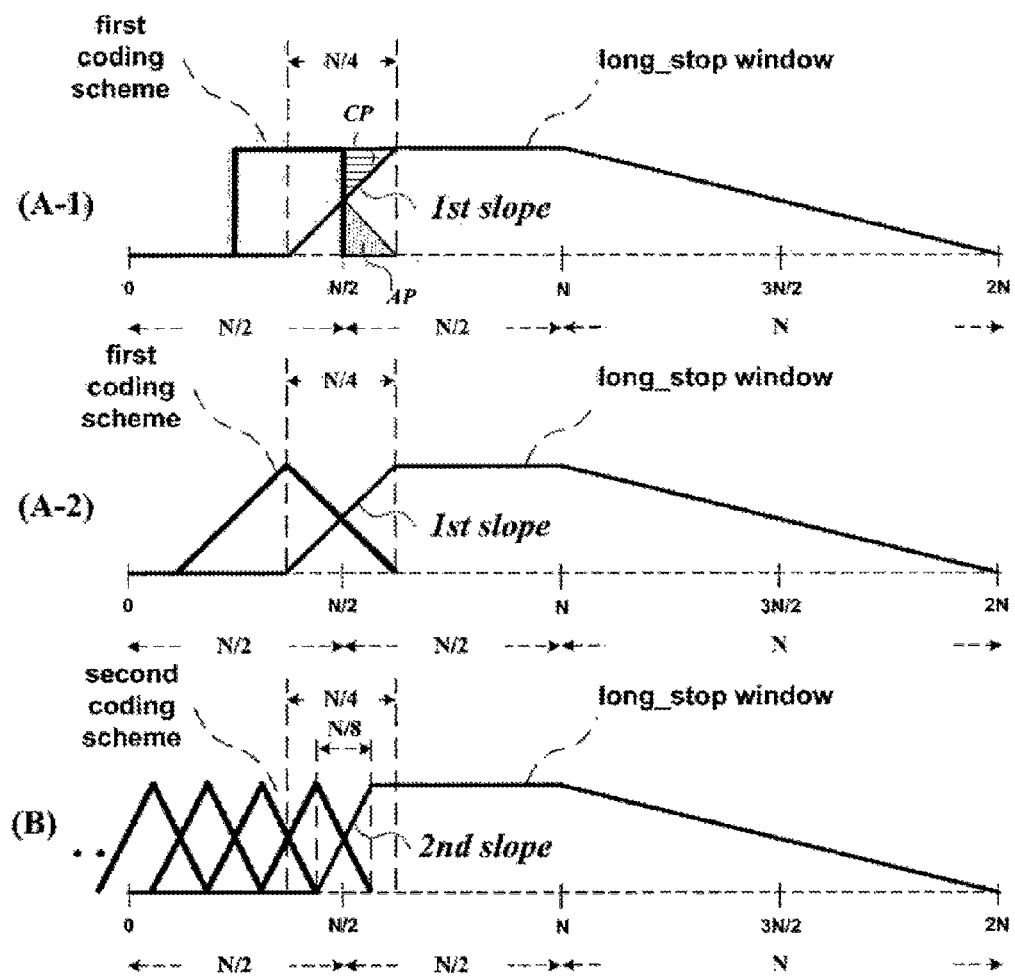
FIG. 17B is a diagram of a long_stop window combined with a first coding scheme window or a second coding scheme window (short window)

Similar to FIG. 17A, FIG. 17B (A-1) illustrates an example in which a rectangular coding scheme among the first coding scheme is applied to a previous frame, (A-2) illustrates an example in which a non-rectangular coding scheme among the first coding scheme is applied to a previous frame, and (B) illustrates an example in which the second coding scheme is applied to a previous frame. An ascending line of a long_stop window of a current frame has a first slope (i.e., the long_stop window of the current frame is a gentle long_stop window) when a previous frame corresponds to the first coding scheme for the same reason as described above with reference to FIG. 17A. An ascending line of a long_stop window of a current frame has a second slope (i.e., the long_stop window of the current frame is a steep long_stop window) when a previous frame corresponds to the second coding scheme.

Here, the first slope is gentler than the second slope. A width of the first slope can be twice that of the second slope and can correspond to N/4, where 'N' is a length of a frame. Additionally, the width of the first slope amounts to 256 samples and can correspond to ⅛ of a total length of the long_stop window.

The third case is described below with reference to FIGS. 17C and 17D. As described above, in the third case, when a current frame is a stop_start window, a shape of a current stop_start window is determined according to whether a previous frame or a following frame corresponds to a second coding scheme (short window) or a window with a first coding scheme. In particular, a slope of an ascending line or a descending line of the stop_start window can vary. A stop_start window, which has a gentle slope in both ascending and descending lines, shall be named a gentle-gentle stop_start window (cf. a name per shape in Table 1) and a stop_start window, which has a gentle slope (second slope) in both ascending and descending lines, shall be named a steep-steep stop_start window. A stop_start window, which has a gentle slope (first slope) only in an ascending line, shall be named a gentle-steep stop_start window and a stop_start window, which has a gentle slope (first slope) only in a descending line, shall be named a steep-gentle stop_start window.

Figure 17D:
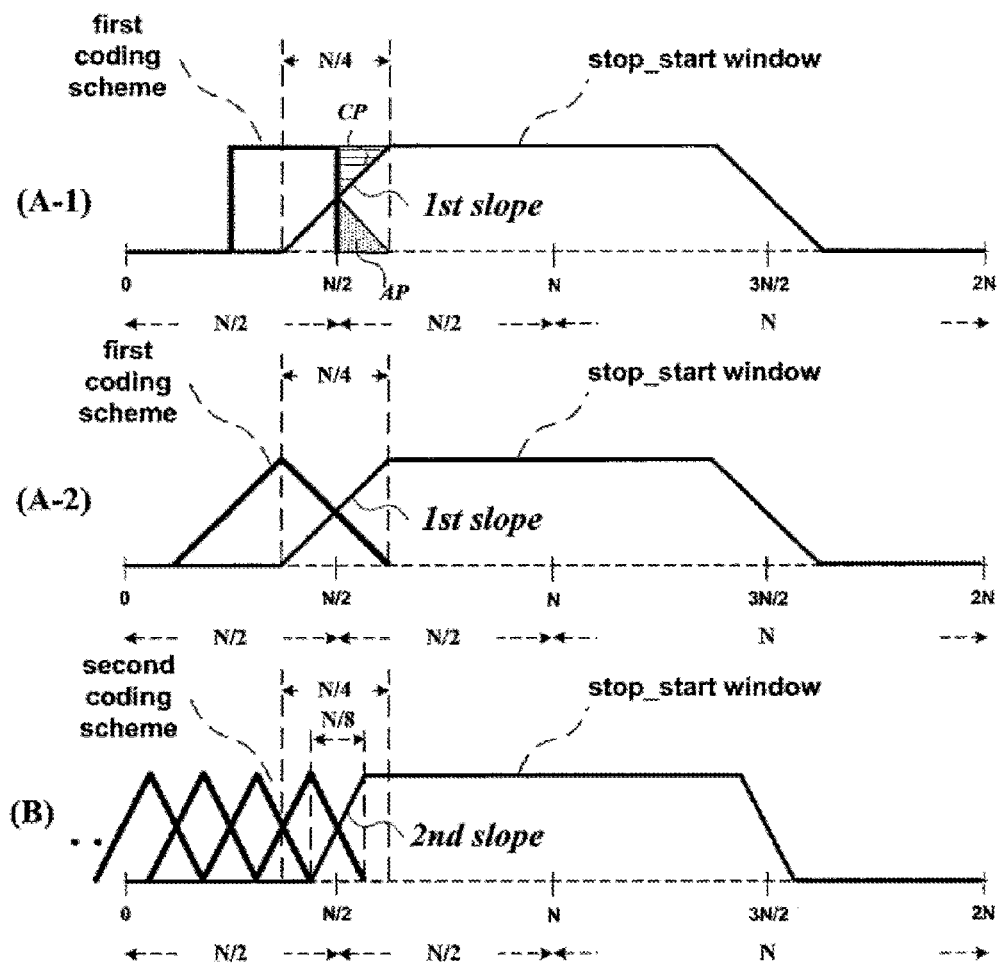

FIG. 17C illustrates the case where a slope of a descending line of a stop_start window is determined to be the first slope or the second slope according to a following frame and FIG. 17D illustrates the case where a slope of an ascending line of a stop_start window is determined to be the first slope or the second slope according to a previous frame.

The stop_start window may follow one of a long_start window, a short window, and a window corresponding to the first coding scheme for a previous frame and may be followed by one of a long_stop window, a short window, and a window corresponding to the first coding scheme for a following frame.

Referring to FIG. 17C, when the first coding scheme is applied to a following frame, a descending line of a stop_start window is determined to be the first slope as shown in (A-1) and (A-2) of FIG. 17C. That is, one of a gentle-gentle stop_start window or a steep-gentle stop_start window is applied to a current frame for the same reason as described above with reference to FIGS. 17A and 17B.

On the other hand, when a following frame does not correspond to the first coding scheme but corresponds to a short window or a long_stop window (i.e., in the case of (B) of FIG. 17C), a descending line is determined to be the second slope. That is, a gentle-steep stop_start window or a steep-steep stop_start window is applied to a current frame.

Referring to FIG. 17D, when the first coding scheme is applied to a following frame, an ascending line of a stop_start window is determined to be the second slope as shown in (A-1) and (A-2) of FIG. 17C. That is, one of a gentle-gentle stop_start window or a gentel-steep stop_start window is applied to a current frame.

On the other hand, when a following frame does not correspond to the first coding scheme but corresponds to a short window or a long_start window (i.e., in the case of (B) of FIG. 17D), a descending line is determined to be the second slope. That is, a gentle-steep stop_start window or a steep-steep stop_start window is applied to a current frame. Referring now to Table 1, a short window has a single shape irrespective of a coding scheme of a previous or following block. This is explained with reference to FIG. 18 as follows. FIG. 18 is a diagram of a short window overlapped with a first coding scheme window (A) or a second coding scheme window (B). Referring to FIG. 18 (A-1), a first coding scheme, and more particularly, a rectangular coding scheme (e.g., A coding scheme) appears behind a short window. Referring to FIG. 18 (A-2), a first coding scheme, and more particularly, a non-rectangular coding scheme (e.g., B coding scheme) appears behind a short window. Here, a short window may follow one of a long_start window or a stop_start window when a previous frame corresponds to the second coding scheme, and a short window may be followed by one of a long_stop window or a stop_start window when a following frame corresponds to the second coding scheme.

Irrespective of a case that a short window is overlapped with a window of a first coding scheme following the short window, as shown in FIG. 18 (A-1) or FIG. 18 (A-2), or a case that a short window is overlapped with a window (particularly, a long_stop window or a stop_start window) of a second coding scheme following the short window, as shown in FIG. 18 (B), a slope (cf. 'slope A' in the drawing) of a descending line of the short window is identical. Thus, the reason why the short window in the same fixed shape is possible is explained as follows. First of all, as mentioned in the foregoing descriptions of the first and second embodiments, even if a rectangular coding scheme appears behind a short window, it is able to compensate a correction part (CP) and an aliasing part (AP) using a compensation signal [FIG. 18 (A-1)]. A detailed description of compensation using a correction part (CP) and an aliasing part (AP) is omitted herein since it is already described above in the first and second embodiments. Such compensation is possible if overlapping of 50% or more is achieved. And, a descending line of a last one of 8 short parts (i.e., triangular shapes) included in a short window needs not to have a steep slope as well. Therefore, it is able to maintain a relatively gentle slope (i.e., 'slope A') (e.g., width of N/8, where N is a frame length) at the same level of an ascending line, as shown in FIG. 18 (A-1) [like the case shown in FIG. 17A (A-1). Accordingly, it is able to use a short window of the same fixed shape irrespective of whether a following block corresponds to a first or second coding scheme.

Meanwhile, if a current frame is a long_stop window and a following frame is an only_long window, a shape of a current long_stop window can be determined according to a previous frame corresponds to a window of a first coding scheme. This shall be explained in detail with reference to a fourth embodiment.

Referring now to FIG. 15, the window type determining part 127-2, as mentioned in the foregoing description with reference to Table 1, determines a specific window to apply to a current block among of a plurality of windows, generates window type information indicating the determined specific window, and then delivers the generated window type information to the multiplexer.

Afterwards, the multiplexer 130 generates at least one stream by multiplexing data (e.g., data of the $(N+1)^{th}$ or $(N-1)^{th}$ block) encoded by a first coding scheme, data (e.g., data of $N^{th}$ block) encoded by a second coding scheme and the window type information together.

Figure 16:
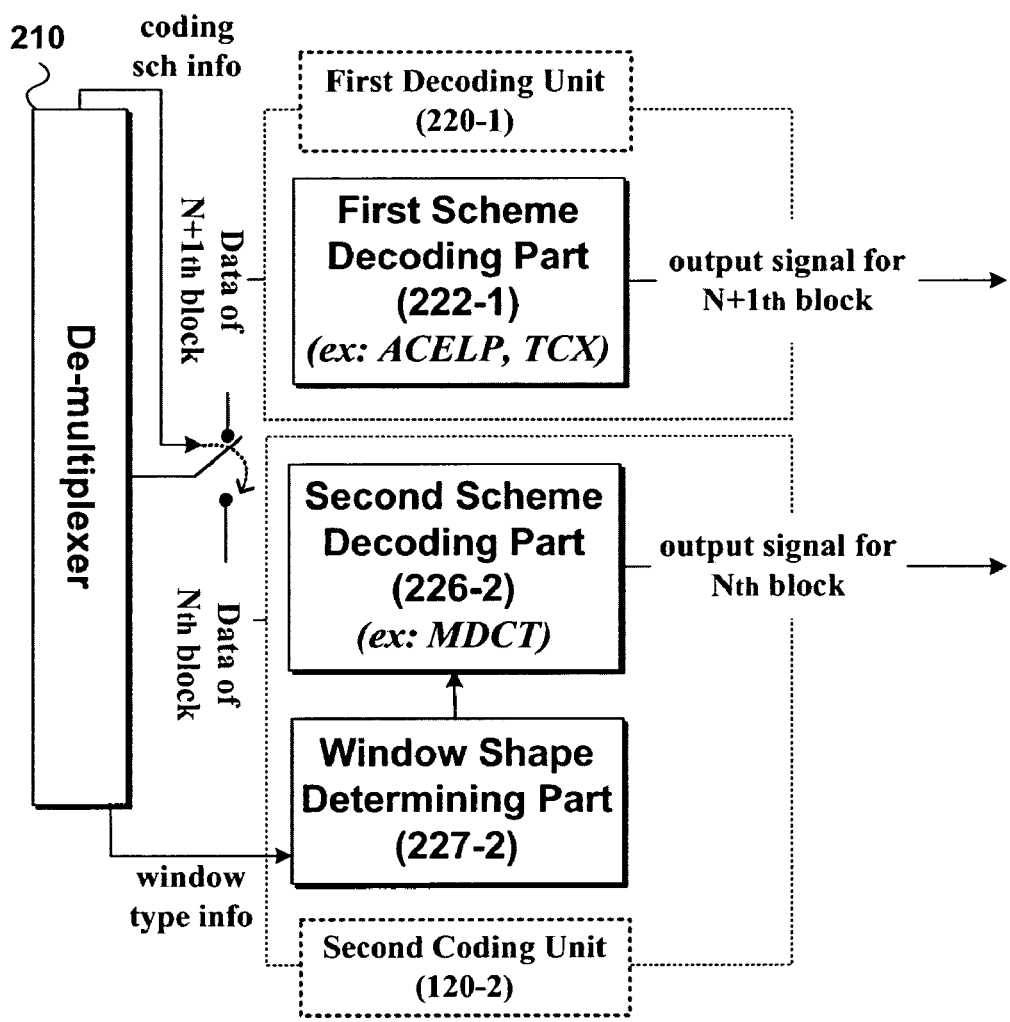
FIG. 16 is a block diagram of a decoder according to a third embodiment of the present invention.

Referring to FIG. 16, a decoder 200C according to a third embodiment includes a first decoding unit 220-1 and a second decoding unit 220-2 and is able to further include a demultiplexer 210. The first decoding unit 220-1 includes a first scheme decoding part 222-1 and the second decoding unit 20-2 includes a second scheme decoding part 226-2 and a window shape determining part 227-2.

The demultiplexer 210 receives the coding scheme information (e.g., coding identification information and sub-coding identification information) described with reference to FIG. 1 and then delivers data to the first decoding unit 220-1 or the second decoding unit 220-2 per block based on the received coding scheme information. Moreover, the demultiplexer 210 extracts the window type information and then delivers it to the second decoding unit 220-2. In this case, the window type information can include information indicating one of the five kinds of window types corresponding to Tale 1. Yet, as mentioned in the foregoing description, a window type of a current block can be limited due to a coding scheme or window type of a previous or following block instead of the availability of all of the five kinds of window types. Hence, the window type information may include the information indicating one of two or three kinds of types except unavailable window types instead of indicating one of total five kinds. This transition limitation shall be additionally explained together with a fourth embodiment later.

The first scheme decoding part 222-1 is a component configured to perform a process reverse to that of the first scheme encoding part 122-1. The first scheme decoding part 222-1 generates an output signal [e.g., an output signal of the $(N+1)^{th}$ block or $(N-1)^{th}$] by decoding data by a first coding scheme (e.g., ACELP, TCX, etc.). And, the second scheme decoding part 226-2 generates an output signal (e.g., an output signal of $N^{th}$ block) by decoding data by a second coding scheme (e.g., MDCT, etc.).

The window shape determining part 227-2 identifies a window type of a current block based on the window type information and then determines a window type among the window types according to a coding scheme of a previous or following block. As mentioned in the foregoing description with reference to FIG. 17A, in the first case, when a current window is a long_start window and a previous window is an only_long window, a window shape is determined by selecting either a steep long_start window or a gentle long_start window according to whether a following window corresponds to a first coding scheme or a second coding scheme. Also, as mentioned in the foregoing description with reference to FIGS. 17B to 17D, a current window shape is determined according to whether a previous or a following window corresponds to the first coding scheme in both the second case (i.e., when a current window is a long_stop window) and the third case (i.e., when a current window is a stop_start window).

In the example described with reference to FIG. 18, if a current block is a short window, a short window of the same shape is determined irrespective of a window type of a following block.

Subsequently, the second scheme decoding part 226-2 applies the window in the shape determined by the window shape determining part 227-2 to the current block.

In the following description, a fourth embodiment of the present invention is explained with reference to FIGS. 19 to 23. A fourth embodiment of the present invention determines a window shape of a current block according to a coding scheme of a previous block, whereas the third embodiment determines a window shape of a current block according to a coding scheme of a following block. Thus, the fourth embodiment of the present invention is almost identical to the third embodiment of the present invention but just differs from the third embodiment in determining a window shape. And, the redundant description of the same parts shall be omitted from the following description.

Figure 19:
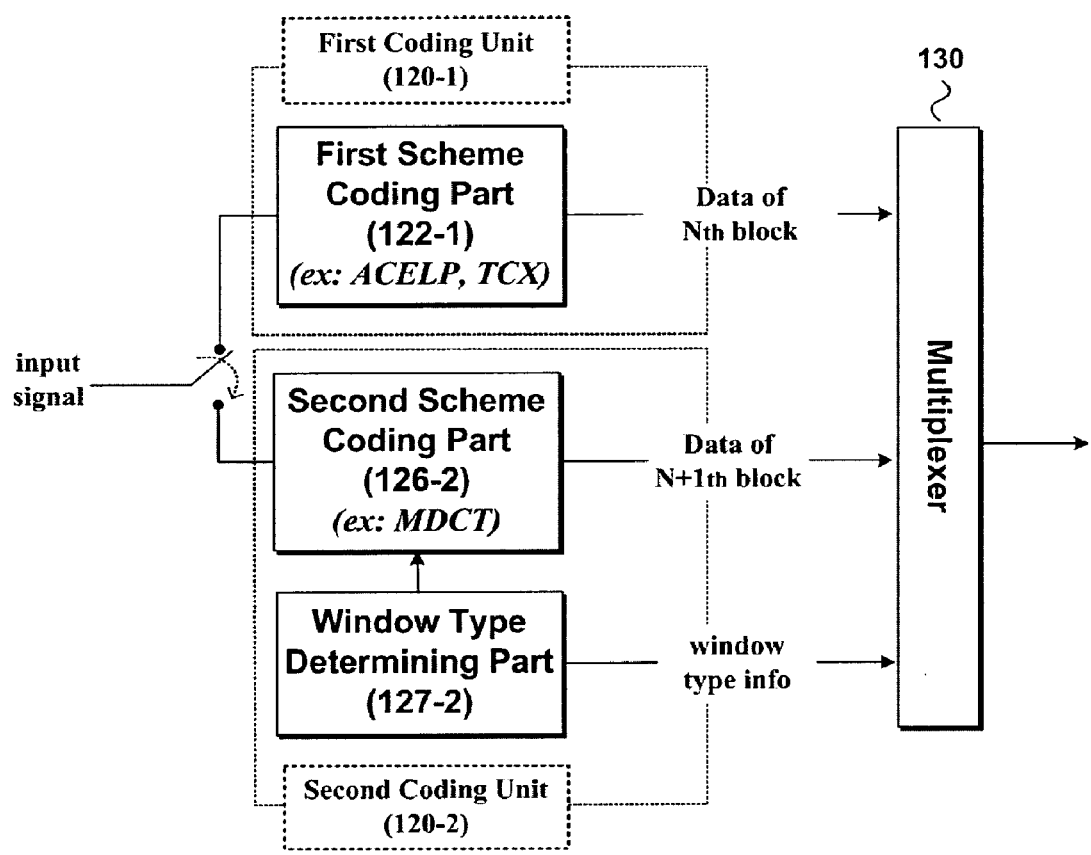
FIG. 19 is a block diagram of an encoder according to a fourth embodiment of the present invention.
Figure 20:
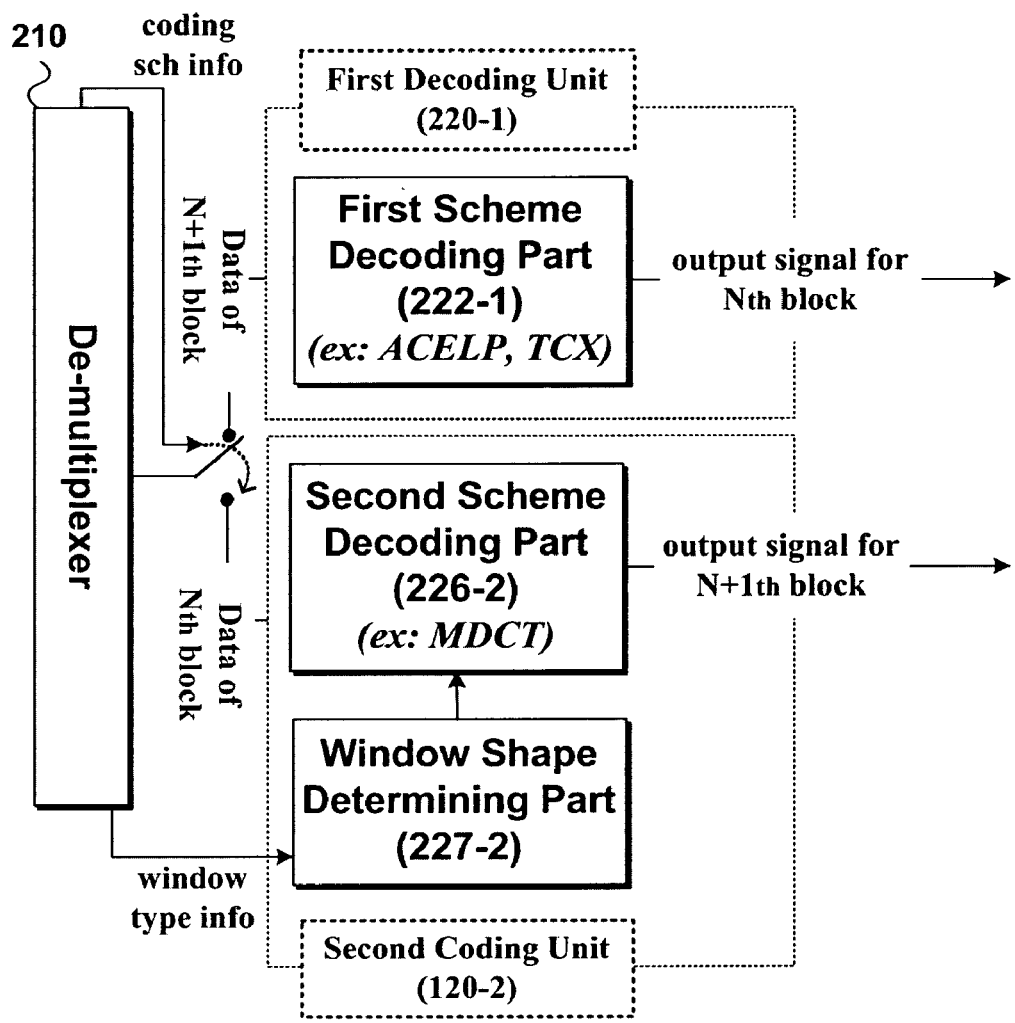
FIG. 20 is a block diagram of a decoder according to a fourth embodiment of the present invention.

FIG. 19 is a block diagram of an encoder according to a fourth embodiment of the present invention, and FIG. 20 is a block diagram of a decoder according to a fourth embodiment of the present invention.

Referring to FIG. 19 and FIG. 20, components of an encoder 100D and a decoder 200D according to a fourth embodiment of the present invention are almost identical to the respective components of the former encoder and decoder 100C and 200C according to the third embodiment of the present invention shown in FIG. 15 and FIG. 16 but the fourth embodiment of the present invention differs from the third embodiment of the present invention in that $N^{th}$ block and $(N+1)^{th}$ block are encoded by a first coding scheme and a second coding scheme, respectively. Therefore, the former description of the same parts explained with reference to FIG. 15 and FIG. 16 shall be substituted for the description of the fourth embodiment of the present invention.

A window type determining part 127-2 determines a window of a current block in consideration of inter-block window transition. In particular, the window type determining part 127-2 determines a window type and shape of a current block [e.g., $(N+1)^{th}$ block] according to whether a previous block (e.g., $N^{th}$ block) is coded by a first coding scheme. In particular, in case that a previous block is coded by a first coding scheme, one (e.g., a short window, a long_stop window and a stop_start window) of three types except an only-log window and a long_start window among 5 kinds of types shown in Table 1 is determined as a window type. Thus, without going through a transition window necessary for inter-coding scheme transition in the first coding scheme, it is able to directly move to a short window used in the second coding scheme or a transition window (i.e., a long_stop window or a stop_start window) used for transition between a short window and a long window.

Such an inter-window path is shown in FIG. 21. FIG. 21 is a table of inter-window paths or transitions. Referring to FIG. 21, a row direction indicates a window corresponding to a previous block, while a column direction indicates a window corresponding to a current block. A part having a mark of circle or star indicates an available window transition path. For instance, in case that a previous block corresponds to an only_long window, an only_long window of a long_start window is available for a current block only.

Referring to the star marks, in case that a previous block is a block corresponding to a first coding scheme (e.g., ACELP or TCX), as mentioned in the foregoing description, one of a short window, a long_stop window and a stop_start window can become a window corresponding to a second coding scheme. In particular, it is unnecessary to go through a window (e.g., a window corresponding to 1,152 samples) separately provided for a transition to a second coding scheme from a first coding scheme. This is because a crossing point coincides irrespective of a coding scheme, as mentioned in the foregoing description of the third embodiment. The following description is made with reference to FIG. 22 and FIG. 23.

Figure 22:
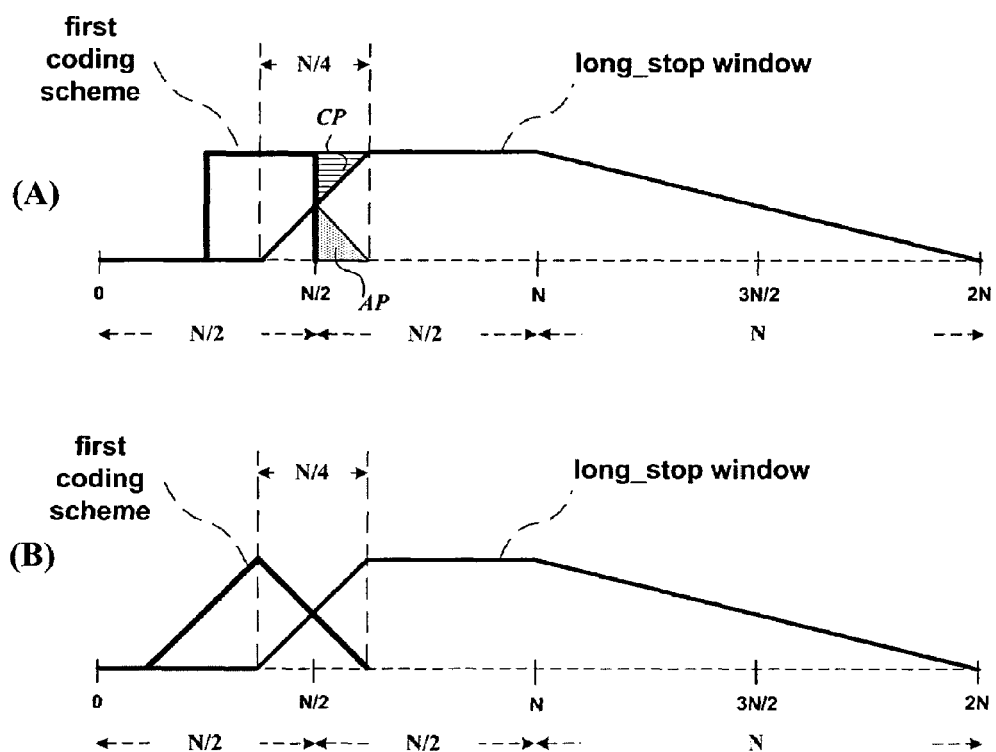
FIG. 22 is a diagram for a case of transition to a long_stop window in a first coding scheme.
Figure 23:
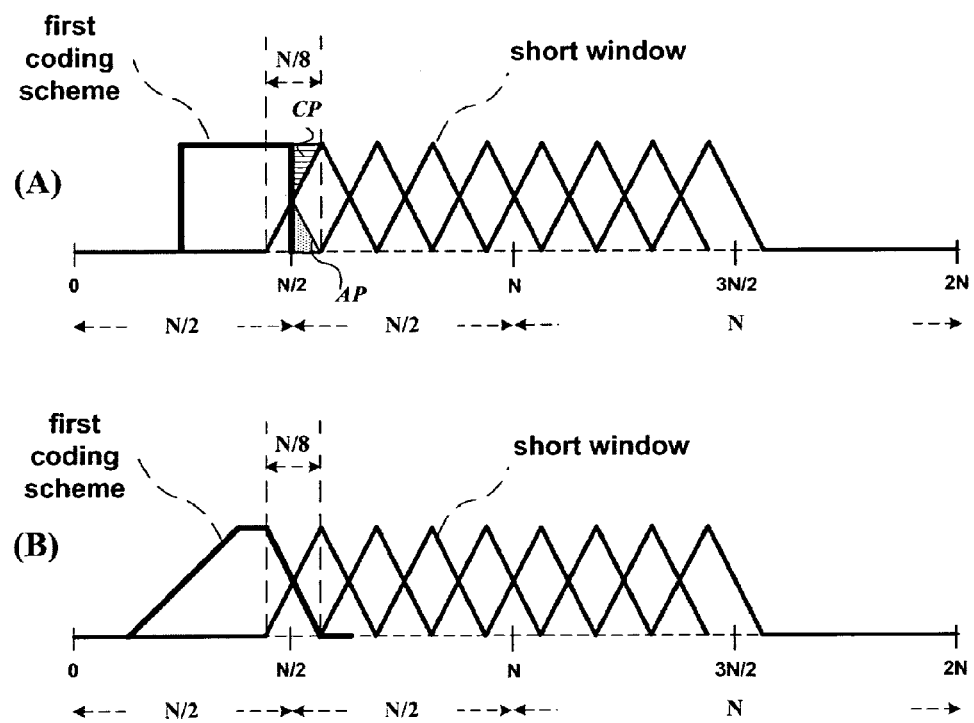
FIG. 23 is a diagram for a case of transition to a short window in a first coding scheme.

FIG. 22 is a diagram for a case of transition to a long_stop window in a first coding scheme, which corresponds to the star mark ★ (1) shown in FIG. 21. FIG. 23 is a diagram for a case of transition to a short window in a first coding scheme, which corresponds to the star mark ★ (2) shown in FIG. 21.

First of all, FIG. 22 (A) shows a crossing between a window corresponding to a rectangular coding scheme (e.g., ACELP) belonging to a first coding scheme and a long_stop window. FIG. 22 (B) shows a crossing between a window corresponding to a non-rectangular coding scheme (e.g., TCX) belonging to a first coding scheme and a long_stop window. In both FIG. 22 (A) and FIG. 22 (B), it can be observed that a transition to a long_stop window from a block corresponding to a first coding scheme is possible.

Since a rectangular window is shown in FIG. 22 (A), as mentioned in the foregoing description of the first or second embodiment, it is able to compensate a correction part (CP) and an aliasing part (AP), which are errors caused by the overlapping between a rectangular window and a non-rectangular window. Hence, 50% of the overlapping is enough and an ascending line of a long_stop window, as mentioned in the foregoing description with reference to FIG. 14 (A), can have a gentle slope (e.g., N/4 width). Accordingly, since an inter-window crossing point is located in a distance of N/2, a long-sop window corresponding to 1.024 samples or a length of 2N (where N indicates a frame) can be directly connected unlike the case that 100% of the overlapping is required.

A third case (i.e., a transition to a stop_start window) is not shown in FIG. 21. Like the case of the long_stop window or the short window, a stop_start window corresponds to 1,024 samples or has a length of 2N. In this case, it is able to make a direct transition to a stop_start window from a window corresponding to a first coding scheme.

In case of FIG. 22 (A), a slope of an ascending line of a long_stop window shall be described in addition to the second embodiment. In case that a current frame and a following frame are a long_stop window and an only_long window, respectively, a shape of a current long_stop window can be determined according to whether a previous frame corresponds to a window of a first coding scheme. This is as good as the former description with reference to FIG. 14. In particular, like the case shown in FIG. 14 (A), in case that a previous frame corresponds to a first coding scheme [e.g., A coding scheme (i.e., a rectangular coding scheme) in FIG. 14 (A)], an ascending line of a current long_stop window has a first slope. Like the case shown in FIG. 14 (B), in case that a previous frame corresponds to a second coding scheme [e.g., C coding scheme (i.e., a non-rectangular coding scheme) in FIG. 14 (B)], an ascending line of a current long_stop window has a second slope. In this case, the first slope is gentler than the second slope.

Referring now to the fourth embodiment, as mentioned in the above description with reference to FIG. 21, in case that a previous block and a current block correspond to a first coding scheme and a second coding scheme, respectively, one of a short window, a long_stop window and a stop_start window is determined.

The window type determining part 127-2 shown in FIG. 19 determines a window type of a current block by referring to coding schemes and window types of previous and following blocks. In doing so, the window type determining part 127-2 determines the window type of the current block according to the above-explained path limitation. Occasionally, the window type determining part 12702 determines a shape of a window of the current block as well. Afterwards, the window type determining part 127-2 delivers window type information indicating the determined window type to the multiplexer 130.

The second scheme coding part 126-2 encodes the current block according to the second coding scheme using the determined window type and shape. And, the multiplexer 130 generates at least one bitstream by multiplexing the data of the previous block, the data of the current block and the window type information of the current block together.

Referring to FIG. 20, components except the window shape determining part 227-2 have functions or roles similar to the former components shown in FIG. 16 and shall not described in detail in the following description.

The window shape determining part 227-2 determines a specific window for a current block among a plurality of windows based on window type information. In doing so, it is able to determine one of a plurality of the windows in consideration of the transition limitation shown in FIG. 21. This is explained in detail as follows.

Referring to FIG. 21, if a current block corresponds to a second coding scheme, the total number of kinds of available window types does not exceed 3 according to a window type of a previous block [e.g., 2, 3, 3, 2, 3 and 3 kinds from the top in order]. Hence, the window type information can be encoded with 2 bits. One example of the window type information is shown in Table 2.

TABLE 2

| Window type information | |
|---|---|
| | window type info |
| only_long window | 0 |
| long_start window | 1 |
| short window | 2 |
| long_stop window | 3 |
| stop_start window | 1 |

If window type information is set to 1, it indicates a long_start window and a stop_start window, i.e., two cases. Meanwhile, according to the transition limitation disclosed in FIG. 21, in case that a previous block corresponds to a first coding scheme, a short window, a long_stop window and a stop_start window are available for a current block only. Hence, in the above two cases, the stop_start window is determined as a window of the current block except one case violating the limitation (i.e., a long_start window).

The window shape determining part 227-2 determines a window shape such as a slope of an ascending line of the current block, a slope of a descending line of the current block and the like based on the coding scheme of the previous or following block, according to the above-determined window type. Thus, the fourth embodiment has been described so far. In the following description, another method for solving a problem of a window transition between a first coding scheme and a second coding scheme is explained with reference to FIG. 24.

Figure 24:
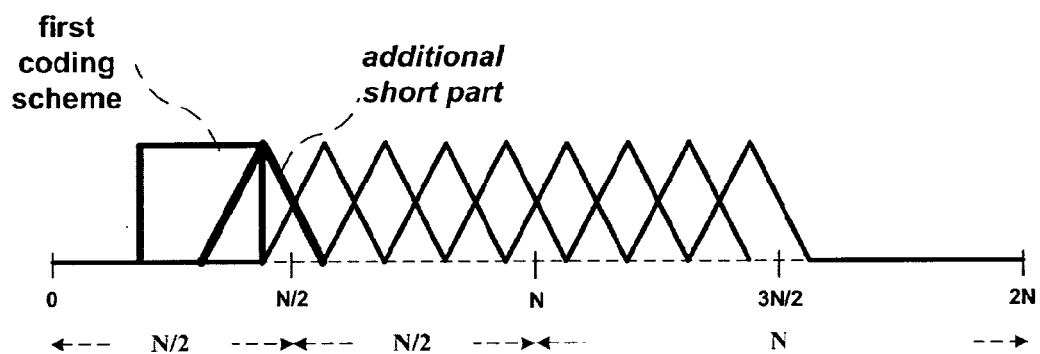
FIG. 24 is a diagram for a case that a first coding scheme window is overlapped with a short window in a new shape.

FIG. 24 is a diagram for a case that a first coding scheme window is overlapped with a short window in a new shape. As mentioned in the foregoing description, when a block of a first coding scheme and a block of a second coding scheme are adjacent to each other, it is not possible for the two blocks to be overlapped with each other by 50%. Instead, since the two blocks should be overlapped with each other by 10%, a crossing point is located ahead of a point N/2. In order to solve this problem of mismatch, a transition block having a length of 1,152 should be provided between the block of the first coding scheme and the block of the second coding scheme. In particular, although it is necessary to go over into a short window belonging to the second coding scheme behind the block of the first coding scheme, a long window having a length of 1,152 should be gone through. Therefore, in this case, a long window is applied to a current block that should be processed with a short window and a short window is applied to a following block. Thus, since a current block supposed to be processed with a short window is processed with a long window due to a transition problem, a sound quality becomes distorted.

In addition to the long window having the length of 1,152, in case that a short window, which includes total 9 short parts including a short part, having a length of 1,152 is used, as shown in FIG. 24, the problem of the sound quality distortion is reduced. Yet, as mentioned in the foregoing description, the short window having the length of 1,152 shown in FIG. 24 is applicable only if a crossing point variation due to the 50% overlapping and a corresponding direct transition (cf. Third or fourth embodiment) are impossible.

Figure 25:
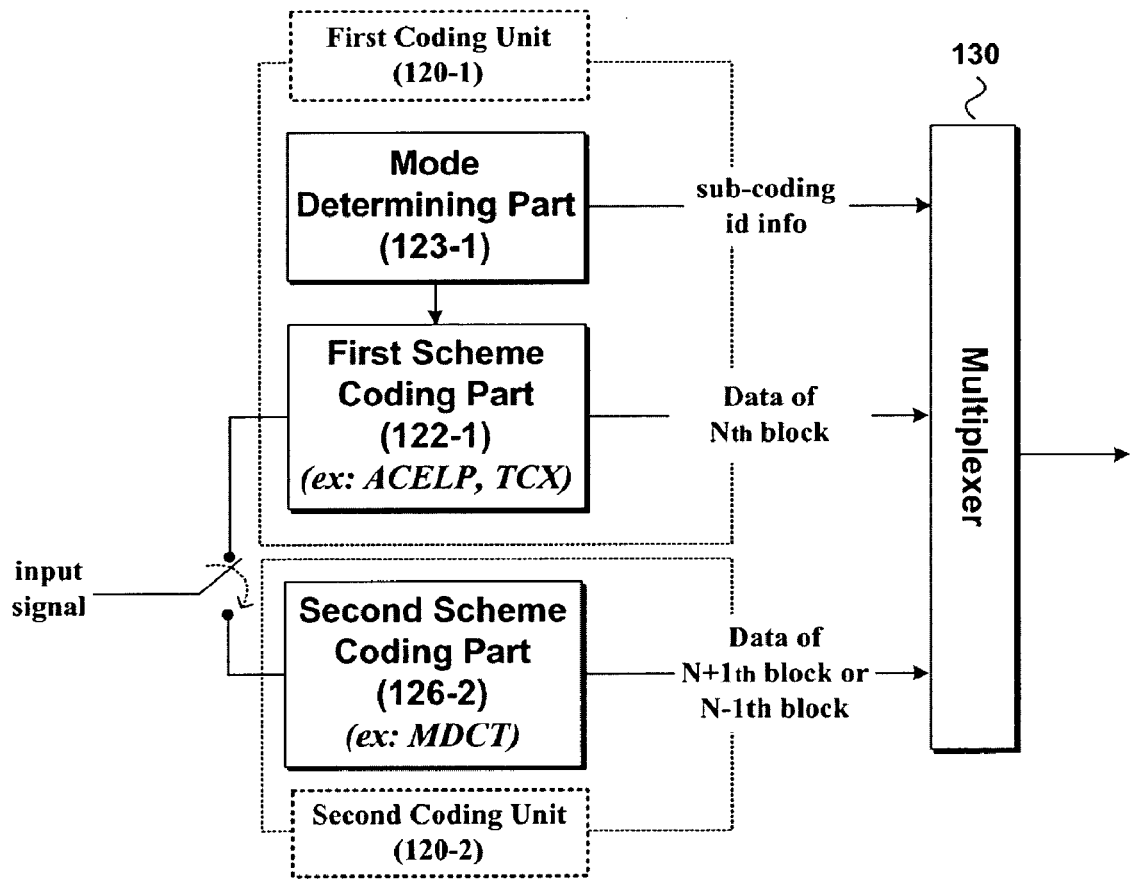
FIG. 25 is a block diagram of an encoder according to a fifth embodiment of the present invention.

In the following description, a fifth embodiment of the present invention is explained with reference to FIG. 25 and FIG. 26. According to the fifth embodiment of the present invention, in case that a current block (e.g., $N^{th}$ block) corresponds to a non-rectangular coding scheme (e.g., TCX) belonging to a first coding scheme, a window shape of a current block is determined according to whether a previous or following block [e.g., $(N-1)^{th}$ or $(N+1)^{th}$ block] corresponds to a short window of a second coding scheme. FIG. 25 is a block diagram of an encoder according to a fifth embodiment of the present invention. Referring to FIG. 25, since an encoder 100E according to a fifth embodiment of the present invention is almost identical to the former encoder 100C/100D of the third/fourth embodiment except a mode determining part 123-2, the redundant description shall be omitted from the following description.

First of all, when a current block corresponds to a first coding scheme, the mode determining part 123-1 identifies whether the current block corresponds to a rectangular coding scheme (e.g., ACELP) or a non-rectangular coding scheme (e.g., TCX). If the current block corresponds to the non-rectangular coding scheme, the mode determining part 123 determines one of modes 1 to 3. As each of the modes 1 to 3 can correspond to a length for applying the non-rectangular scheme thereto, one of a single subframe, two contiguous subframes and four contiguous subframes (i.e., a single frame) can be determined. Moreover, the length can be determined into one of 256 samples, 512 samples and 1,024 samples, as shown in FIG. 28.

Thus, in case of a non-rectangular coding scheme, after a mode has been determined, a shape of a window of a current block is determined according to whether a window of a previous or following block is a short window. This process is explained in detail with reference to FIG. 27 and FIG. 28 as follows.

Figure 27:
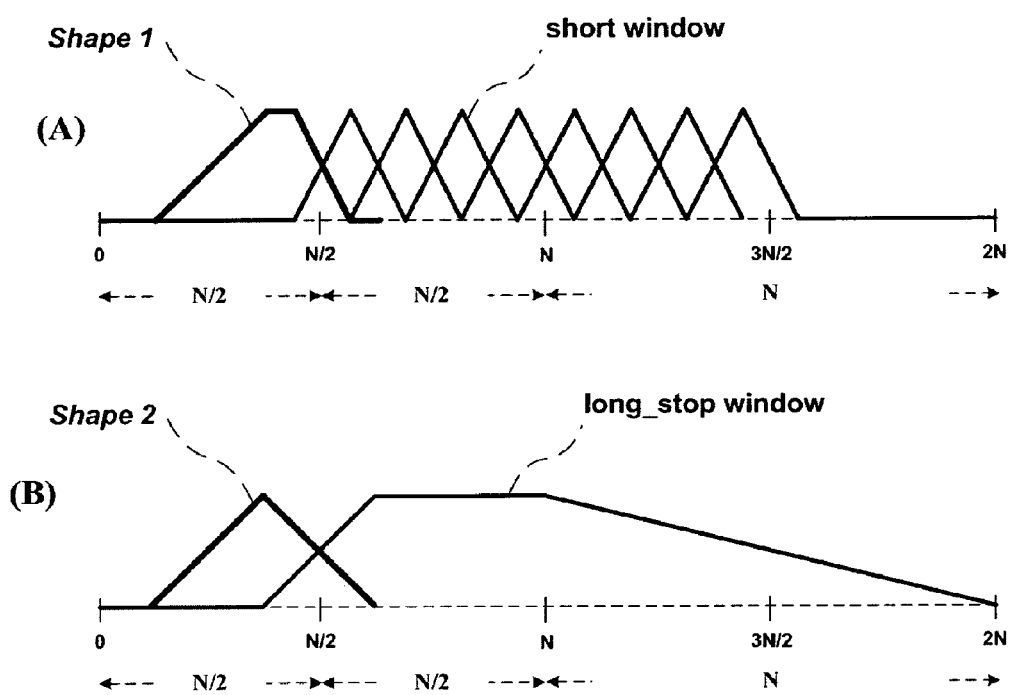
FIG. 27 is a diagram for a case that a window corresponding to a first coding scheme (e.g., TCX) is overlapped with a short window (or a long_stop window)

FIG. 27 (A) is a diagram for a case that a window corresponding to a first coding scheme (e.g., TCX) is overlapped with a short window. FIG. 27 (A) is a diagram for a case that a window corresponding to a first coding scheme (e.g., TCX) is overlapped with or a long_stop window. In particular, FIG. 27 (A) shows a window corresponding to the mode 1 (cf. Shape 1 and Shape 2 in FIG. 28) among windows of a first coding scheme and FIG. 27 (B) also shows a window corresponding to the mode 1 (cf. Shape 1 and Shape 2 in FIG. 28) among windows of a first coding scheme. In more particular, FIG. 27 (A) is identical to FIG. 23 (B), while FIG. 27 (B) is identical to FIG. 22 (B).

In case that a window corresponding to a first coding scheme is overlapped with a long_stop window, as shown in FIG. 27 (B), the window corresponds to Shape 1 and has a descending line of which width is equal to a width (e.g., N/4) of an ascending line of the long_stop window. In particular, a first slope of a descending line of Shape 1 is matched to a slope of an ascending line of a non-short window (e.g., long_stop window) of a next frame. In this case, the meaning of 'match' can indicate that an absolute value of a slope is equal.

On the contrary, in case that a window corresponding to a first coding scheme is overlapped with a short window, as shown in FIG. 27 (A), the window corresponds to Shape 2 and has a descending line of which width is equal to a width (e.g., N/5) of an ascending line of the short window. In particular, a second slope of a descending line of Shape 2 is matched to a slope of an ascending line of a short window of a next frame.

Thus, a width of a descending or ascending line can vary according to a previous or following block is a short window. By equalizing the width, it is able to met the TDAC condition described with reference to FIG. 8, Therefore, the sound quality distortion can be considerable reduced if the TDAC condition is met.

FIG. 28 is a table of a window corresponding to a non-rectangular scheme among first coding schemes varying within Shape 1 to Shape 4.

Referring to FIG. 28, according to whether a previous block and/or a following block corresponds to a short window, it can be observed that a shape of a window by a non-rectangular scheme belonging to a first coding scheme varies from Shape 1 to Shape 4. In case that each of the previous block and the following block does not correspond to the short window, Shape 1 indicates a case that a width of an ascending line L and a width of a descending line R correspond to 256 samples (i.e., N/4) and 256 samples (i.e., N/4), respectively. In Shape 2, since the following block corresponds to the short window only, a width of a descending line R is reduced into 128, a top line M is increased by 64, and a right zero part ZR is increased by 64. In shape 3, since the previous block corresponds to the short window only, a width of an ascending line L is reduced into 128 only, a length of a left zero part ZL is increased by 64 greater than that of Shape 1, and a length of a top line M is increased by 64 greater than that of Shape 1. Shape 4 indicates a case that each of the previous block and the following block corresponds to the short window. In Shape 4, an ascending line L corresponds to 128 and a descending line R corresponds to 128, irrespective of a mode (e.g., mode 1, mode 2 and mode 3).

For reference, windows corresponding to modes 1 to 3 in Shape 1 can be equal to FIG. 10 (A), FIG. 10 (B) and FIG. 10 (C), respectively.

Moreover, the previous block corresponds to a last subframe of a previous frame at least and the following block can correspond to a first subframe of a following frame at least.

Referring now to FIG. 25, when a first coding scheme (particularly, a non-rectangular scheme) is applied, the mode determining part 123-1 determines one of a plurality of modes including the modes 1 to 3 shown in FIG. 28. Information corresponding to the determined mode can be encoded together with the above-mentioned sub-coding identification information. For instance, if the sub-coding identification information is set to 0, it is able to indicate A coding scheme (i.e., a rectangular coding scheme as a first coding scheme). If the sub-coding identification information is set to 1 to 3, it is able to indicate the modes 1 to 3 of B coding scheme (i.e., a non-rectangular coding scheme as a first coding scheme), respectively.

Once the mode is determined, the mode determining part 123-1 determines a shape of a window among Shapes 1 to 4 according to whether a previous block and/or a following block corresponds to a short window.

And, the multiplexer 123-1 generates at least one bitstream by multiplexing the sub-coding identification information, data of the current block and data of the previous or following block together.

Figure 26:
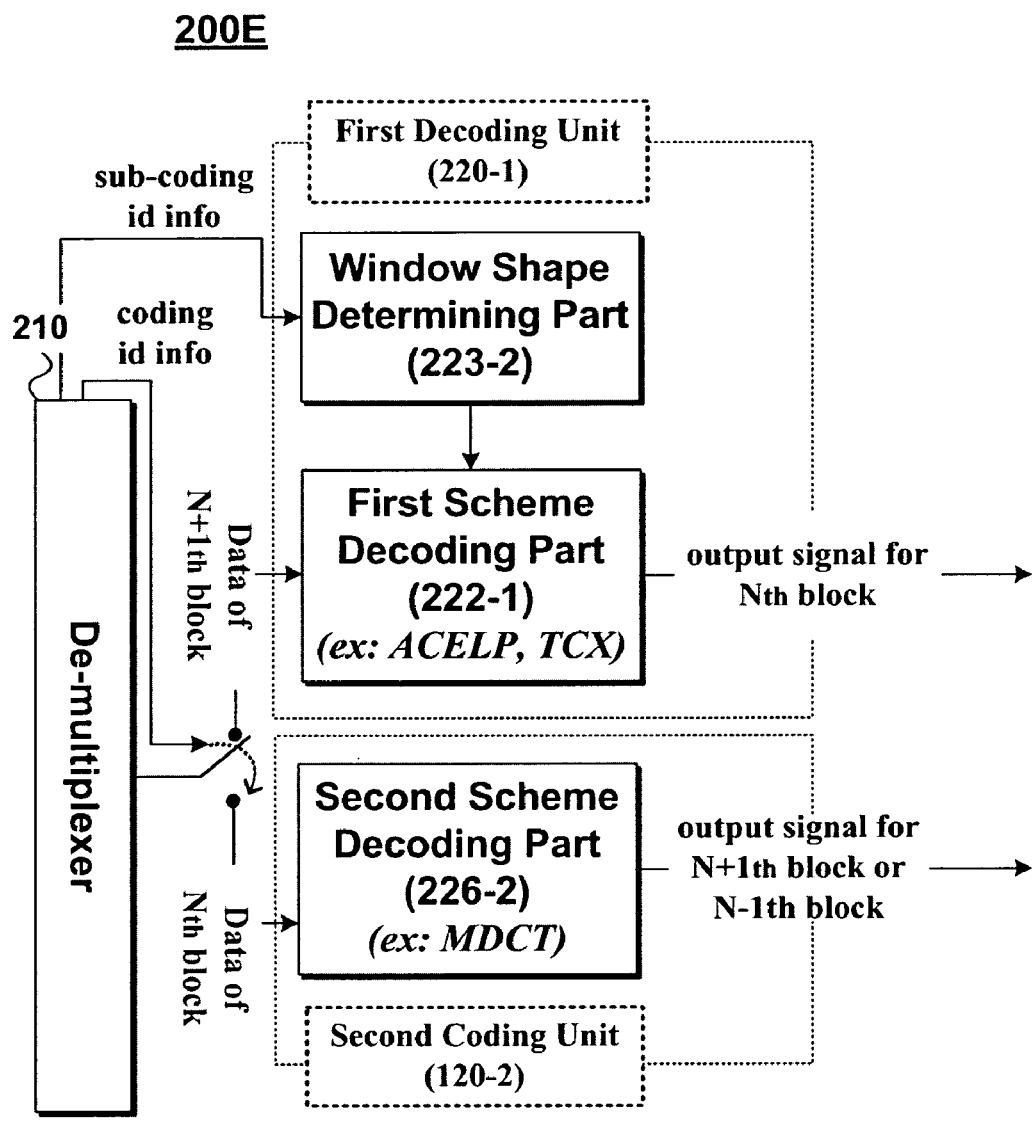
FIG. 26 is a block diagram of a decoder according to a sixth embodiment of the present invention.

Referring to FIG. 26, the window shape determining part 223-2 determines whether a current block is encoded by A coding scheme (i.e., a rectangular coding scheme) or B coding scheme (i.e., a non-rectangular coding scheme) belonging to a first coding scheme using the sub-coding identification information. Moreover, in case of the B coding scheme, using the sub-coding identification information, the window shape determining part 223-2 identifies one of the modes 1 to 3.

The window shape determining part 223-2 determines a shape of a window for the determined mode in a manner of identifying one of the Shapes 1 to 4 by determining whether a previous block and/or a following block corresponds to a short window. The rest of components shall not be described from the following description.

An encoder 100F and a decoder 200F according to a sixth embodiment of the present invention are described with reference to FIGS. 29 to 32 as follows. According to the sixth embodiment of the present invention, it is determined whether to perform a long-term prediction (LTP) according to a coding scheme of a previous block.

Figure 29:
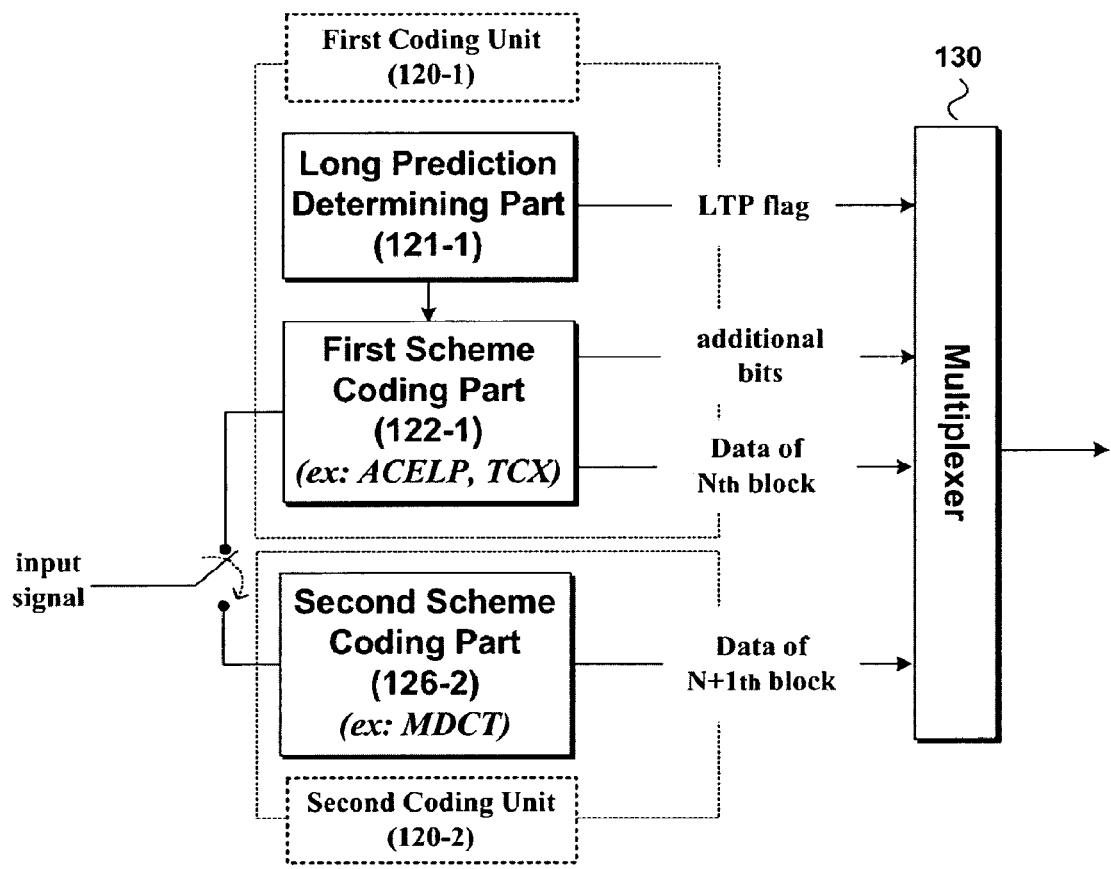
FIG. 29 is a block diagram of an encoder according to a sixth embodiment of the present invention.
Figure 30:
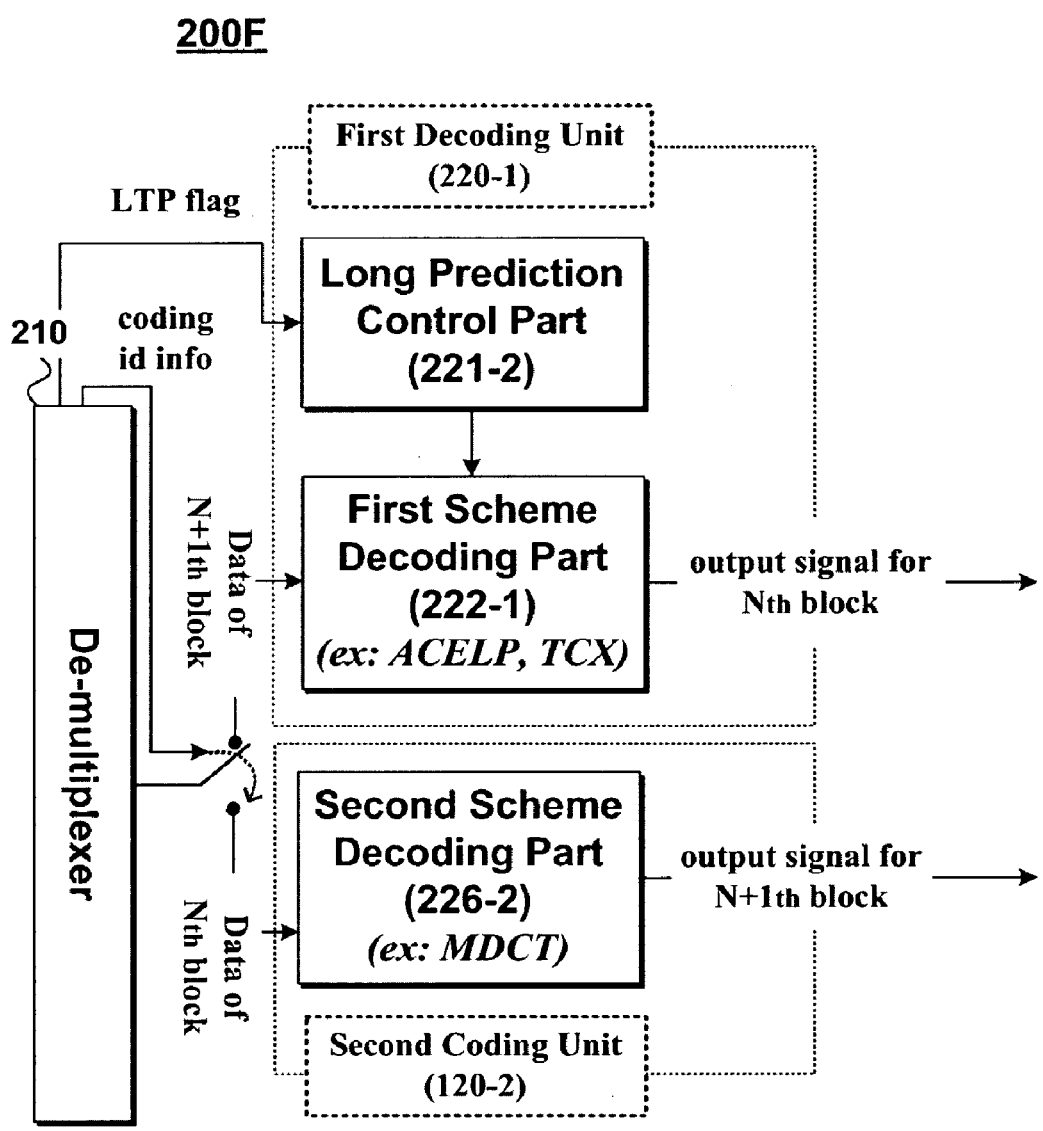
FIG. 30 is a block diagram of a decoder according to a sixth embodiment of the present invention.

FIG. 29 is a block diagram of an encoder according to a sixth embodiment of the present invention and FIG. 30 is a block diagram of a decoder according to a sixth embodiment of the present invention.

Referring to FIG. 29 and FIG. 30, an encoder 100F and a decoder 200F according to a sixth embodiment of the present invention are similar to the former encoder 100E and the decoder 200E of the fifth embodiment of the present invention but differ in including a long prediction determining part 121-1 and a long prediction control part 221-2. The long prediction determining part 121-2 determines whether to perform a long term prediction on a current block according to whether a first coding scheme (e.g., ACELP, TCX) or a second coding scheme (e.g., MDCT) is applied to a previous block. This is explained in detail with reference to FIG. 31 and FIG. 32 as follows.

Figure 31:
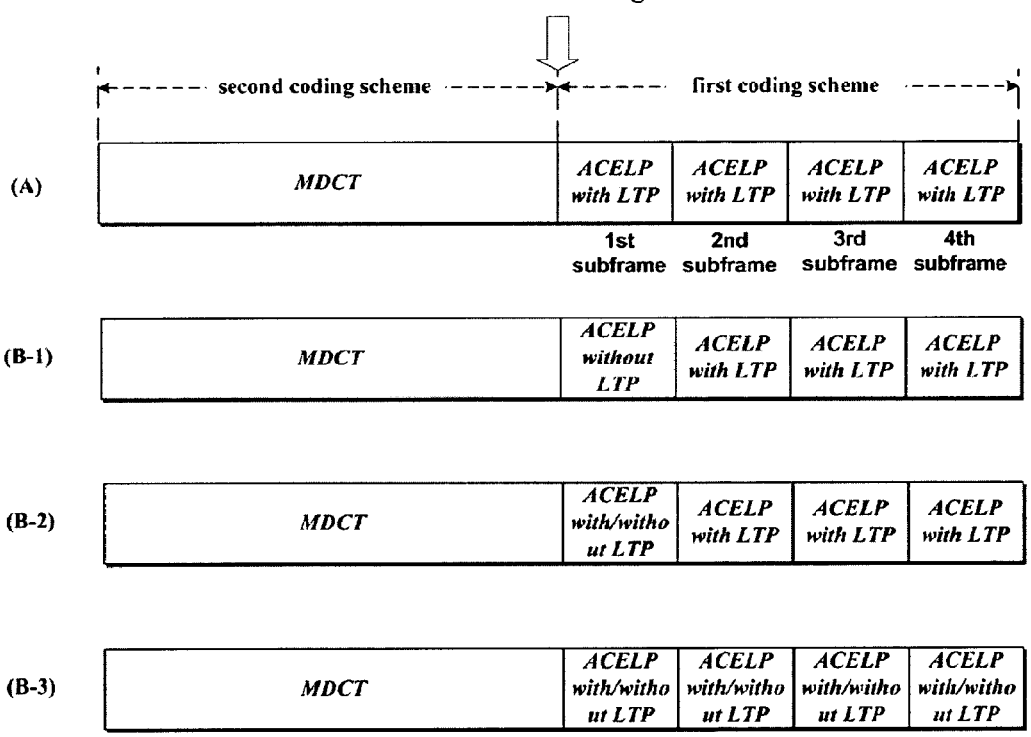
FIG. 31 is a diagram for examples of a coding scheme per block (frame or subframe)

FIG. 31 shows examples of a coding scheme per block (frame or subframe). FIG. 31 (A) to FIG. 31 (B-3) show examples that a block having a first coding scheme (e.g., ACELP) applied to thereto appears behind a block having a second coding scheme (e.g., MDCT) applied thereto, respectively. Thus, in case that there is a change of a coding scheme [mode switching], efficiency of a long term prediction in the first coding scheme (e.g., ACELP) may be considerably lowered. FIG. 32 is a diagram for one examples of a signal waveform related to a long term prediction. FIG. 32 (A) shows an example that a second coding scheme (e.g., MDCT) and a rectangular coding scheme (e.g., ACELP) of a first coding scheme are applied to a previous block and a following block, respectively according to a characteristic of a signal. FIG. 32 (B) shows one example of a signal of a block corresponding to a first coding scheme and a waveform of a signal as a result of performing a long term prediction (LTP). For a block after a second coding scheme, an original signal exists in a previous memory instead of a residual signal as a result of performing a linear prediction. Since a long term prediction is based on waveform correlation, if the long term prediction is applied to the above case, it is inevitable that coding efficiency is considerably lowered. Referring to FIG. 32 (B), it can be observed that there is no big difference in waveform between a long term prediction result and an original signal. Therefore, in this case, it is able to save bits allocated to the long term prediction without applying the long term prediction that lowers coding efficiency considerably.

Referring to FIG. 31 (B-1), a long term prediction (LTP) may not be unconditionally applied to a first appearing block (i.e., a first frame) after applying a second coding scheme (e.g., MDCT). Occasionally, referring to FIG. 31 (B-2), it is able to adaptively apply a long term prediction (LTP). For instance, only if coding efficiency is good in applying a long term prediction (LTP), the long term prediction (LTP) is performed. Thus, in case that the long term prediction is conditionally performed, it is able to set a long term flag (LTP flag) indicating whether a long term prediction (LTP) has been performed. Moreover, referring to FIG. 31 (B-3), a long term prediction is not performed on blocks (e.g., $2^{nd}$ to fourth blocks) unconditionally as well as a first appearing block or may not be performed thereon conditionally. Thus, in case that a long term prediction is not used conditionally, it is able to set a long term flag for a random block having a small effect of the long term prediction instead of setting a long term flag on a boundary with a block corresponding to a second coding scheme only. For instance, a long term prediction may not be performed in a voiceless part, a mute part or other music parts, in which a pitch does not exist, despite coding by a first coding scheme.

Referring now to FIG. 29, as mentioned in the foregoing description, the long prediction determining part 121-1 determines by a block unit whether to perform a long term prediction, based on a coding scheme of a previous block. If the long term prediction is not performed conditionally, the long term prediction determining part 121-1 delivers the long term flag (LTP flag) to the multiplexer 130.

In case of a block corresponding to a first coding scheme, if a long term prediction (LTP) is not performed, the first scheme coding part 122-1 generates new information amounting to bits that are saved in case of not performing the long term prediction. Examples of the new information are described as follows.

1) It is able to utilize an excitation codebook. In particular, more code books are designed rather than previous codebooks or a dedicated codebook in a size of surplus bits. In case of using the dedicated codebook, an excitation signal is generated by a combination of an excitation by an original codebook and an excitation by an additional codebook. In case of the dedicated codebook, it is possible to use a codebook configured to encode a pitch component well like the functionality of a long term prediction.

2) It is able to enhance quantization performance of LPC coefficient by allocating additional bits to a linear prediction coding [LPC].

3) It is able to allocate bits to code a compensation signal (i.e., a signal for compensating correction and aliasing parts generated from the overlapping between a non-rectangular window of a second coding scheme and a rectangular window of a first coding scheme) of the first or second embodiment.

4) Transmission amounting to saved bits is not performed. In particular, since a used bit amount is variable as many as a frame in case of audio coding, the saved bits are utilized in other frames.

Meanwhile, the first scheme coding part 122-1 delivers additional bits to the multiplexer 130 by encoding the new information for a block on which the long term prediction is not performed.

Finally, the multiplexer 130 generates at least one bitstream by multiplexing the long term flag (LTP flag), the additional bits corresponding to the new information and data corresponding to each block together.

Referring to FIG. 30, in case that a long term prediction is not performed conditionally, the demultiplexer 210 extracts the long term flag (LTP flag) and then delivers it to the long term prediction control part 221-2. If the long term prediction is not performed unconditionally in consideration of a coding scheme of a previous block, the long term prediction control part 221-2 determines whether the previous block corresponds to a second coding scheme. If the long term prediction is not performed conditionally despite that the coding scheme of the previous block corresponds to the second coding scheme, the long term prediction control part 221-2 determines whether to perform the long term prediction based on the long term flag (LTP flag) delivered from the multiplexer 130.

If so, the first scheme decoding part 222-1 performs the long term prediction on a block becoming a target of the long term prediction according to the determination made by the long term prediction control part 222-1. In case that additional bits are transmitted, the first scheme decoding part 222-1 extracts the new information corresponding to the additional bits and then performs decoding of the corresponding block based on the extracted new information.

In the following description, applications of the encoder and decoder according to the present invention described with reference to FIG. 1 and FIG. 2 are explained.

Figure 33:
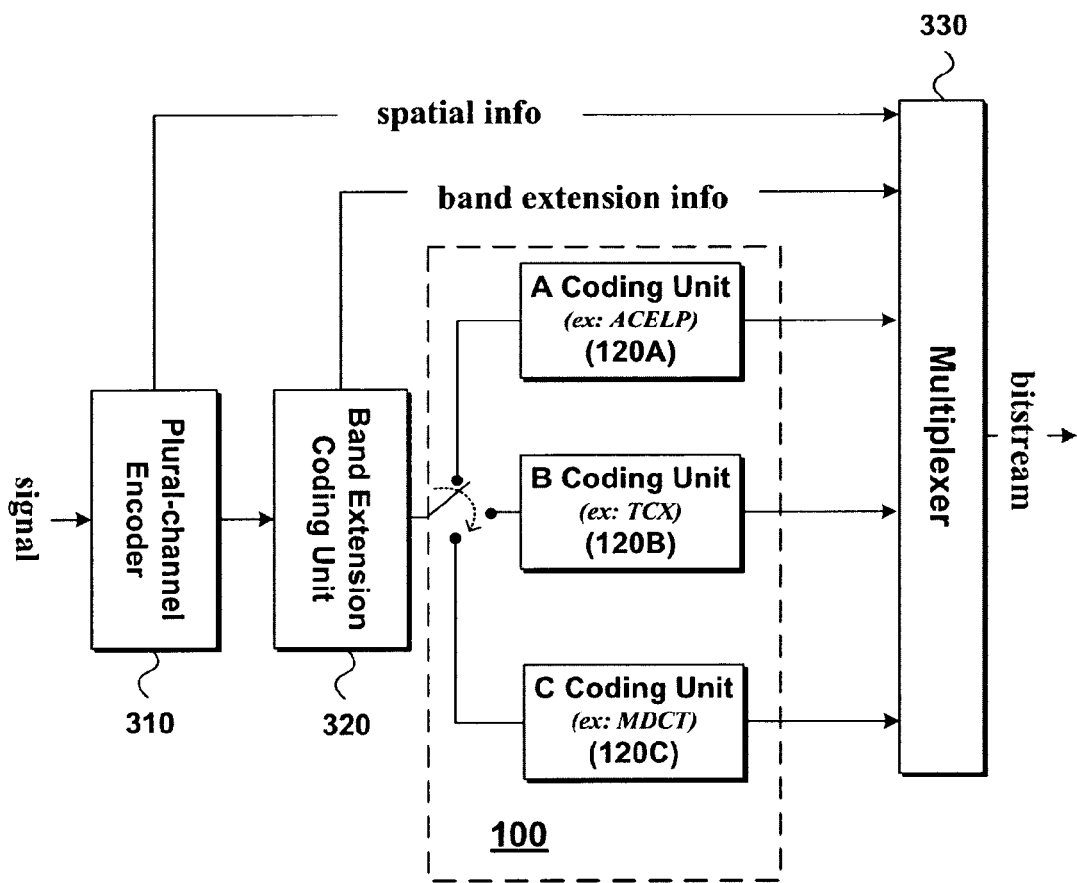
FIG. 33 is a diagram for an example of an audio signal encoding apparatus to which an encoder according to an embodiment of the present invention is applied.
Figure 34:
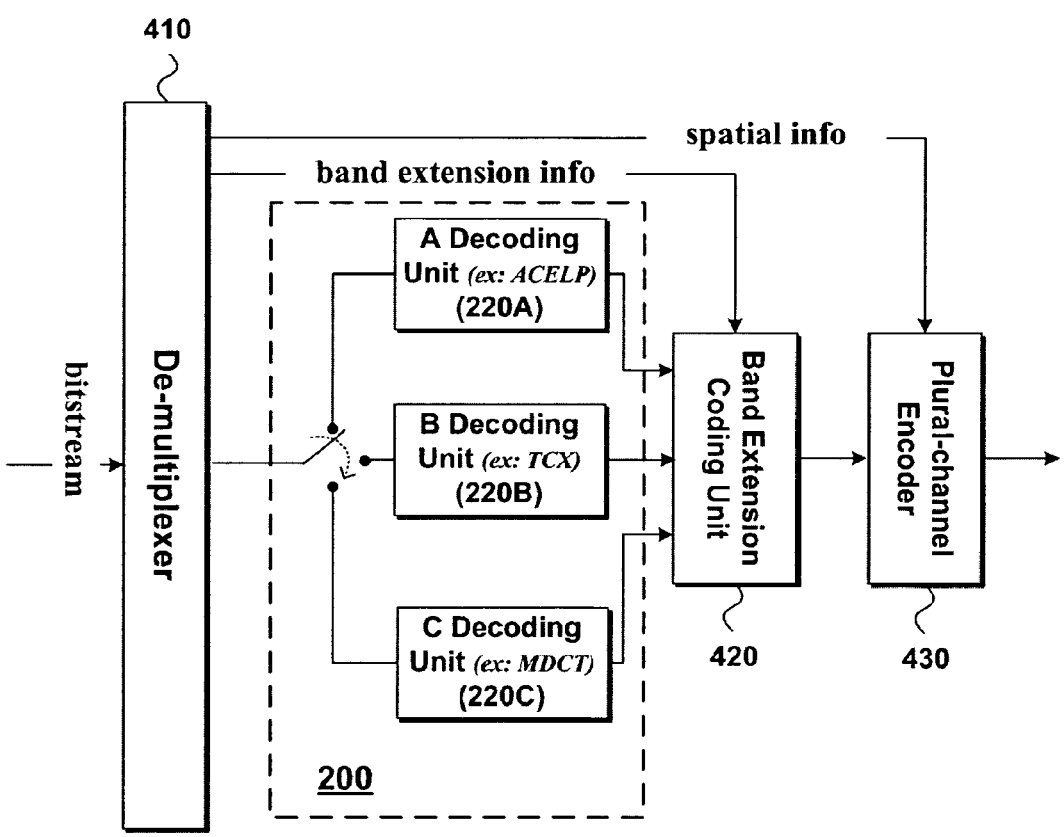
FIG. 34 is a diagram for an example of an audio signal decoding apparatus to which a decoder according to an embodiment of the present invention is applied.

FIG. 33 is a diagram for an example of an audio signal encoding apparatus to which an encoder according to an embodiment of the present invention is applied, and FIG. 34 is a diagram for an example of an audio signal decoding apparatus to which a decoder according to an embodiment of the present invention is applied.

Referring to FIG. 33, an audio signal encoding apparatus 300 includes an encoder 100 according to the present invention and further includes a plural channel encoder 310, a band extension coding unit 320 and a multiplexer 330. In this case, the multiplexer 300 can include the former multiplexer 130 described with reference to FIG. 1.

The plural channel encoder 310 receives a plurality of channel signal (e.g., at least two channel signals) (hereinafter named a multi-channel signal) and then downmixes a plurality of the received channel signal to generate a mono or stereo downmix signal. And, the plural channel encoder 310 generates spatial information required for upmixing the downmix signal into a multi-channel signal. In this case, the spatial information can include channel level difference information, inter-channel correlation information, a channel prediction coefficient, downmix gain information and the like. Optionally, in case that the audio signal encoding apparatus 300 receives a mono signal, the plural channel encoder 310 does not downmix the received mono signal but the mono signal bypasses the plural channel encoder 310.

The band extension encoder 320 is able to generate spectral data corresponding to a low frequency band and extension information for high frequency band extension by applying a band extension scheme to the downmix signal outputted from the plural channel encoder 310. In particular, spectral data of a partial band of the downmix signal is excluded and the band extension information for reconstructing the excluded data can be generated.

The signal generated by the band extension coding unit 320 is inputted to an A coding unit 120A, a B coding unit 120B or a C coding unit 120C according to coding scheme information generated by a signal classifier (not shown in the drawing) (e.g., the former signal classifier 110 shown in FIG. 1).

The A to C coding units 10A to 120C are identical to the former coding units described with reference to FIG. 1 and the redundant description shall be omitted from the following description. Additional contents are described as follows.

First of all, in case that a specific frame or segment of the downmix signal has a dominant speech characteristic, the A coding unit 120A encodes the downmix signal by the A coding scheme (i.e., a rectangular coding scheme belonging to a first coding scheme). In this case, the A coding scheme can follow AMR-WB (adaptive multi-rate wideband) standard, by which the present invention is non-limited. Meanwhile, the A coding unit 120A is able to further use a linear prediction coding (LPC) scheme. In case that a harmonic signal has high redundancy on a time axis, it can be modeled by linear prediction for predicting a current signal from a past signal. In this case, if the linear prediction coding scheme is adopted, coding efficiency can be raised. Meanwhile, the A coding unit 120A can include a time domain encoder.

Secondly, in case that audio and speech characteristics coexist in a specific frame or segment of the downmix signal, the B coding unit 120B encodes the downmix signal by the B coding scheme (i.e., a non-rectangular coding scheme belonging to the first coding scheme). In this case, the B coding scheme may correspond to TCX (transform coded excitation), by which the present invention is non-limited. In this case, the TCX can include a scheme for performing frequency transform on an excitation signal obtained from performing linear prediction (LPC). In this case, the frequency transform can include MDCT (modified discrete cosine transform).

Thirdly, in case that a specific frame or segment of the downmix signal has a dominant audio characteristic, the C coding unit 120C encodes the downmix signal by the C coding scheme (i.e., a non-rectangular coding scheme belonging to a second coding scheme). In this case, the C coding scheme can follow AAC (advanced audio coding) standard or HE-AAC (high efficiency advanced audio coding) standard, by which the present invention is non-limited. Meanwhile, the C coding unit 120C can include an MDCT (modified discrete transform) encoder.

And, the multiplexer 330 generates at least one bitstream by multiplexing spatial information, band extension information and the signal encoded by each of the A to C coding units 120A to 120C together.

Referring to FIG. 34, an audio signal decoding apparatus 400 includes a demultiplexer 410, A to C decoding units 220A to 220C, a band extension decoding unit 420 and a plural channel decoder 430.

The demultiplexer 410 extracts the data encoded by the A to C coding schemes, the band extension information, the spatial information and the like from an audio signal bitstream.

The A to C decoding units 220A to 220C correspond to the former A to C encoding units 120A to 120C to perform reverse processes thereof, respectively and their details shall be omitted from the following description.

The band extension decoding unit 420 reconstructs a high frequency band signal based on the band extension information by performing a band extension decoding scheme on an output signal of each of the A to C decoding units 220A to 220C.

In case that the decoded audio signal is a downmix signal, the plural channel decoder 430 generates an output channel signal of a multichannel signal stereo signal included) using the spatial information.

The audio signal processing apparatus according to the present invention is available for various products to use. Theses products can be mainly grouped into a stand alone group and a portable group. A TV, a monitor, a settop box and the like can be included in the stand alone group. And, a PMP, a mobile phone, a navigation system and the like can be included in the portable group.

Figure 35:
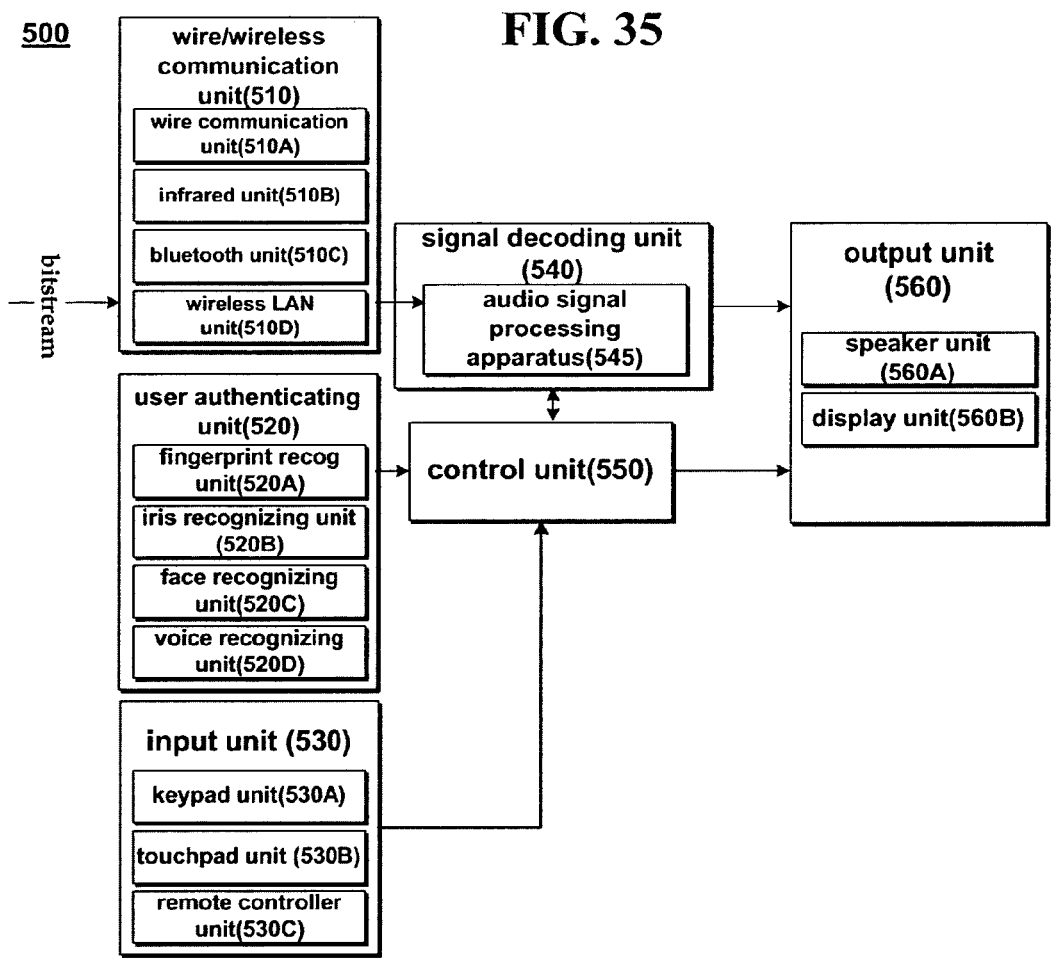
FIG. 35 is a schematic block diagram of a product in which an audio signal processing apparatus according to one embodiment of the present invention is implemented.

FIG. 35 shows relations between products, in which an audio signal processing apparatus according to an embodiment of the present invention is implemented.

Referring to FIG. 35, a wire/wireless communication unit 510 receives a bitstream via wire/wireless communication system. In particular, the wire/wireless communication unit 510 can include at least one of a wire communication unit 510A, an infrared unit 510B, a Bluetooth unit 510C and a wireless LAN unit 510D.

A user authenticating unit 520 receives an input of user information and then performs user authentication. The user authenticating unit 520 can include at least one of a fingerprint recognizing unit 520A, an iris recognizing unit 520B, a face recognizing unit 520C and a voice recognizing unit 520D. The fingerprint recognizing unit 520A, the iris recognizing unit 520B, the face recognizing unit 520C and the speech recognizing unit 520D receive fingerprint information, iris information, face contour information and voice information and then convert them into user informations, respectively. Whether each of the user informations matches pre-registered user data is determined to perform the user authentication.

An input unit 530 is an input device enabling a user to input various kinds of commands and can include at least one of a keypad unit 530A, a touchpad unit 53013 and a remote controller unit 530C, by which the present invention is non-limited.

A signal coding unit 540 performs encoding or decoding on an audio signal and/or a video signal, which is received via the wire/wireless communication unit 510, and then outputs an audio signal in time domain. The signal coding unit 540 includes an audio signal processing apparatus 545. As mentioned in the foregoing description, the audio signal processing apparatus 545 corresponds to the above-described encoder 100 (first to sixth embodiments included) or the decoder 200 (first to sixth embodiments included). Thus, the audio signal processing apparatus 545 and the signal coding unit including the same can be implemented by at least one or more processors.

A control unit 550 receives input signals from input devices and controls all processes of the signal decoding unit 540 and an output unit 560. In particular, the output unit 560 is an element configured to output an output signal generated by the signal decoding unit 540 and the like and can include a speaker unit 560A and a display unit 560B. If the output signal is an audio signal, it is outputted to a speaker. If the output signal is a video signal, it is outputted via a display.

FIG. 36 is a diagram for relations of products provided with an audio signal processing apparatus according to an embodiment of the present invention. FIG. 36 shows the relation between a terminal and server corresponding to the products shown in FIG. 35.

Referring to FIG. 36 (A), it can be observed that a first terminal 500.1 and a second terminal 500.2 can exchange data or bitstreams bi-directionally with each other via the wire/wireless communication units. Referring to FIG. 36 (B), it can be observed that a server 600 and a first terminal 500.1 can perform wire/wireless communication with each other.

An audio signal processing method according to the present invention can be implemented into a computer-executable program and can be stored in a computer-readable recording medium. And, multimedia data having a data structure of the present invention can be stored in the computer-readable recording medium. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, a bitstream generated by the above mentioned encoding method can be stored in the computer-readable recording medium or can be transmitted via wire/wireless communication network.

Industrial Applicability

Accordingly, the present invention is applicable to processing and outputting an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for processing an audio signal, comprising:
   receiving, by an audio processing apparatus, an audio signal including a previous frame encoded with a first coding scheme being based on frequency domain and a current frame encoded with a second coding scheme being based on linear-prediction domain;
   receiving sub-coding identification information indicating at least one block of the current frame is encoded with a rectangular coding scheme or a non-rectangular coding scheme;
   when the sub-coding identification information indicates that the current frame includes a plurality of blocks and at least first block of the current frame is encoded with the non-rectangular coding scheme, determining an ascending line of a current window according to a previous window for the previous frame, wherein the ascending line is determined to have a first slope when the previous window is a non-short window, and is determined to have a second slope when the previous window is a short window; and
   applying the current window having the determined ascending line to the first block,
   wherein the first slope is gentler than the second slope,
   wherein a descending line of the current window is determined to have the first slope regardless of the determined ascending line of the current window, and
   wherein the non-short window is one of a long_start window, a stop-start window or a window of the second coding scheme for the previous frame.

2. The method of claim 1, wherein a width of the first slope corresponds to 256 samples or N/4 and a width of the second sloe corresponds to 128 samples or N/8 (N is frame length).

3. The method of claim 1, wherein cross point between the previous window and the current window is at 3N/2 distance from start of the previous window.

4. The method of claim 1, wherein a width of the first slope is matched to a width of a descending slope in the non-short window, and a width of the second slope is matched to a width of a descending slope in the short window.

5. An apparatus for processing an audio signal, comprising:
   a de-multiplexer receiving an audio signal including a previous frame encoded with a first coding scheme being based on frequency domain and a current frame encoded with a second coding scheme being based on linear-prediction domain, and receiving sub-coding identification information indicating at least one block of the current frame is encoded with a rectangular coding scheme or a non-rectangular coding scheme;
   a first coding unit, when the sub-coding identification information indicates that the current frame includes a plurality of blocks and at least first block of the current frame is encoded with the non-rectangular coding scheme, determining an ascending line of a current window according to a previous window for the previous frame, wherein the ascending line is determined to have a first slope when the previous window is a non-short window, and is determined to have a second slope when the previous window is a short window; and
   applying the current window having the determined ascending line to the first block,
   wherein
   the first slope is gentler than the second slope,
   wherein a descending line of the current window is determined to have the first slope regardless of the determined ascending line of the current window, and
   wherein the non-short window is one of a long_start window, a stop-start window or a window of the second coding scheme for the previous frame.

6. The apparatus of claim 5, wherein a width of the first slope corresponds to 256 samples or N/4 and a width of the second slope corresponds to 128 samples or N/8 (N is frame length).

7. The apparatus of claim 5, wherein cross point between the previous window and the current window is at 3N/2 distance from start of the previous window.

8. The apparatus of claim 5, wherein a width of the first slope is matched to a width of a descending slope in the non-short window, and a width of the second slope is matched to a width of a descending slope in the short window.

* * * * *